(12) United States Patent
Coulter et al.

(10) Patent No.: US 9,683,770 B2
(45) Date of Patent: *Jun. 20, 2017

(54) REFRIGERATOR WITH TEMPERATURE CONTROL

(71) Applicant: Whirlpool Corporation, Benton Harbor, MI (US)

(72) Inventors: Tim L. Coulter, Cedar Rapids, IA (US); Thomas E. Gose, Cedar Rapids, IA (US); Steven G. Herndon, Cedar Rapids, IA (US); James H. Jenkins, South Amana, IA (US); Bill J. Koons, Cedar Rapids, IA (US); Brent A. Kramer, Cedar Rapids, IA (US); Scott W. Leimkuehler, Swisher, IA (US); Dean A. Martin, Solon, IA (US); Alvin V. Miller, Swisher, IA (US); Kevin Lee Noel, Atkins, IA (US); Mauro M. Oliveira, Cedar Rapids, IA (US); Lester J. Ott, Swisher, IA (US); Ron S. Paulsen, Marengo, IA (US); Chad J. Rotter, Amana, IA (US); David Allen Stauffer, Belle Plaine, IA (US); Kyle B. Van Meter, Coralville, IA (US); Alan M. Welch, Lewistown, IL (US); Robert L. Wetekamp, Newburgh, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,711

(22) Filed: Dec. 7, 2015

(65) Prior Publication Data

US 2016/0084557 A1    Mar. 24, 2016

Related U.S. Application Data

(63) Continuation of application No. 13/830,073, filed on Mar. 14, 2013, now Pat. No. 9,267,724, which is a
(Continued)

(51) Int. Cl.
*F25C 1/04* (2006.01)
*F25D 11/02* (2006.01)
(Continued)

(52) U.S. Cl.
CPC .............. *F25C 1/04* (2013.01); *B23P 15/26* (2013.01); *F25C 1/00* (2013.01); *F25C 5/007* (2013.01);
(Continued)

(58) Field of Classification Search
CPC .............. Y10T 29/49359; F25C 5/005; F25C 2600/04; F25C 1/00; F25D 17/065;
(Continued)

(56) References Cited

U.S. PATENT DOCUMENTS 3,902,331 A    9/1975   True, Jr. et al.
4,209,999 A    7/1980   Falk et al.
(Continued)

FOREIGN PATENT DOCUMENTS

CN    1340685 A    3/2002
CN    1412509 A    4/2003
(Continued)

OTHER PUBLICATIONS

JP 2-29589—English Translation. Jan. 31, 1990.
(Continued)

*Primary Examiner* — Allen Flanigan
*Assistant Examiner* — Filip Zec
(74) *Attorney, Agent, or Firm* — Nyemaster Goode, P.C.

(57) ABSTRACT

An insulated icemaking compartment is provided in the fresh food compartment of a bottom mount refrigerator. The icemaking compartment may be integrally formed with the liner of the fresh food compartment, or alternatively, may be modular for installation anywhere in the fresh food compartment. A removable bin assembly with a front cover normally seals the icemaking compartment to maintain the temperature in the compartment. A cold air duct formed in the rear wall of the refrigerator supplies cold air from the freezer compartment to the icemaking compartment. A return air duct directs a portion of the air from the icemaking compartment back to the freezer compartment. An air vent in the icemaking compartment directs another portion of air into the fresh food compartment. A control system provides for controlling refrigerator functions in a manner that promotes energy efficiency.

20 Claims, 46 Drawing Sheets

Related U.S. Application Data continuation of application No. 11/421,800, filed on Jun. 2, 2006, now Pat. No. 8,695,370, which is a continuation of application No. 11/139,237, filed on May 27, 2005, now Pat. No. 7,337,620, which is a continuation-in-part of application No. 11/131,701, filed on May 18, 2005, now Pat. No. 7,284,390.

(51) Int. Cl.
    *F25D 29/00* (2006.01)
    *F25C 1/00* (2006.01)
    *B23P 15/26* (2006.01)
    *F25D 23/06* (2006.01)
    *F25D 23/00* (2006.01)
    *F25D 23/12* (2006.01)
    *F25D 31/00* (2006.01)
    *F25C 5/00* (2006.01)
    *F25D 17/04* (2006.01)
    *F25D 27/00* (2006.01)

(52) U.S. Cl.
    CPC ............ *F25D 11/02* (2013.01); *F25D 23/00* (2013.01); *F25D 23/061* (2013.01); *F25D 23/063* (2013.01); *F25D 23/064* (2013.01); *F25D 23/066* (2013.01); *F25D 23/12* (2013.01); *F25D 29/00* (2013.01); *F25D 31/00* (2013.01); *F25B 2600/112* (2013.01); *F25C 5/005* (2013.01); *F25D 17/045* (2013.01); *F25D 27/00* (2013.01); *F25D 2201/10* (2013.01); *F25D 2317/0666* (2013.01); *F25D 2317/0682* (2013.01); *F25D 2323/021* (2013.01); *F25D 2400/02* (2013.01); *F25D 2700/02* (2013.01); *F25D 2700/12* (2013.01); *F25D 2700/121* (2013.01); *F25D 2700/122* (2013.01); *F25D 2700/14* (2013.01); *Y02B 40/32* (2013.01); *Y10T 29/49359* (2015.01)

(58) Field of Classification Search
    CPC ............ F25D 2700/14; F25B 2600/112; F25B 2600/11; F25B 2700/11
    See application file for complete search history.

(56) References Cited

U.S. PATENT DOCUMENTS

| | | |
|---|---|---|
| 4,333,588 A | 6/1982 | Schreck et al. |
| 4,696,167 A | 9/1987 | Matsui et al. |
| 4,872,318 A | 10/1989 | Kemmensen |
| 4,893,480 A | 1/1990 | Matsui et al. |
| 5,037,004 A | 8/1991 | Katz et al. |
| 5,056,688 A | 10/1991 | Goetz et al. |
| D324,869 S | 3/1992 | Carper |
| 5,291,752 A | 3/1994 | Alvarez et al. |
| 2,717,505 A | 9/1995 | Anderson |
| D372,739 S | 8/1996 | Bustos |
| 5,711,159 A | 1/1998 | Whipple, III |
| 5,735,134 A | 4/1998 | Liu et al. |
| 5,778,686 A | 7/1998 | Choi |
| 6,314,746 B2 | 11/2001 | Ohya et al. |
| 6,574,982 B1 | 6/2003 | Wiseman et al. |
| D484,150 S | 12/2003 | Becke |
| 6,735,959 B1 | 5/2004 | Najewicz |
| 7,228,703 B2 | 6/2007 | Kim et al. |
| D549,745 S | 8/2007 | Coulter et al. |
| 7,266,972 B2 | 9/2007 | Anselmino et al. |
| 7,284,390 B2 | 10/2007 | Van Meter et al. |
| 7,591,141 B2 | 9/2009 | Wetkamp et al. |
| 7,870,754 B2 | 1/2011 | Martin et al. |
| 8,117,863 B2 | 2/2012 | Van Meter et al. |
| 2005/0061018 A1 | 3/2005 | Kim et al. |
| 2006/0080994 A1 | 4/2006 | Seiden et al. |
| 2006/0086128 A1 | 4/2006 | Maglinger et al. |
| 2006/0086129 A1 | 4/2006 | Anselmino et al. |
| 2006/0086130 A1 | 4/2006 | Anselmino et al. |
| 2006/0086131 A1 | 4/2006 | Pastryk et al. |
| 2006/0086132 A1 | 4/2006 | Maglinger et al. |
| 2006/0201189 A1 | 9/2006 | Adamski et al. |
| 2006/0266055 A1 | 11/2006 | Anderson et al. |
| 2007/0245762 A1 | 10/2007 | Maglinger et al. |
| 2008/0011010 A1 | 1/2008 | Koons et al. |
| 2008/0016900 A1 | 1/2008 | Bippus et al. |
| 2008/0041090 A1 | 2/2008 | Lee et al. |
| 2008/0134709 A1 | 6/2008 | Fischer et al. |
| 2008/0168794 A1 | 7/2008 | Cho et al. |
| 2008/0289355 A1 | 11/2008 | Kang et al. |
| 2009/0038330 A1 | 2/2009 | Lee et al. |
| 2009/0064703 A1 | 3/2009 | Kim et al. |
| 2009/0064704 A1 | 3/2009 | Wu et al. |
| 2009/0173098 A1 | 7/2009 | Kim et al. |
| 2009/0255289 A1 | 10/2009 | Friedmann et al. |
| 2010/0037631 A1 | 2/2010 | Choi et al. |
| 2010/0050677 A1 | 3/2010 | Lu et al. |
| 2010/0050681 A1 | 3/2010 | Ryu et al. |
| 2010/0058796 A1 | 3/2010 | Kim |
| 2010/0077789 A1 | 4/2010 | Lim et al. |
| 2010/0199701 A1 | 8/2010 | Yoon et al. |
| 2010/0257887 A1 | 10/2010 | Hwang |
| 2010/0287970 A1 | 11/2010 | Choi |

FOREIGN PATENT DOCUMENTS

| | | |
|---|---|---|
| JP | 49-77571 B | 7/1974 |
| JP | 51-21165 | 2/1976 |
| JP | 56-47453 | 4/1981 |
| JP | 56-47453 A | 4/1981 |
| JP | 2-29589 A | 1/1990 |
| JP | 2-103382 A | 4/1990 |
| JP | 4-15477 A | 1/1992 |
| JP | 4032673 B2 | 2/1992 |
| JP | 4-222378 A | 8/1992 |
| JP | 5-10660 A | 1/1993 |
| JP | 5-66084 A | 3/1993 |
| JP | 5-71849 A | 3/1993 |
| JP | 5-79367 U | 10/1993 |
| JP | 6-11228 A | 1/1994 |
| JP | 6-147743 A | 5/1994 |
| JP | 7-019701 A | 1/1995 |
| JP | 7-19701 A | 1/1995 |
| JP | 7-174453 A | 7/1995 |
| JP | 7-294115 A | 11/1995 |
| JP | 7-301479 A | 11/1995 |
| JP | 7-305946 A | 11/1995 |
| JP | 8-61824 A | 3/1996 |
| JP | 8-061824 A | 3/1996 |
| JP | 8-271110 A | 10/1996 |
| JP | 9-145210 A | 6/1997 |

(56) References Cited

FOREIGN PATENT DOCUMENTS

| | | |
|---|---|---|
| JP | 9-303944 A | 11/1997 |
| JP | 11-211308 A | 8/1998 |
| JP | 11-101544 A | 4/1999 |
| JP | 11-211308 | 8/1999 |
| JP | 11-211308 A | 8/1999 |
| JP | 2000-9372 A | 1/2000 |
| JP | 200010896 A | 1/2000 |
| JP | 2000-111229 A | 4/2000 |
| JP | 2000-161830 A | 6/2000 |
| JP | 2000-266458 A | 9/2000 |
| JP | 2000-337760 A | 12/2000 |
| JP | 2000-337760 A | 12/2000 |
| JP | 2001-116410 A | 4/2001 |
| JP | 2001-116410 A | 4/2001 |
| JP | 2001-349657 A | 12/2001 |
| JP | 2001-349657 A | 12/2001 |
| JP | 2002-139271 A | 5/2002 |
| JP | 2002-139271 A | 5/2002 |
| JP | 2002-181429 A | 6/2002 |
| JP | 2002-181429 A | 6/2002 |
| JP | 2003-10896 A | 1/2003 |
| JP | 2003-114075 A | 4/2003 |
| JP | 2003-114075 A | 4/2003 |
| JP | 2003-121043 A | 4/2003 |
| JP | 2003-121043 A | 4/2003 |
| JP | 2003-262438 A | 9/2003 |
| JP | 2003-262438 A | 9/2003 |
| JP | 2004-53092 A | 2/2004 |
| JP | 2004-53092 A | 2/2004 |
| JP | 3545617 B2 | 4/2004 |
| JP | 2006105418 A2 | 4/2006 |
| JP | 4032673 B2 | 11/2007 |
| JP | 51-21165 B2 | 1/2013 |
| KR | 1988-0000896 A | 3/1988 |
| KR | 1988-0000896 A | 3/1988 |
| KR | 1990-0034649 A | 5/1990 |
| KR | 1999-0021510 U | 6/1990 |
| KR | 1994-0011915 A | 6/1994 |
| KR | 95-25387 A | 9/1995 |
| KR | 1996-0018479 A | 6/1996 |
| KR | 1997-0059690 A | 8/1997 |
| KR | 1999-001784 A | 1/1999 |
| KR | 1999-007058 A | 1/1999 |
| KR | 1999-0156726 B1 | 1/1999 |
| KR | 19990156726 B1 | 1/1999 |
| KR | 1999-0182534 B1 | 5/1999 |
| KR | 19990182534 B1 | 5/1999 |
| KR | 1999-0031599 U | 7/1999 |
| KR | 1999-0031699 U | 7/1999 |
| KR | 1999-0056269 A | 7/1999 |
| KR | 19990056269 A | 7/1999 |
| KR | 200164305 Y1 | 10/1999 |
| KR | 20-0256596 Y1 | 12/2001 |
| KR | 200256596 Y1 | 12/2001 |
| KR | 10-0356542 B1 | 10/2002 |
| KR | 100356542 B1 | 10/2002 |
| KR | 2003-0018246 A | 3/2003 |
| KR | 20030018246 A | 3/2003 |
| KR | 2003-0030961 A | 4/2003 |
| KR | 20030030961 A | 4/2003 |
| KR | 2003-0092871 A | 12/2003 |
| KR | 20030092871 A | 12/2003 |
| KR | 30-0355715 S | 7/2004 |
| KR | 2004-0057157 A | 7/2004 |
| KR | 20040057157 A | 7/2004 |
| KR | 200300355715 S | 7/2004 |
| KR | 2004-0102570 A | 12/2004 |
| KR | 20040102570 A | 12/2004 |
| KR | 2005-0023863 A | 3/2005 |
| KR | 2005-0028227 A | 3/2005 |
| KR | 2005-0028656 A | 3/2005 |
| KR | 2005-0028657 A | 3/2005 |
| KR | 2005-0028658 A | 3/2005 |
| KR | 20050023863 A | 3/2005 |
| KR | 20050028227 A | 3/2005 |
| KR | 20050028656 A | 3/2005 |
| KR | 20050028657 A | 3/2005 |
| KR | 20050028658 A | 3/2005 |
| KR | 2005-0094673 A | 9/2005 |
| KR | 20050094673 A | 9/2005 |
| KR | 2005-0117536 A | 12/2005 |
| KR | 20050117536 A | 12/2005 |
| WO | 2008135473 A2 | 11/2008 |
| WO | WO2008/135473 A2 | 11/2008 |

OTHER PUBLICATIONS

JP 2-103382, Matsushita Refrig Co Ltd—English Translation. Apr. 16, 1990.
JP 6-147743, Hitachi Ltd—English Translation. May 27, 1994.
JP 9-145210, Mitsubishi Electric Corp—English Translation. Jun. 6, 1997.
JP 9-303944, Sanyo Electric Co Ltd—English Translation. Nov. 28, 1997.
JP 2000-9372, Toshiba Corp—English Translation. Jan. 14, 2000.
JP 2000-111229—English Translation. Apr. 18, 2000.
JP 2003-121043—English Translation. Apr. 23, 2003.
KR 95-25387, Samsung Electronics Co., Ltd.—English Translation. Sep. 15, 1995.
KR 1999-001784, Samsung Electronics Co., Ltd.—English Translation. Jan. 15, 1999.
KR 1999-0021510, Daewoo Electronics Co., Ltd.—English Translation. Jun. 25, 1999.
KR 1999-0182534, Samsung Electronics Co., Ltd.—English Translation. May 1, 1999.
KR 10-0356542, Samsung Electronics Co., Ltd.—English Translation. Mar. 6, 2003.
KR 2003-0018246, LG Electronics, Inc.—English Translation. Mar. 6, 2003.
KR 2003-0030961—English Translation. Apr. 18, 2003.
KR 2003-0092871—English Translation. Dec. 6, 2003.
KR 2004-0102570, LG Eletronics Inc.—English Translation. Dec. 8, 2004.
KR 2005-0028656, LG Electronics Inc.—English Translation. Mar. 23, 2005.

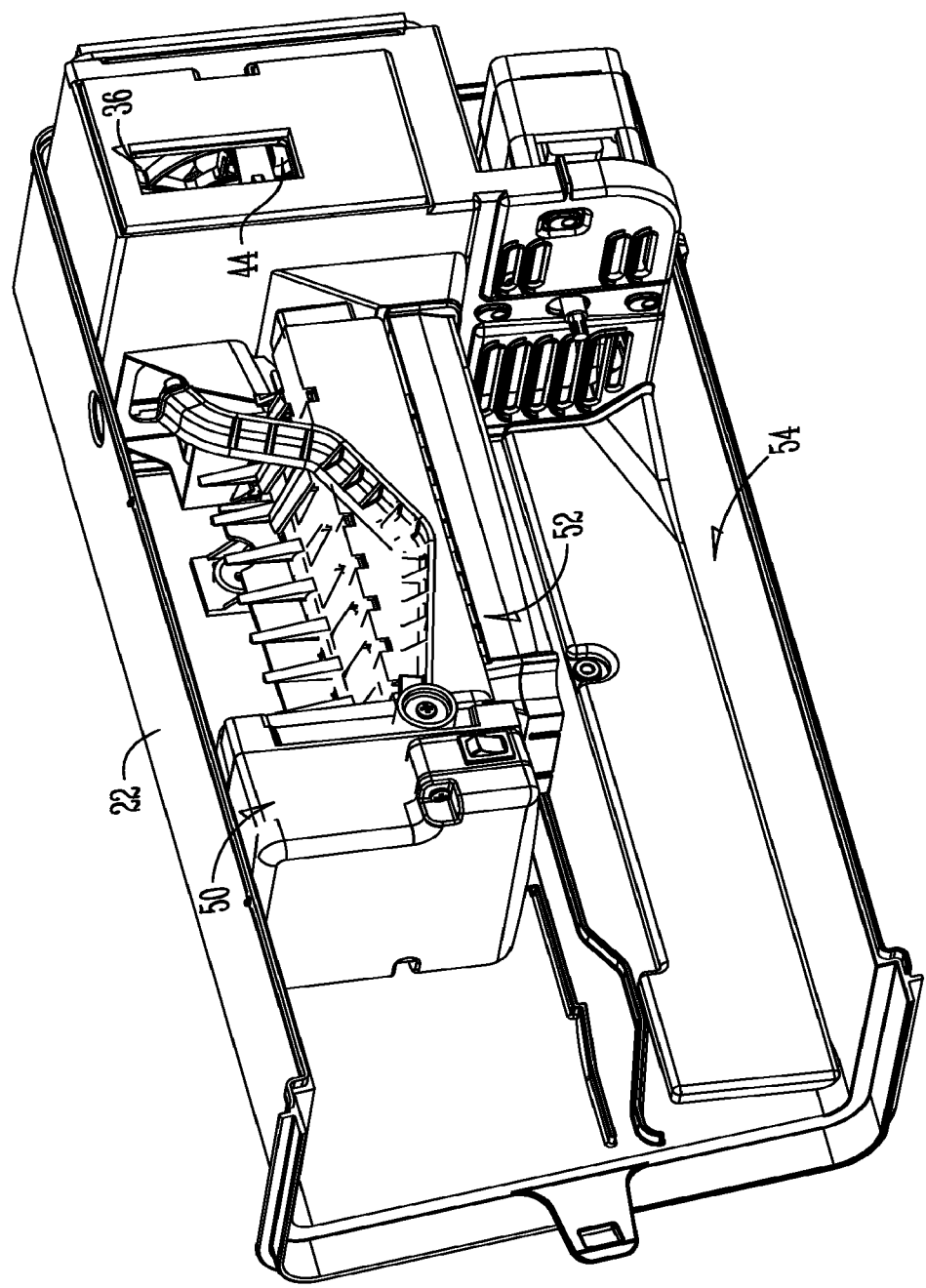

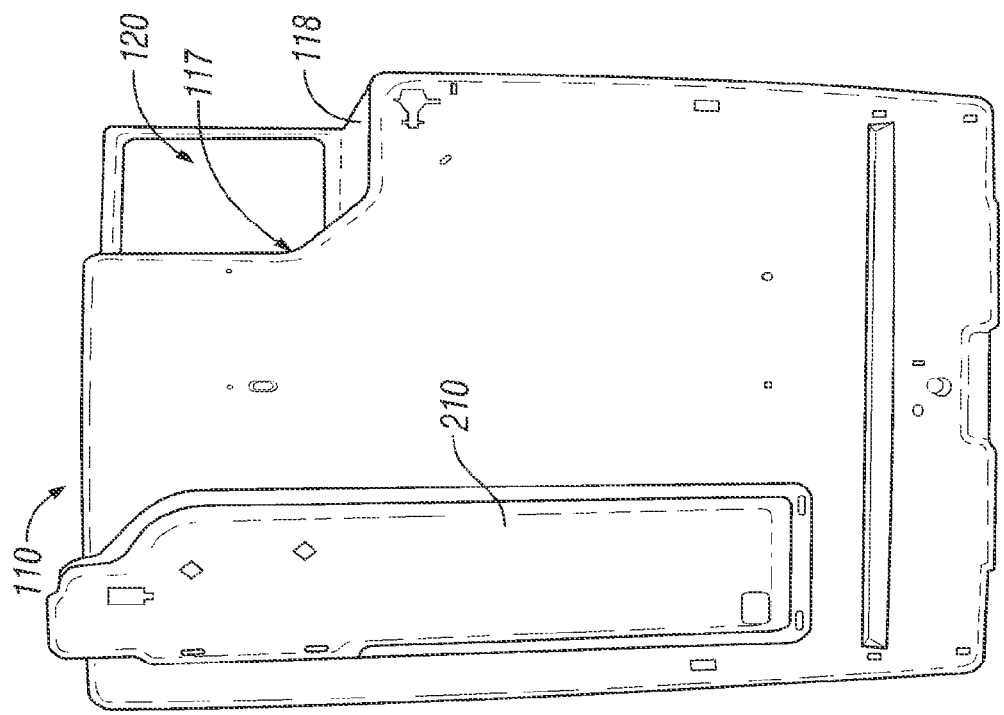
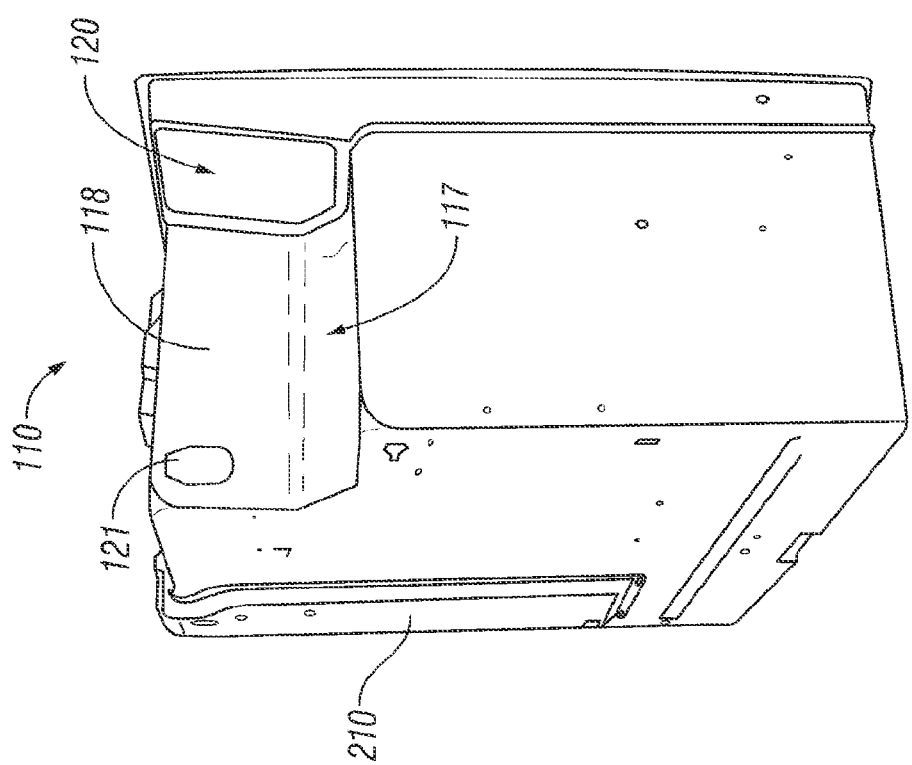

REFRIGERATOR WITH TEMPERATURE CONTROL

CROSS-REFERENCE TO RELATED APPLICATIONS

This application is a continuation of U.S. patent application Ser. No. 13/830,073 filed on Mar. 14, 2013, entitled Refrigerator with Temperature Control. U.S. patent application Ser. No. 13/830,073 is a continuation of U.S. patent application Ser. No. 11/421,800, now U.S. Pat. No. 8,695,370, filed on Jun. 2, 2006, which is a continuation of U.S. patent application Ser. No. 11/139,237, now U.S. Pat. No. 7,337,620, filed on May 27, 2005, which is a continuation-in-part of U.S. patent application Ser. No. 11/131,701, now U.S. Pat. No. 7,284,390, filed on May 18, 2005. The disclosure of each of the above applications is hereby incorporated by reference in their entirety.

BACKGROUND OF THE INVENTION

Household refrigerators generally come in three structural styles: (1) a side-by-side model wherein the freezer and refrigerator compartments are side by side; (2) a top mount model wherein the freezer compartment is located above the refrigerator compartment; and (3) a bottom mount model wherein the freezer compartment is mounted below the refrigerator compartment. An icemaker is normally provided in the freezer compartment of all three models. A door mounted ice dispenser is often provided in a side-by-side refrigerator and in a top mount refrigerator so that a person can add ice to a glass without opening the freezer or refrigerator door. However, a door mounted ice dispenser normally is not been provided in bottom mount refrigerators, since the freezer door is too low, and there are difficulties in transporting ice from the freezer compartment to the refrigerator compartment which precludes a dispenser in the refrigerator compartment door. However, it is desirable to have an ice dispenser in the refrigerator compartment of a bottom mount refrigerator.

Providing an icemaking compartment within the fresh food compartment of a refrigerator presents numerous issues, both structural and functional. For example, the fresh food compartment is normally about 40° F., while an ice compartment needs to be less than 32° F. in order to make ice effectively and efficiently and is typically at, or about 00 F. Maintaining and controlling the temperature within the icemaking compartment requires insulation, seals, appropriate airflow, and a control system. Placing the icemaking compartment within the fresh food compartment of the refrigerator also requires consideration of electrical connections of the icemaker and the supply of water to the icemaker. The method of manufacturing of such an icemaking compartment within the fresh food compartment of a refrigerator also raises novel and unique considerations which are not factors for an icemaking compartment mounted in a freezer.

U.S. Pat. No. 6,735,959 issued to Najewicz discloses a thermoelectric icemaker placed within the fresh food compartment of a bottom mount refrigerator that may be dispensed through the fresh food door. Najewicz forms ice within the fresh food compartment using the thermoelectric icemaker even though the compartment is above a freezing temperature. Although Najewicz provides for a duct that runs from the freezer compartment to the thermoelectric icemaker, the cold air from the duct is used to remove heat from the thermoelectric icemaker. Najewicz has many problems that must be overcome in order to be practical including the removal of unfrozen water, rapid ice body formation, prolonged ice storage, etc. The present invention overcomes these problems.

SUMMARY OF THE INVENTION

Therefore it is a primary object, feature, or advantage of the present invention to improve over the state of the art.

A further object, feature, or advantage of the present invention is the provision of an improved refrigerator having an icemaking compartment within the fresh food compartment.

Another object, feature, or advantage of the present invention is the provision of a refrigerator having a separate icemaking compartment maintained at a temperature between 0° and 32° F.

A further object, feature, or advantage of the present invention is the provision of a refrigerator having an insulated icemaking compartment remote from the freezer compartment.

Still another object, feature, or advantage of the present invention is the provision of a bottom mount refrigerator having an icemaking compartment integrally formed in the liner of the fresh food compartment.

Yet another object, feature, or advantage of the present invention is the provision of a bottom mount refrigerator having a modular icemaking compartment mounted in the fresh food compartment.

A further object, feature, or advantage of the present invention is the provision of a bottom mount refrigerator having an icemaking compartment in the fresh food compartment, and having an insulated and sealed front cover on the icemaking compartment which can be opened to provide access into the compartment.

Another object, feature, or advantage of the present invention is the provision of an icemaking compartment in the fresh food compartment of a bottom mount refrigerator with a single electrical connection within the icemaking compartment for the wire harness of the icemaker.

Another object, feature, or advantage of the present invention is the provision of an icemaking compartment in the fresh food compartment of a bottom mount refrigerator wherein the water fill tube for supplying water to the icemaker extends downwardly through a vertically disposed hole in the top wall of the refrigerator.

Still another object, feature, or advantage of the present invention is the provision of an icemaking compartment within the fresh food compartment of a bottom mount refrigerator wherein the water fill tube for the icemaker is exposed to ambient air to prevent freezing of water within the fill tube.

Yet another object, feature, or advantage of the present invention is the provision of a bottom mount refrigerator having a recessed cavity in the fresh food compartment in which a water tank is mounted.

A further object, feature, or advantage of the present invention is the provision of an icemaking compartment which is formed separately from and mounted into a fresh food compartment of a bottom mount refrigerator.

Another object, feature, or advantage of the present invention is the provision of a method of making a bottom mount refrigerator having an integral ice compartment formed in the liner of the fresh food compartment.

Still another object, feature, or advantage of the present invention is the provision of a control system for an ice compartment within the fresh food compartment of a refrigerator for controlling icemaking and dispensing.

Still another object, feature, or advantage of the present invention is the provision of a refrigerator having a fresh food compartment with an icemaking compartment therein, and an ice dispenser in the door of the fresh food compartment.

Another object, feature, or advantage of the present invention is the provision of a bottom mount refrigerator having an ice dispenser in the door of the refrigerator, also known as the fresh food, compartment.

Another object, feature, or advantage of the present invention is the provision of an icemaker in the refrigerator compartment of a bottom mount refrigerator, with a cold air duct to provide air from the freezer compartment to the icemaker.

Still another object, feature, or advantage of the present invention is the provision of an icemaker in the refrigerator compartment of a bottom mount refrigerator having efficient and timely icemaking capacity.

It is a further object, feature, or advantage of the present invention to provide a bottom mount refrigerator that dispenses ice and water through the door.

It is a still further object, feature, or advantage of the present invention to provide a refrigerator that is energy efficient.

Another object, feature, or advantage of the present invention is to provide a refrigerator that enhances safety.

Yet another object, feature, or advantage of the present invention is to provide a refrigerator that provides convenience to users.

A further object, feature, or advantage of the present invention is to provide a refrigerator that is aesthetically pleasing to users.

A still further object, feature, or advantage of the present invention is to provide a refrigerator with a control system design that minimizes the complexity and the number of components necessary.

Another object, feature, or advantage of the present invention is to provide a refrigerator with a drive for the ice box/fresh food compartment damper which provides feedback.

Yet another object, feature, or advantage of the present invention is to provide a refrigerator with compartment light cutout.

A further object, feature, or advantage of the present invention is to provide a refrigerator which disables the icemaker and dispenser when the fresh food compartment door opens.

A still further object, feature, or advantage of the present invention is to provide a refrigerator with a menu-driven interface.

Another object, feature, or advantage of the present invention is to provide a refrigerator with a variable speed fan.

One or more of these and/or other objects, features, or advantages of the present invention will become from the specification and claims that follow.

The bottom mount refrigerator of the present invention has an icemaker within an insulated icemaking compartment in the fresh food or refrigerator compartment. Cold air is supplied to the icemaking compartment from the freezer compartment via a cold air duct. A return air duct extends from the icemaking compartment to the freezer compartment. The icemaking compartment also includes a vent opening for venting air to the refrigerator compartment. A fan draws or forces air through the duct from the freezer compartment to the icemaking compartment. The temperature in the ice making compartment is between 0° F. to 32° F., which is colder than the temperature of the refrigerator compartment, but not as cold as the freezer compartment. The icemaking compartment is preferably located in an upper corner of the refrigerator compartment. The door of the refrigerator compartment includes an ice dispenser to supply ice to a person without opening the refrigerator compartment door. The door may include an ice bin for storing ice from the icemaker.

In the improved refrigerator of the present invention, the icemaking compartment is insulated. Preferably, the icemaking compartment is formed integrally with the liner of the fresh food compartment. Alternatively, the icemaking compartment is formed separately from and mounted in the fresh food compartment. The icemaking compartment includes inner and outer shells, with insulation therebetween, as well as an insulated front cover which provides an air-tight seal with the icemaking compartment when closed, and which can be opened to provide access to the icemaker and ice bin within the icemaking compartment. The water fill tube for the icemaking compartment extends through a vertically disposed hole in the top wall of the refrigerator, and is exposed to ambient air to prevent freezing of water within the tube. The refrigerator includes a recessed cavity in the back wall in which a water tank is mounted.

In the method of manufacturing the icemaking compartment of the present invention, the ice compartment is preferably formed in the liner of the fresh food compartment during the molding processing using oppositely disposed forces. A three-dimensional plug forms the icemaking compartment from a rear side of the fresh food compartment liner. A front wall of the icemaking compartment is then cutout, so that an ice box can be inserted through the cutout into the icemaking compartment.

A control system is provided for the refrigerator for controlling the making and dispensing of ice in the icemaking compartment within the fresh food compartment of the bottom mount refrigerator.

BRIEF DESCRIPTION OF THE DRAWINGS

FIG. 7 is a perspective view of the icemaker positioned within the icemaking compartment.

FIG. 8 is a perspective view of the fresh food compartment liner with the integrally formed icemaking compartment of the present invention.

FIG. 9 is a front elevation view of the liner shown in FIG. 8 without the ice box attached.

DETAILED DESCRIPTION OF EMBODIMENTS

Figure 1:
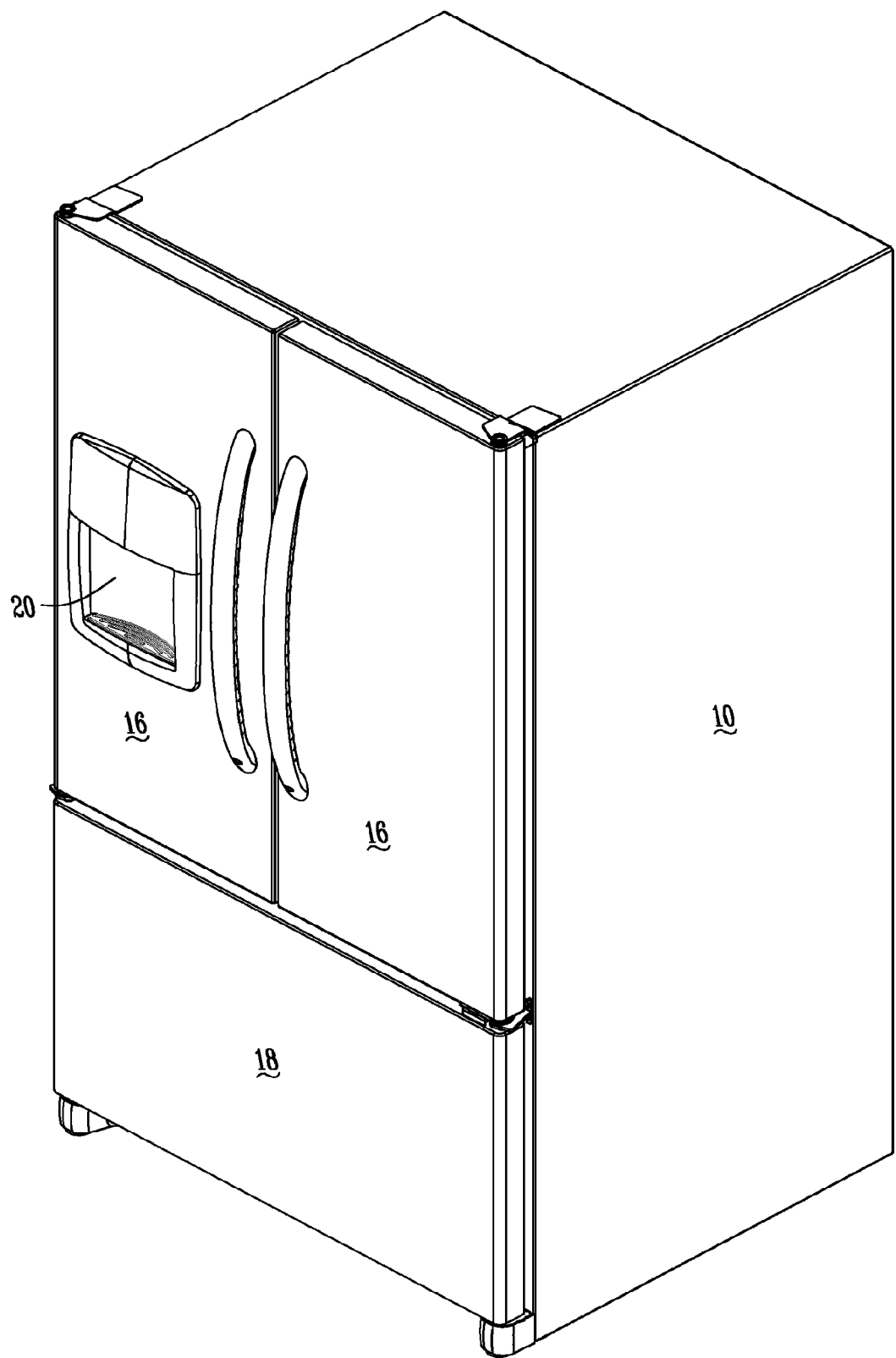
FIG. 1 is a perspective view of a bottom mount refrigerator according to the present invention.
Figure 2:
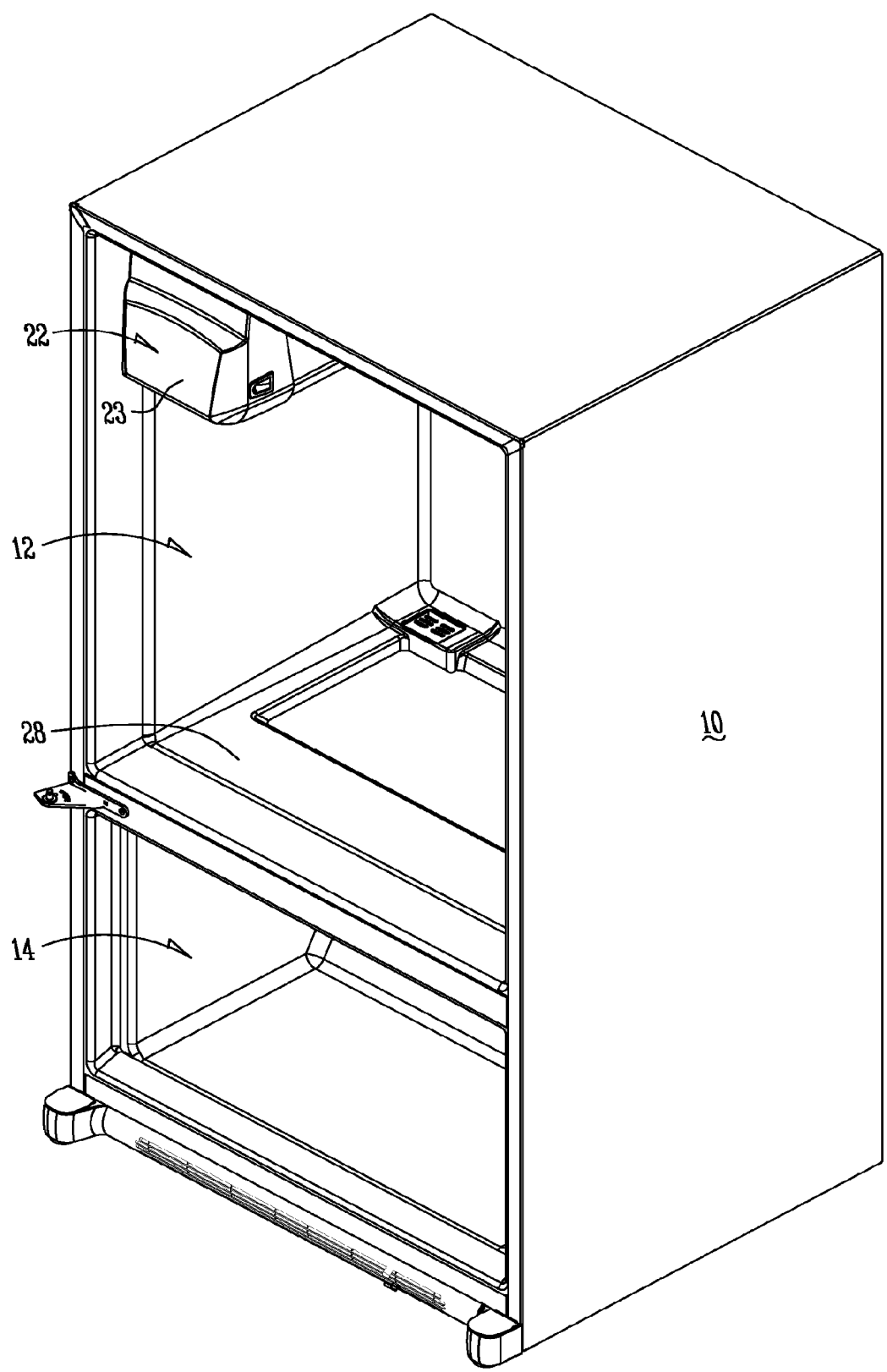
FIG. 2 is a perspective view of the bottom mount refrigerator having the doors removed.

A bottom mount refrigerator is generally designated in the drawings by the reference numeral 10. The refrigerator 10 includes a refrigerator or fresh food compartment 12 and a freezer compartment 14. Doors 16 are provided for the refrigerator compartment or fresh food compartment 12 and a door 18 is provided for the freezer compartment 14. One of the doors 16 includes an ice dispenser 20, which may also include a water dispenser.

Intermediate Temperature Icemaking Compartment

An icemaking compartment or intermediate compartment 22 is provided in the refrigerator compartment 12. The icemaking compartment 22 is shown to be in one of the upper corners of the refrigerator, or fresh food, compartment 12, but other locations are also within the scope of this invention. The icemaking compartment 22 has a front cover 23 that is insulated to prevent the cold air of the icemaking compartment 22 from passing into the refrigerator compartment and opening 21 is provided that mates with chute 19 of the ice dispenser 20. A seal may be provided between the opening 21 and chute 19 to prevent cold air from passing from the icemaking compartment to the refrigerator compartment 12. Chute 19 may be adapted to engage opening 21 upon closing of door 16. Chute 19 and opening 21 may be opposingly angled as to provide added sealing upon closing of door 16. Additionally, an intermediate piece may be used to improve the seal between chute 19 and opening 21. For example, a resilient seal may be used to assist in achieving this seal. Alternatively, a spring or other elastic material or apparatus may be utilized between or about the junction of chute 19 and opening 21. Other alternatives for sealing between chute 19 and opening 21 should be evident to one skilled in the art.

Additionally, chute 19 should have a blocking mechanism located within or about it to assist in preventing or decreasing the flow of air or heat transfer within chute 19. For example, a flipper door that operates by a solenoid may be placed at the opening 21 to prevent cold air from leaving the icemaking compartment 22 and entering into the refrigerator compartment.

Preferably, the icemaking compartment 22 includes an icemaker 50 (as described below) that forms ice in an environment that is below freezing.

The icemaking compartment 22 may be integrally formed adjacent the refrigerator compartment 12 during the liner forming process and insulation filling process. In such a process the intermediate compartment may be separated on at least one side from the fresh food compartment by the refrigerator liner. Alternatively, the icemaking compartment 22 may be made or assembled remotely from the fresh food compartment and installed in the fresh food compartment 12. For example, this compartment 22 may be slid into the refrigerator compartment 12 on overhead rails (not shown) or other mounting. These methods are discussed subsequently.

The refrigerator 10 includes an evaporator 24 which cools the refrigerator compartment 12 and the freezer compartment 14. Normally, the refrigerator compartment 12 will be maintained at about 40° F. and the freezer compartment 14 will be maintained at approximately 0° F. The icemaking compartment is maintained at a temperature below 32° F. or less in order to form ice, but is preferably not as cold as the freezer compartment 14. Preferably this temperature is in the range of 20° F. The walls of the icemaking compartment are insulated to facilitate temperature control among other aspects. Grates or air vents 26 are provided in the wall 28 between the refrigerator compartment 12 and the freezer compartment 14 to allow air circulation between the compartments.

Air Ducts

Figure 5:
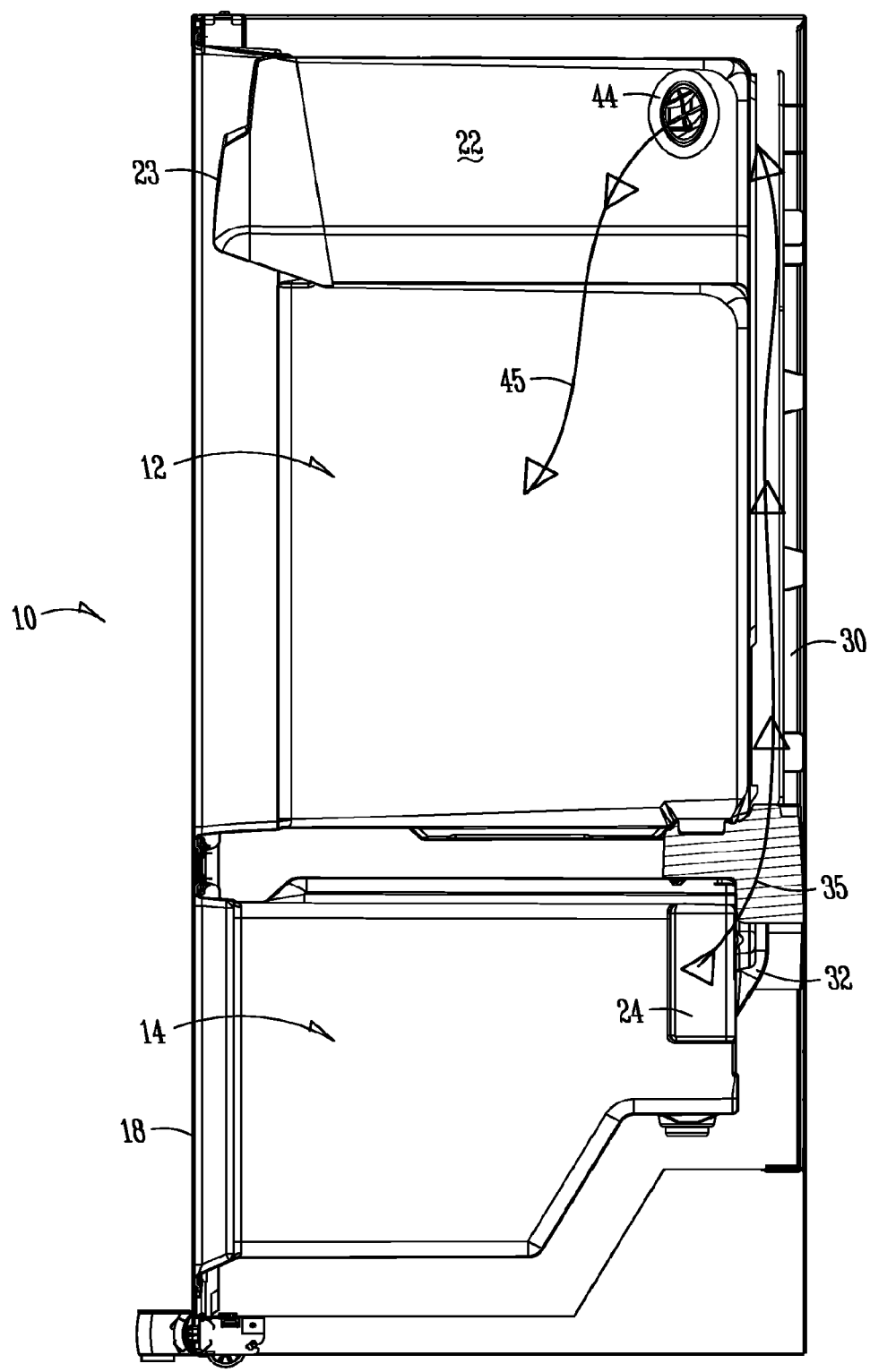
FIG. 5 is a sectional view taken along lines 5-5 of FIG. 4.

A cold air duct 30 extends between the freezer compartment 14 and the icemaking or speciality compartment 22. More particularly, the cold air duct 30 has a lower air inlet 32 within the freezer compartment 14 and an upper outlet end 34 connected to a fan 36 mounted on the back wall of the icemaker 22. The fan 36 draws cold air from the freezer compartment and forces the cold air into the icemaker 22 so as to facilitate icemaking. It is understood that the fan 36 may be located at the inlet end 32 of the cold air duct 30. The fan 36 controls the air flow from the freezer compartment 14 to the icemaking compartment 22 and may be a variable speed fan. The fan can be actuated by conventional means. The cold air duct 30 preferably resides within the rear wall of the refrigerator 10, as seen in FIG. 5. The arrow 35 designates the air flow through the cold air duct 30.

Figure 6:
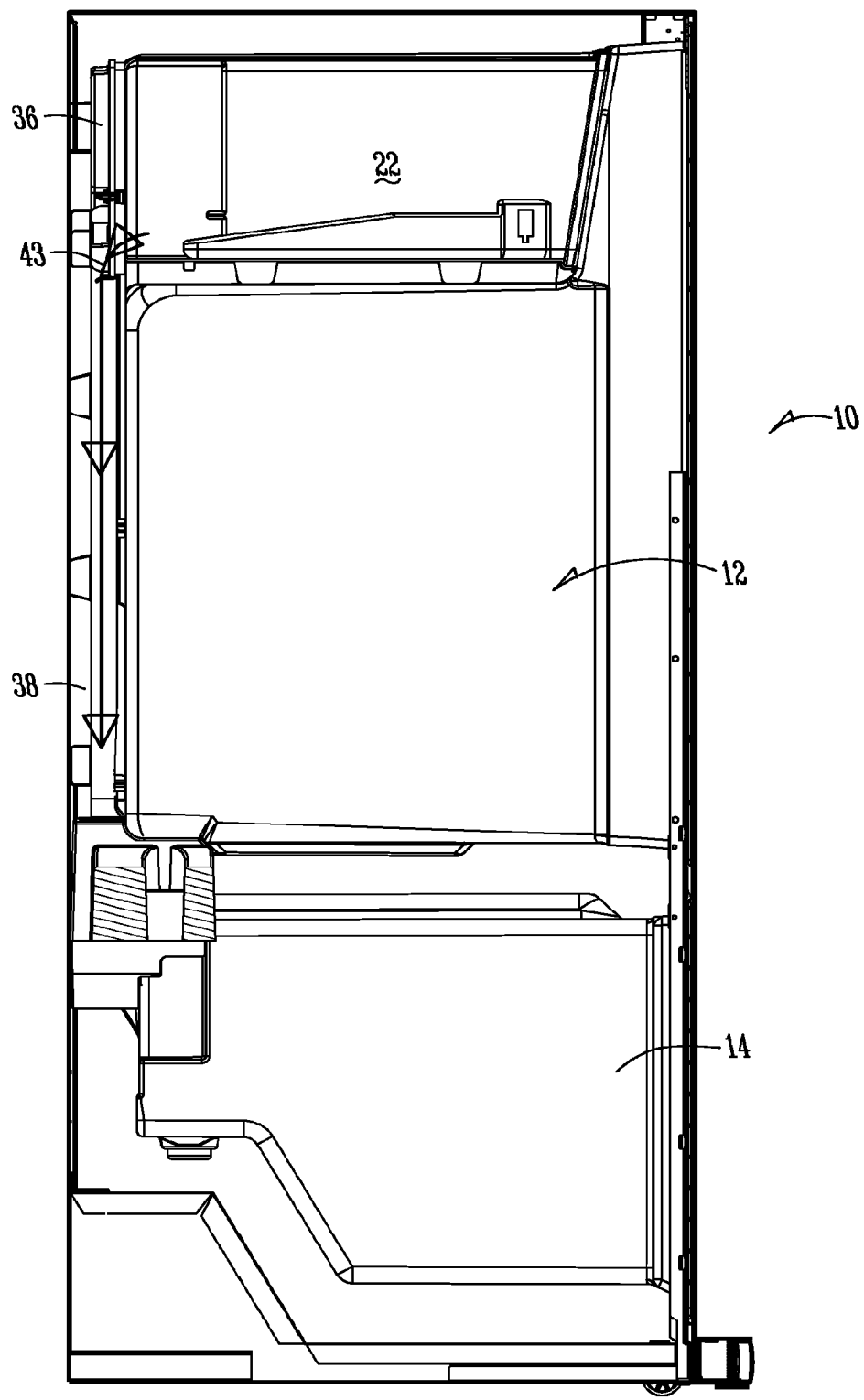
FIG. 6 is a sectional view taken along lines 6-6 of FIG. 4.
Figure 11:
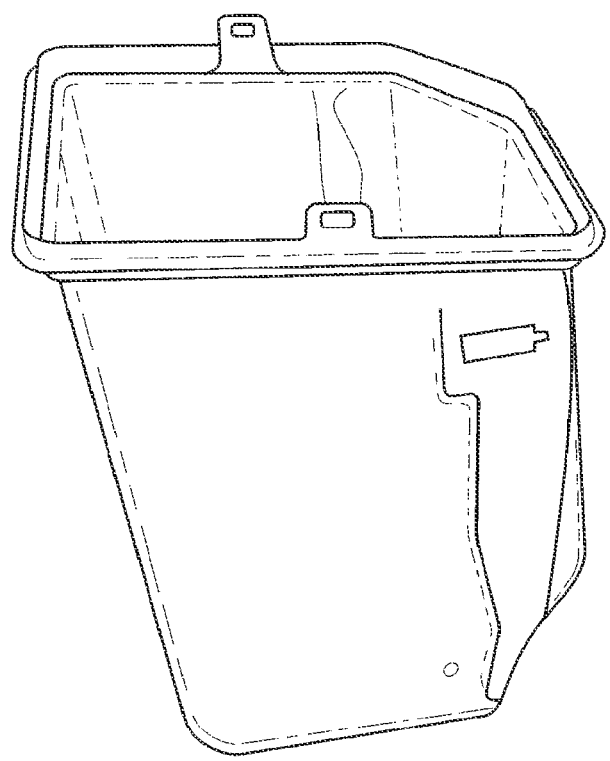
FIG. 11 is a perspective view of the ice box which mounts to the liner in accordance with one embodiment of the present invention.
Figure 10:
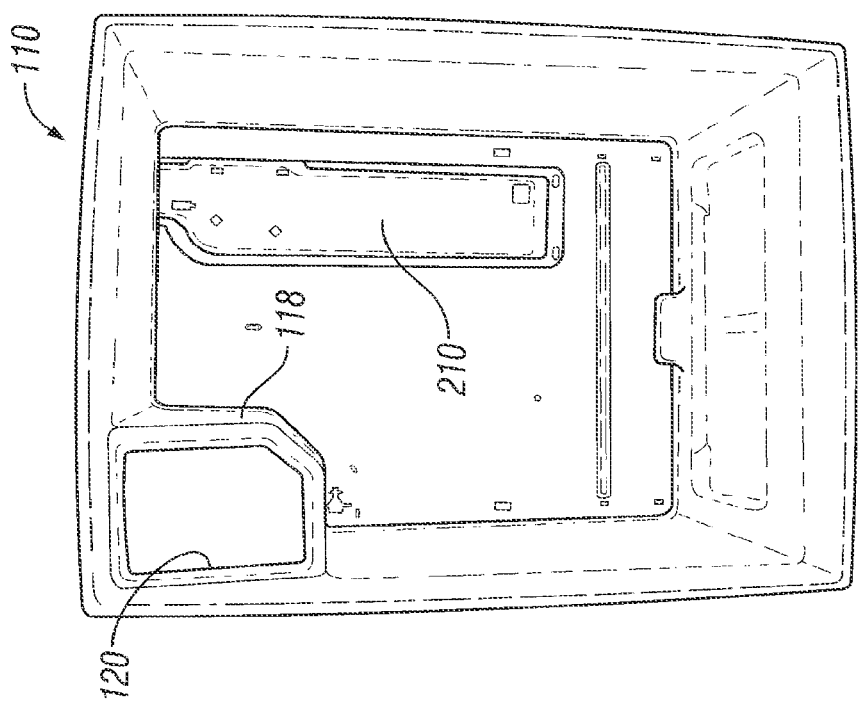
FIG. 10 is a side elevation view of the liner shown in FIG. 8.
Figure 12:
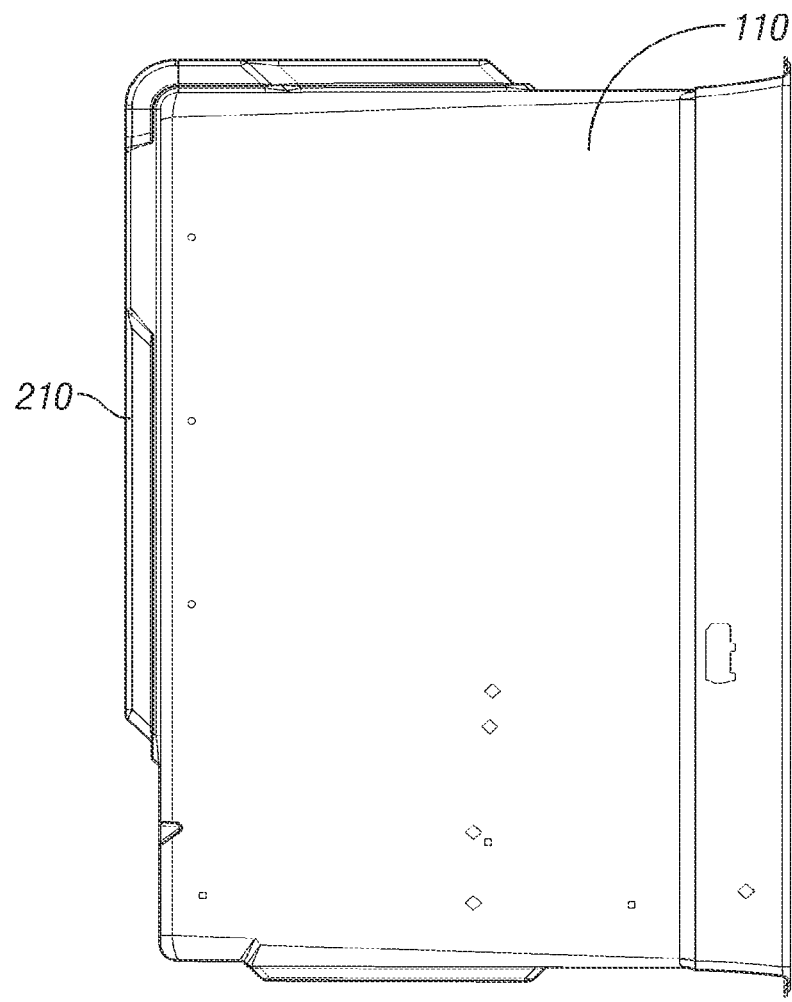
FIG. 12 is a right side elevation view of the fresh food compartment liner showing the water tank recess formed in the rear wall.
Figure 13:
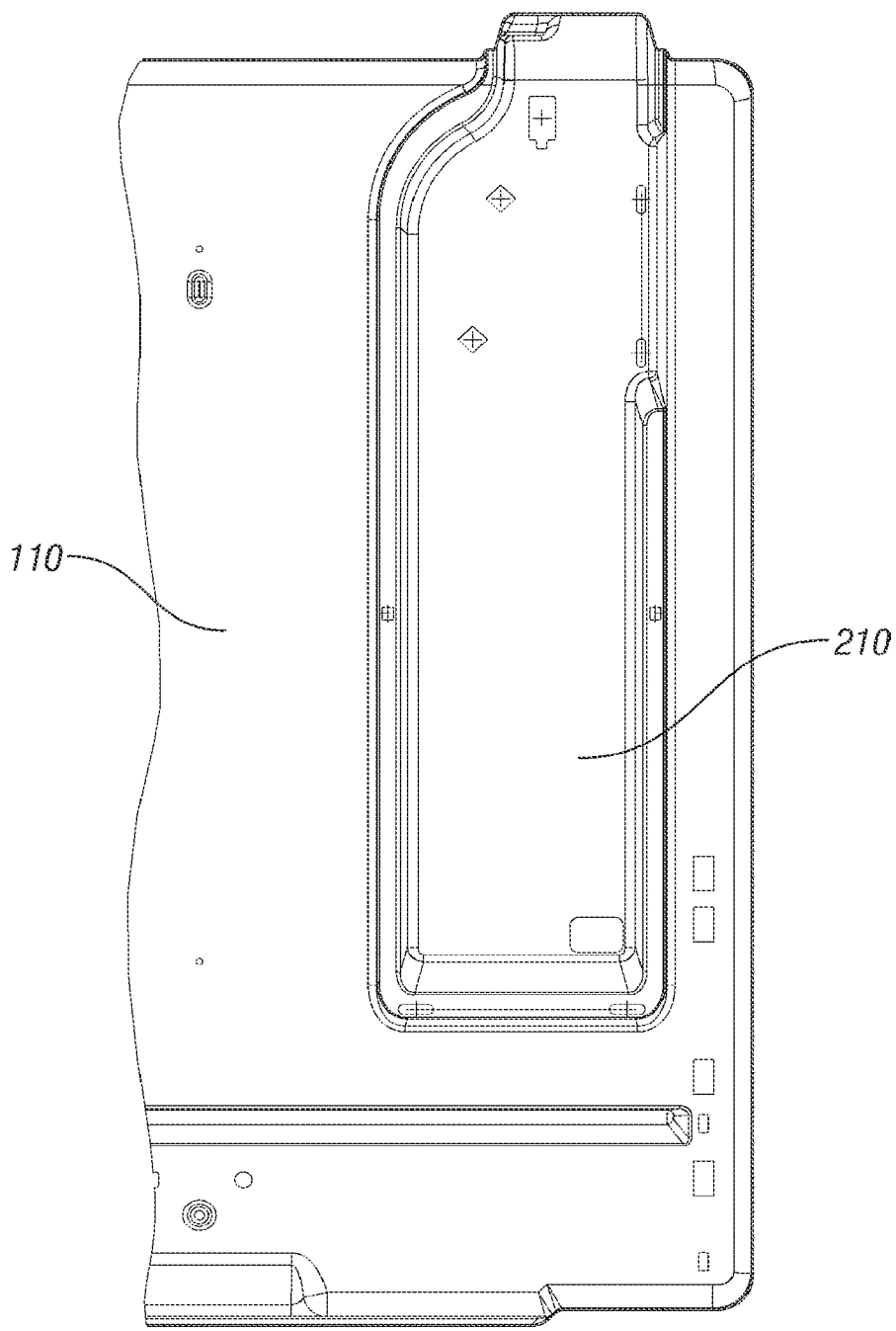
FIG. 13 is a partial front elevation view of the fresh food compartment liner showing the water tank recess.
Figure 14:
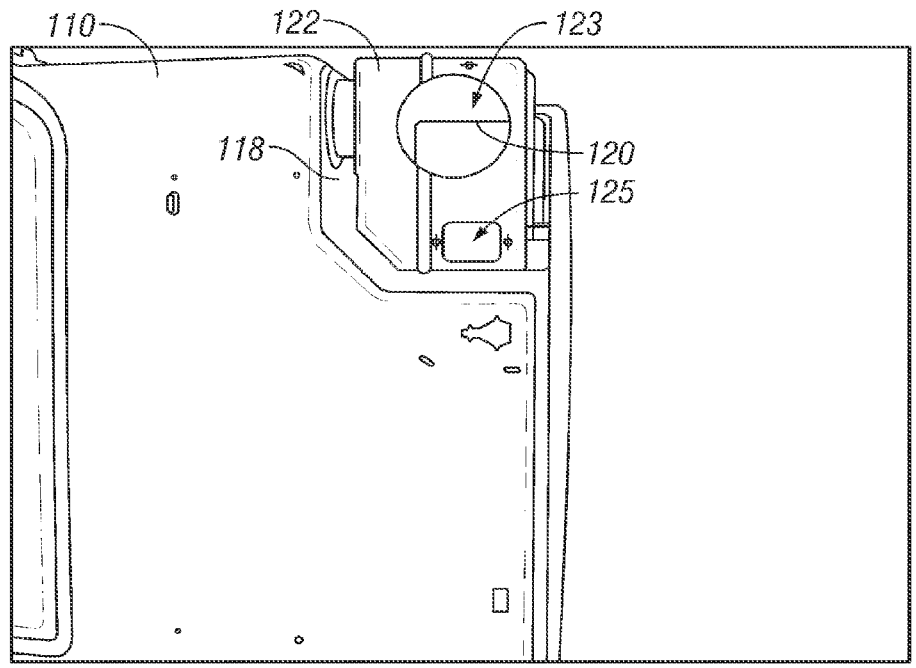
FIG. 14 is a rear perspective view of the fresh food compartment liner with the ice box installed within the outer shell of the fresh food compartment.
Figure 15:
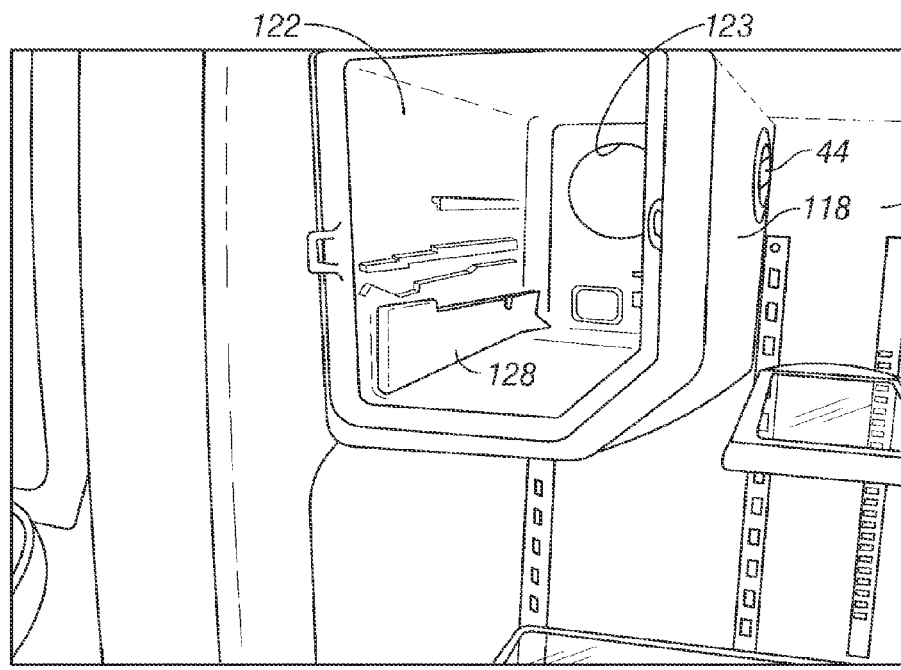
FIG. 15 is a front perspective view of the fresh food compartment with the ice maker and pan assembly removed for clarity.
Figure 16:
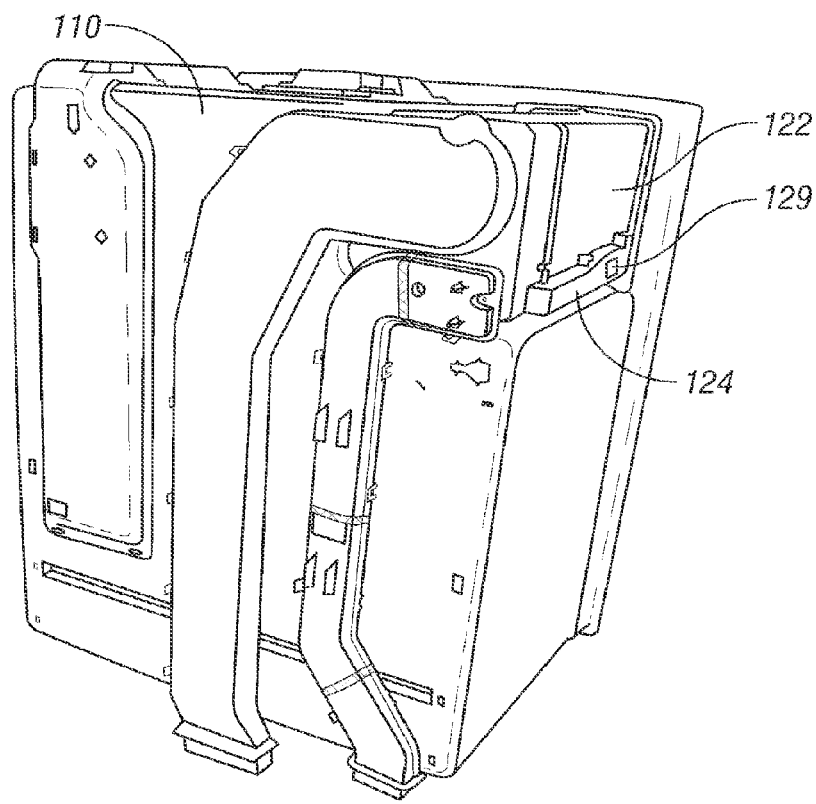
FIG. 16 is a perspective view of the liner, box and air ducts provided for the icemaking compartment.
Figure 17:
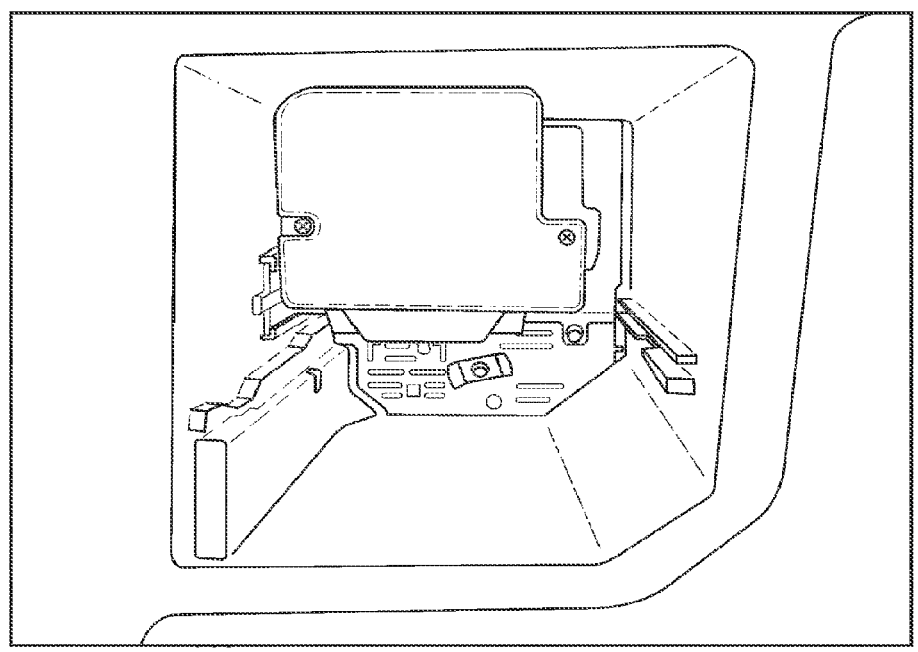
FIG. 17 is a front elevation view of the ice compartment with the pan assembly moved for clarity.

The refrigerator 10 also includes a return air duct 38 having an upper end 40 connected to the icemaker 22, and a lower end 42 terminating adjacent one of the air grates 26. Alternatively, the lower end 42 of the return air duct 38 may extend into the freezer compartment 14. Preferably, the return air duct 38 resides within the rear wall of the refrigerator 10, as seen in FIG. 6.

Figure 3:
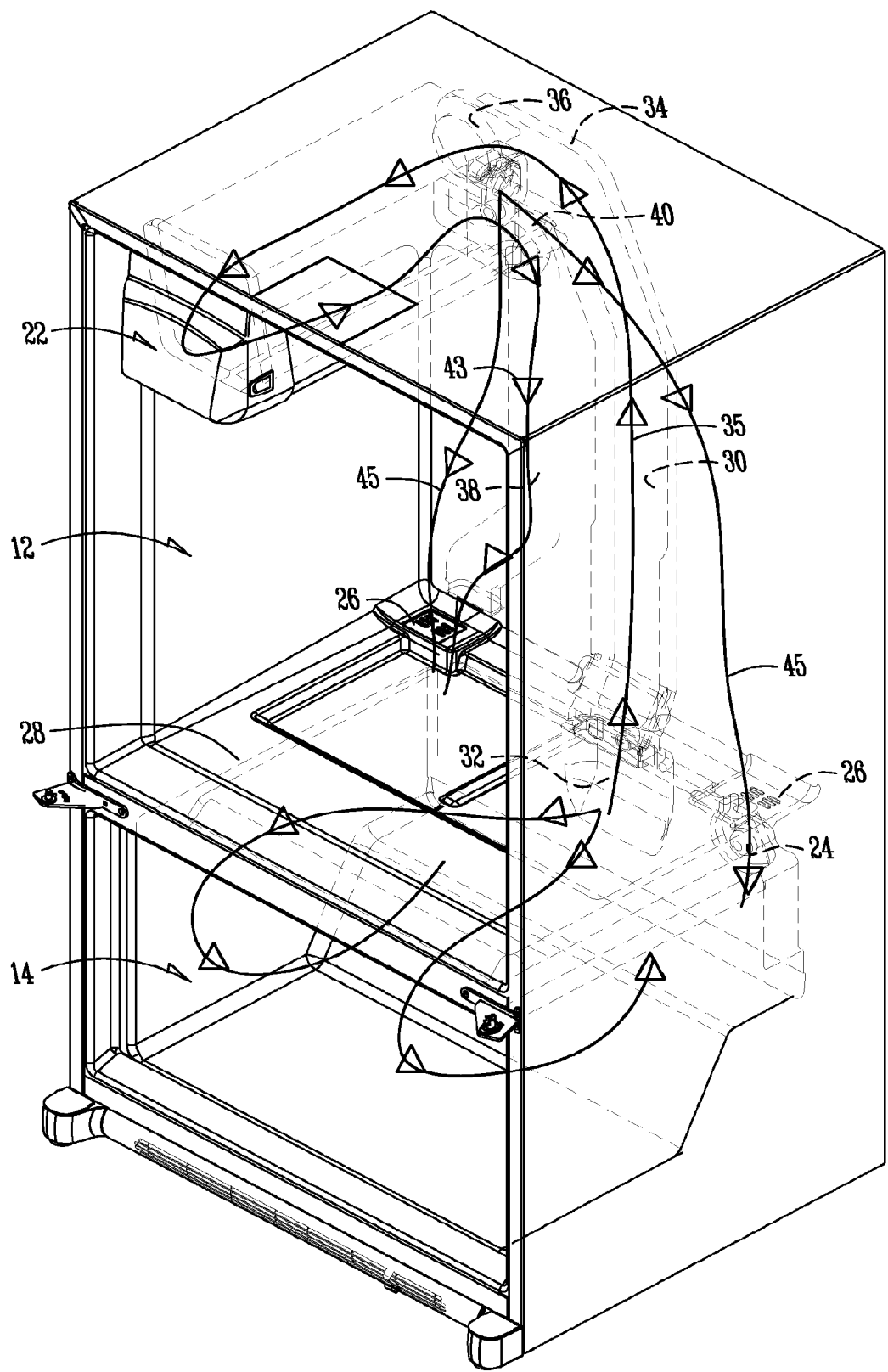
FIG. 3 is a view similar to FIG. 2 showing the cold air duct and return air duct for the icemaking compartment.

The icemaking compartment 22 also has an air vent for discharging air into the refrigerator compartment 14. Thus, a portion of the air from the icemaking compartment 22 is directed through the return air duct 38 to the freezer compartment 14, as indicated by arrow 43 in FIG. 3, and another portion of the icemaking compartment air is vented through the opening 44 into the refrigerator compartment 12, as indicated by arrows 45 in FIG. 3.

Figure 4:
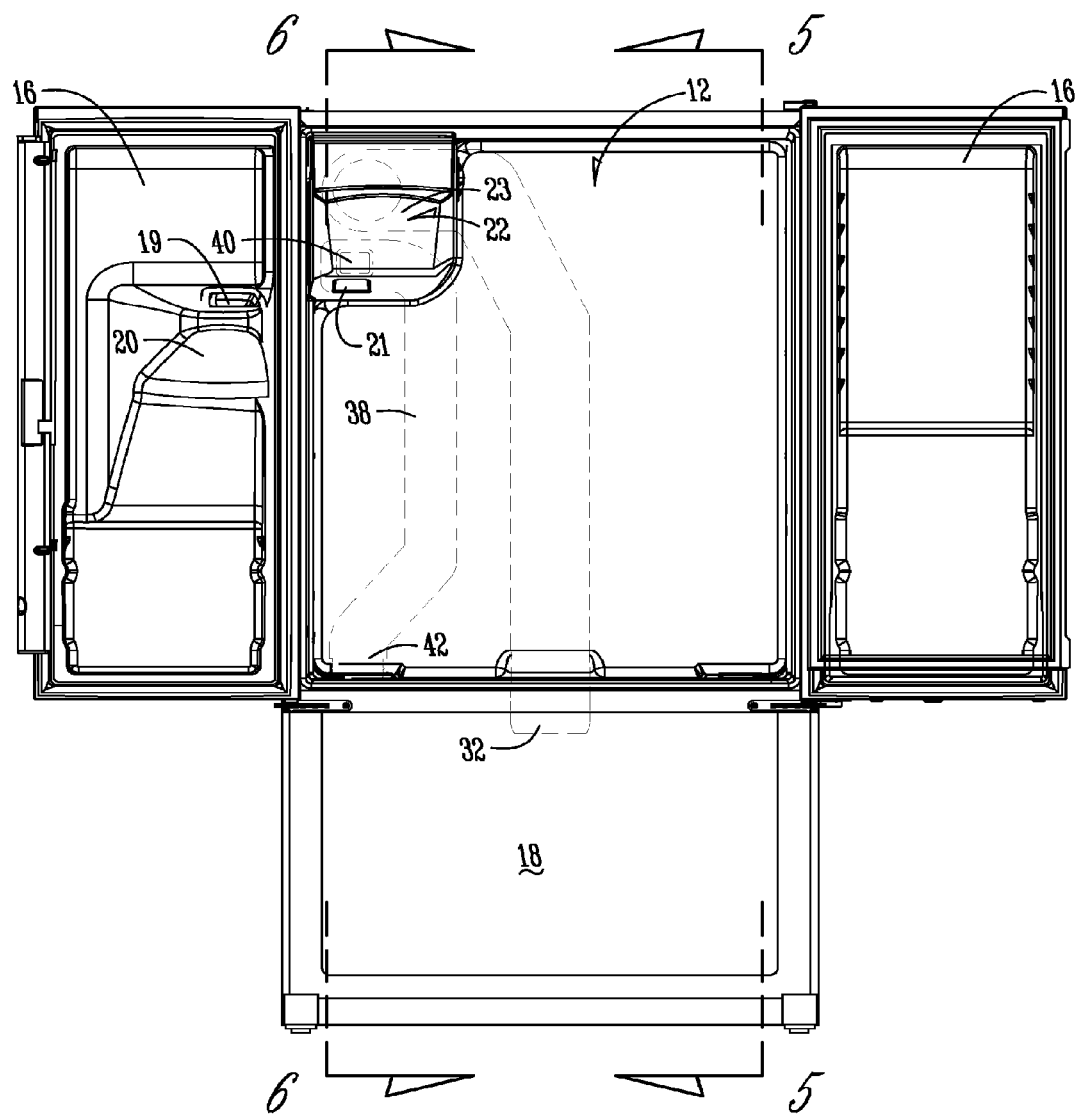
FIG. 4 is a front elevation view of the bottom mount refrigerator of the present invention with the doors open, and illustrating the cold air and return air ducts.

As seen in FIG. 4, the ice is discharged from the icemaker 22 in any conventional manner. Similarly, the ice dispenser 20 functions in a conventional manner.

Icemaker

As seen in FIG. 7, an icemaker 50 is positioned within the icemaking compartment 22 with the ice storage area 54 with auger (not shown) removed for clarity. The icemaker 50 is mounted to an impingement duct 52. The impingement duct receives freezer air coming from the freezer compartment through the cold air duct 30 and the fan assembly 36. The opening 44 vents air into the refrigerator compartment 12. The auger assembly (not shown) is provided beneath the icemaker 50 along with an ice storage bin with an insulated cover 23. Impingement on the ice maker, as well as other aspects of ice making, is disclosed in Applicant's concurrently filed U.S. application Ser. No. 11/140,100 entitled REFRIGERATOR WITH IMPROVED ICEMAKER, filed on May 27, 2005 and is hereby incorporated by reference.

Control System (Generally)

As described in more detail below, a control system is provided that utilizes the icemaking compartment 22, the cold air supply duct 30, the return air duct 38, the variable speed icemaking fan 36, icemaking impingement air duct 52, an icemaking compartment thermistor (not shown), an icemaking compartment electronic control damper, fresh food air return ducts 26, and a fresh food compartment thermistor (not shown). The above components are controlled by an algorithm that prioritizes the making of ice unless the fresh food temperature exceeds the set point temperature. This prioritization is achieved as follows:

i. When ice is a priority, the fresh food damper is closed and the fan runs at optimum speed. In this way, supply air from the freezer compartment 14 is discharged through the impingement air duct 52, through the ice storage area 54, and through the icemaking compartment return air duct 38. One of the results of this air flow, is that ice is made at the highest rate.

ii. When the refrigerator compartment 12 is above set point, the electronic control damper opens and the fan runs at optimum speed. The supply air to the icemaking compartment is routed almost entirely into the fresh food compartment which forces the warmer air to return to the evaporator coil of the refrigerator. This achieves a rapid return to the fresh food set point after which the damper closes and the icemaking resumes.

iii. When the ice bin is full and the fresh food temperature is satisfied, the icemaking fan runs at minimum speed. Aspects of this will include: reduced energy consumption; reduced sound levels; and minimized sublimation of ice.

The above control system permits precision control of both the icemaking compartment 22 and the refrigeration compartment 12 separately, yet minimizes the complexity and the number of component parts necessary to do so.

Thermoelectric Alternative

A thermoelectric unit (not shown) may replace the impingement duct 52 with some concessions. Preferably the thermoelectric unit would contour about the icemaker as it effectively pulls heat out of the water. Alternatively, the thermoelectric unit could be the icemaker. Regardless, it should be understood that additionally, the thermoelectric unit would require a heat sink outside of the icemaking compartment 22 to dissipate heat. A careful balance is required between the voltage of the thermoelectric unit and the temperature of the refrigerator compartment 12 if the heat sink is in the refrigerator compartment 12. For example, the higher the voltage, the more heat will be generated that will be required to be removed from the refrigerator compartment 12. A portion of the heat generated by the thermoelectric unit may be removed by venting freezer compartment air to the thermoelectric unit.

Integral Icemaking Compartment

Figure 37:
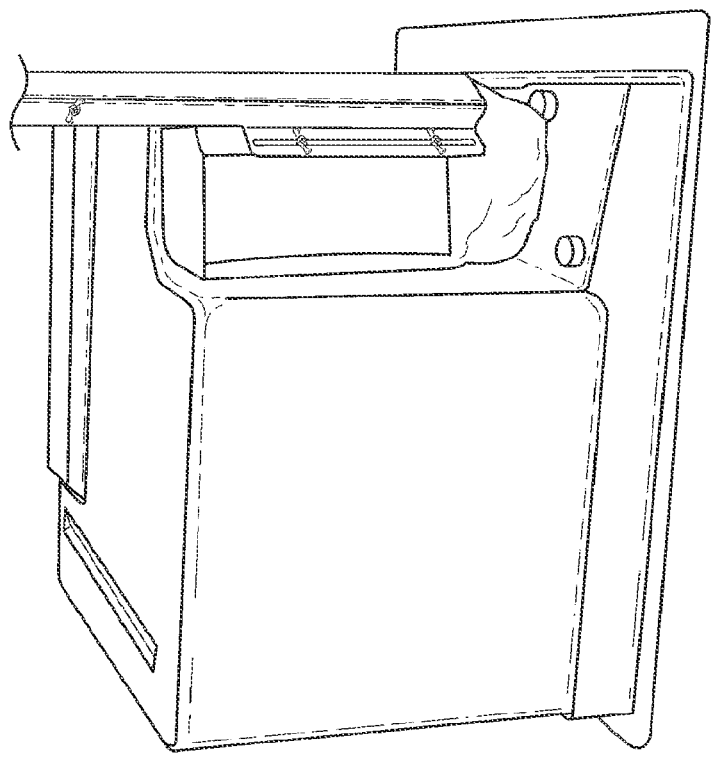
FIG. 37 is a view similar to 36 showing the plug inserted for formation of the icemaking compartment.

FIGS. 8-25 and 33-35 show the preferred embodiment of the icemaking compartment 22, wherein the compartment 22 is integrally formed with the liner 110 of the fresh food compartment 12. The integral formation of the ice compartment 22 takes place during the molding of the fresh food compartment liner 110. The liner 110 is formed in a conventional manner from a flat sheet of material using male and female molds 112, 114, as seen in FIGS. 36 and 37. The sheet material is heated and then placed between the open molds 112, 114, which are then closed in a vacuum box. Simultaneously, a three-dimensional plug 116 is moved in a direction opposite the male mold 112 so as to deform the sheet material from the rear side opposite the male mold 112. Alternatively, the plug 116 can be stationary and the liner 110 formed around the plug 116. The plug 116 forms a notch 117 in an upper corner of the liner 110. The notch 117 defines an outer shell 118 of the ice compartment 22. Thus, the outer shell 118 is integrally formed with the liner 110 of the fresh food compartment 12. After the liner 110 and the outer shell 118 are completely formed, the plug 116 is withdrawn and the male mold 112 is separated from the female mold 114. The liner 110 with the outer shell 118 of the ice compartment 22 is then removed and cooled. The front wall of the outer shell 118 is punched or cut so as to form an opening 120. A second hole 121 is punched or cut in the shell 118 for the air vent 44. The liner 112 is then moved to a punch station to trim the edges of the liner 110.

The ice compartment 22 includes a box 122 which is inserted through the front opening 120 into the outer shell 118 so as to define an inner shell. The space between the outer shell 118 and the box or inner shell 122 is filled with an insulating foam, such that the ice compartment 22 is insulated. This insulation process may take place at the same time that insulation is applied between the liner 110 and the outer cabinet of the refrigerator 10. The ice box 122 includes a rear hole 123 for connection to the cold air duct 30, a second rear hole 125 for connection to the return air duct 38, and a side hole 127 for the vent opening 44.

Modular Icemaking Compartment

Figure 38:
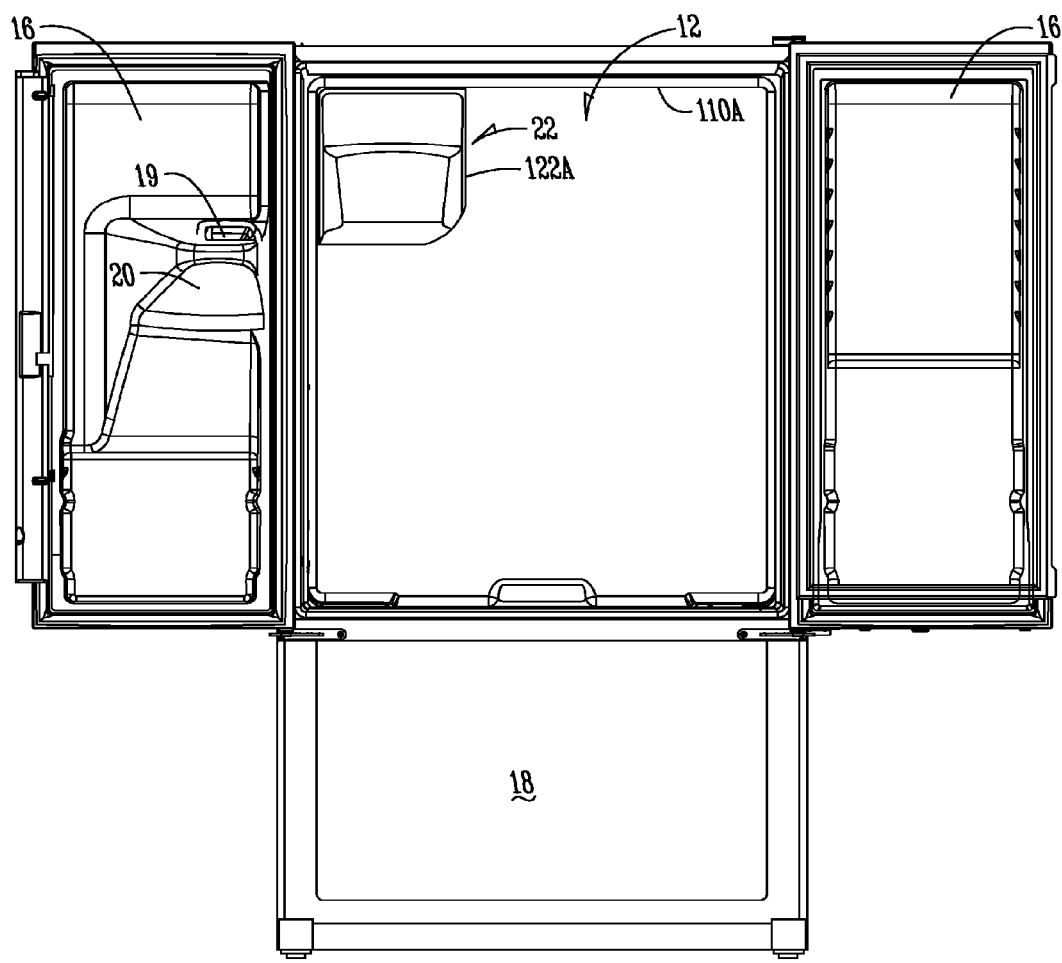
FIG. 38 is a view of an alternative embodiment of an icemaking compartment formed separately from the fresh food compartment liner and mounted therein.
Figure 39:
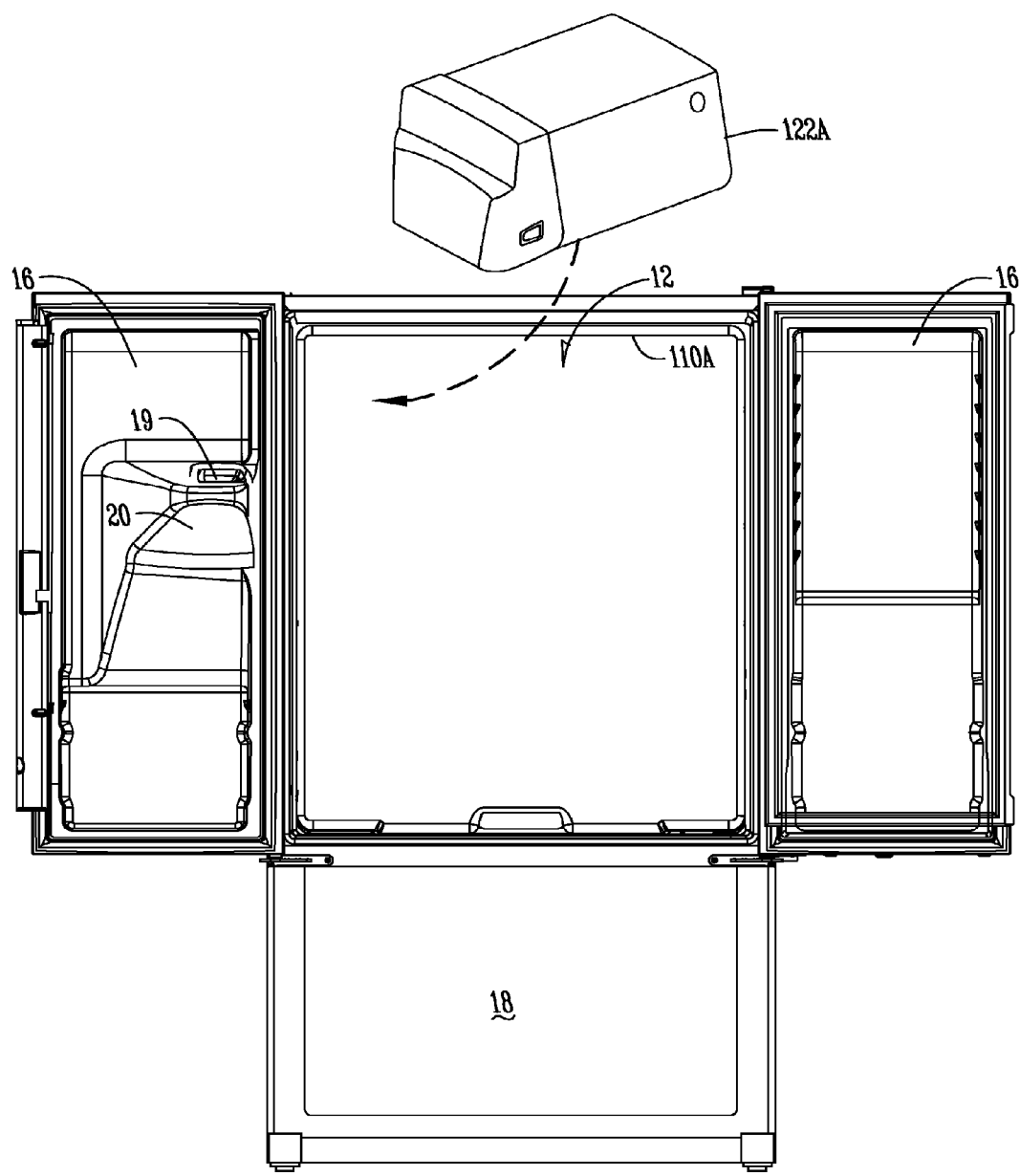
FIG. 39 is an exploded view of the separate ice compartment of the alternative embodiment.

As an alternative to an icemaking compartment formed integrally in the liner 110, the compartment 22 can be formed separately and then attached to the liner. This modular compartment is shown in FIGS. 38 and 39, and includes the liner 110A of the fresh food compartment, and the ice box 122A, which preferably is insulated. All other features and components of the compartment 22 are the same, other than how it is made. The modular unit can be mounted anywhere in the fresh food compartment 12.

Wire Harness

Figure 18:
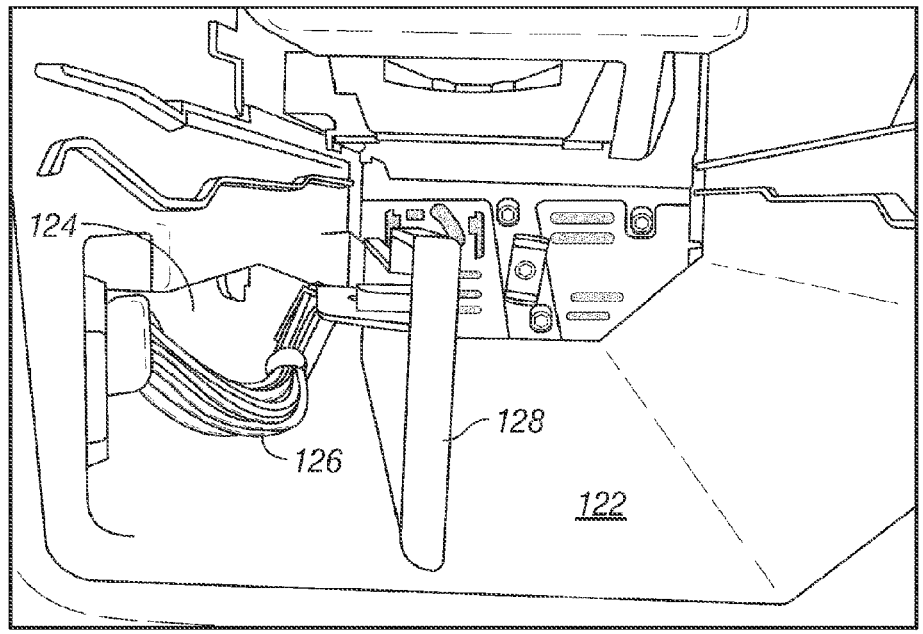
FIG. 18 is a view showing an internal portion of the icemaking compartment with a wire harness cavity in an open position.
Figure 19:
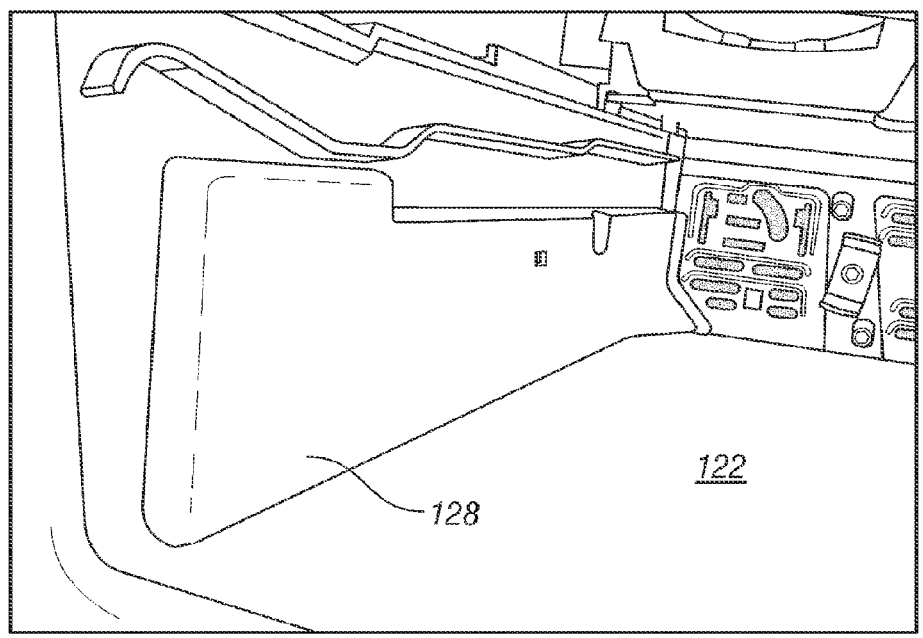
FIG. 19 is a view similar to FIG. 16 showing the wire harness cavity with a cover installed.
Figure 20:
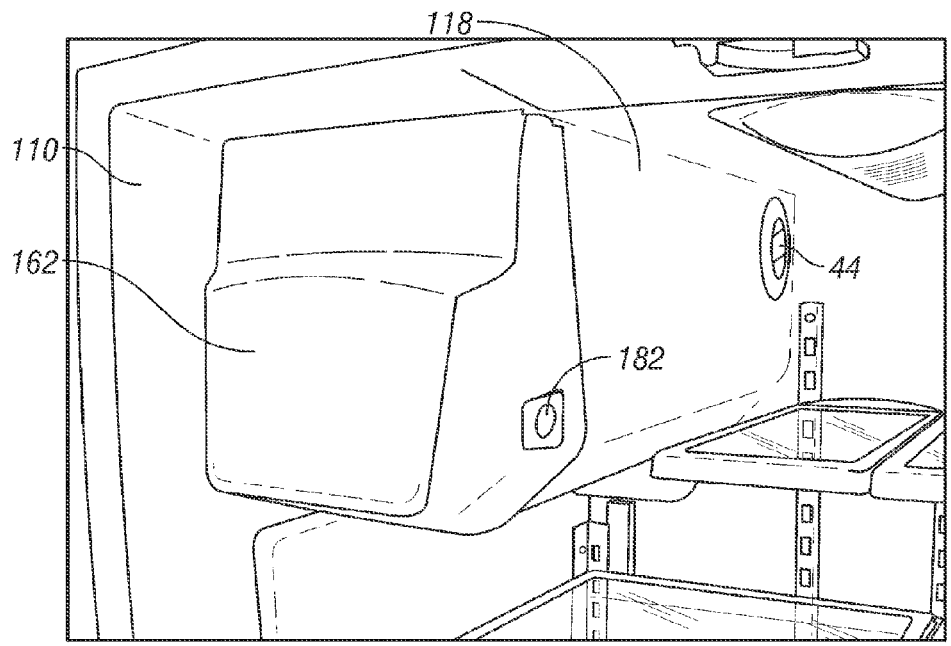
FIG. 20 is a perspective view from the front of the icemaker showing the bin and front cover in a closed position.
Figure 21:
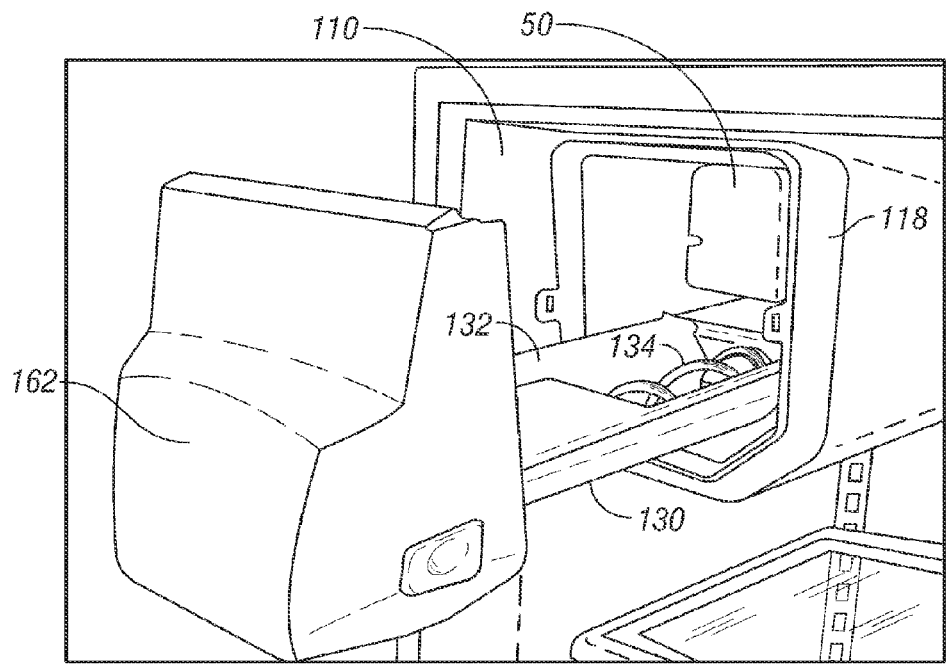
FIG. 21 is a view similar to FIG. 14 showing the bin and front cover in an open position.

The ice compartment 22 is adapted to receive the icemaker 50, which is mounted therein using any convenient means. The ice box 122 includes a recess 124 adapted to receive the wire harness 126 for the icemaker 50. The wire harness 126 may be adapted to allow for connection to the icemaker 50 prior to complete insertion or mounting of the ice maker 50 into the compartment 12. For example, the wire harness 126 may be adapted to be operatively connected to the refrigerator 10 near the front portion of ice box 122 to allow for sufficient travel of the ice maker upon insertion or mounting of the ice maker 50. As shown in FIG. 18, wire harness 126 is operatively connected at the rearward portion of ice maker 50. In this case, an assembler may connect the wire harness 126 to the ice maker 50 and/or the refrigerator 10 prior to fully inserting or mounting ice maker 50 into ice box 122.

A cover 128 may be provided for the wire harness recess 124 so as to enclose the wire harness 126 prior to connecting the harness 126 to the icemaker 50. The ice box 122 has a hole 129 in a side wall to mount the connector or clip of the wire harness.

Ice Bin Assembly

Figure 22:
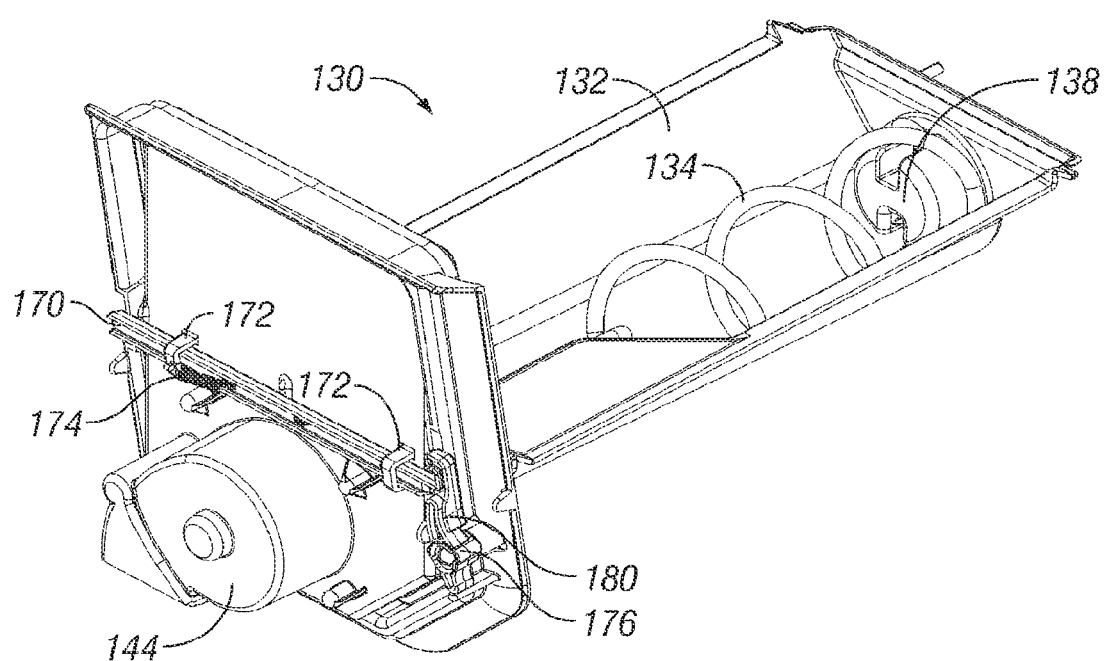
FIG. 22 is a perspective view of the ice pan, auger and motor assembly.
Figure 23:
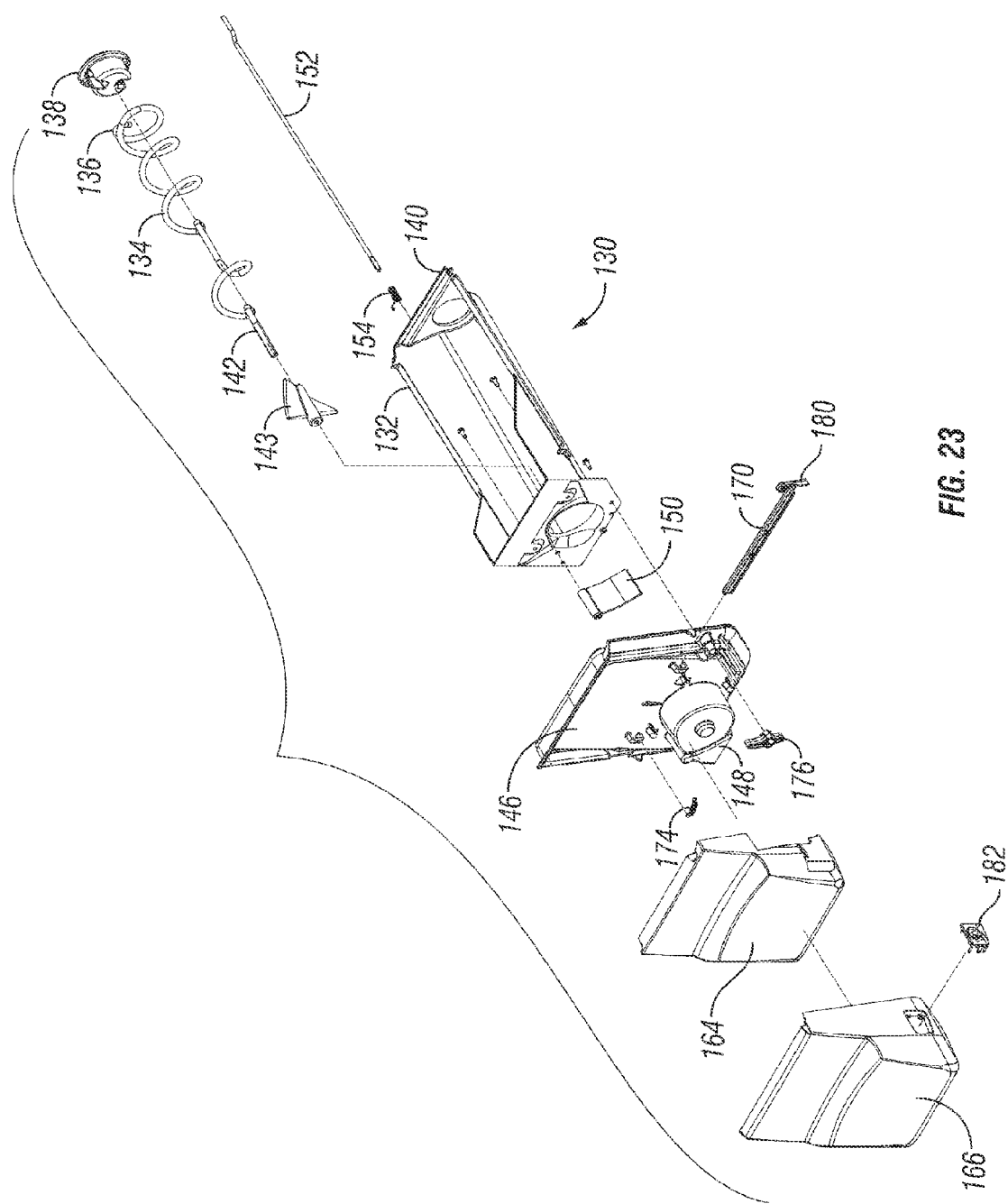
FIG. 23 is an exploded view of the ice pan, auger and motor assembly.
Figure 24:
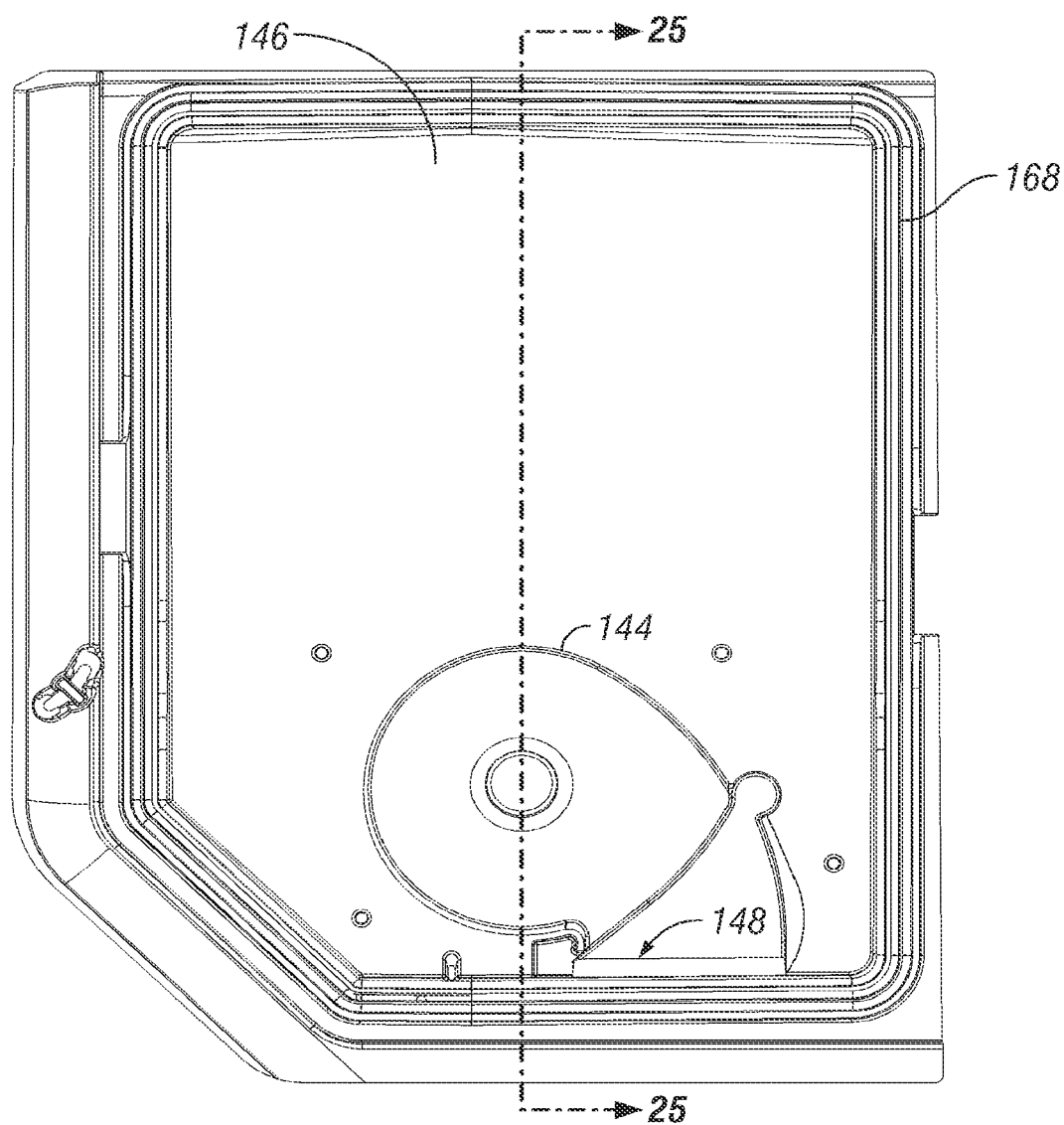
FIG. 24 is a rear elevation view of the bin assembly seal for the icemaking compartment.
Figure 25:
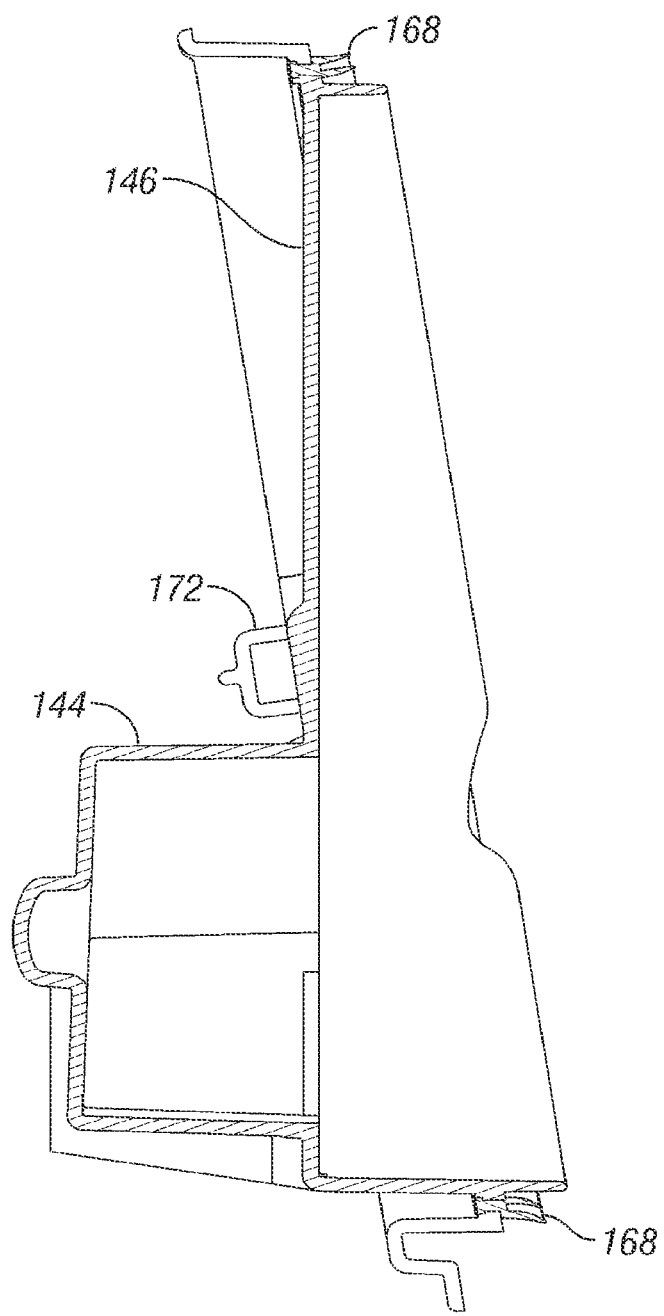
FIG. 25 is a sectional view taken along lines 25-25 of FIG. 24.
Figure 26:
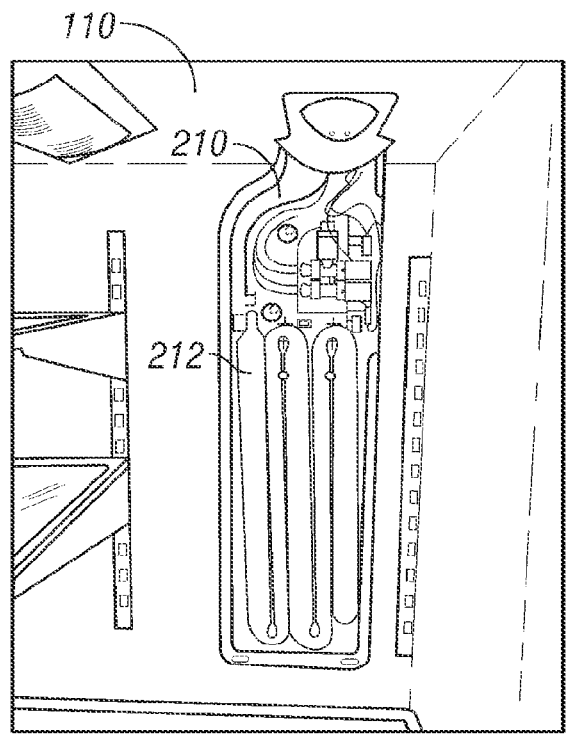
FIG. 26 is a front view of the water cavity formed within the rear wall of the fresh food compartment, with the water tank assembly mounted therein.
Figure 27:
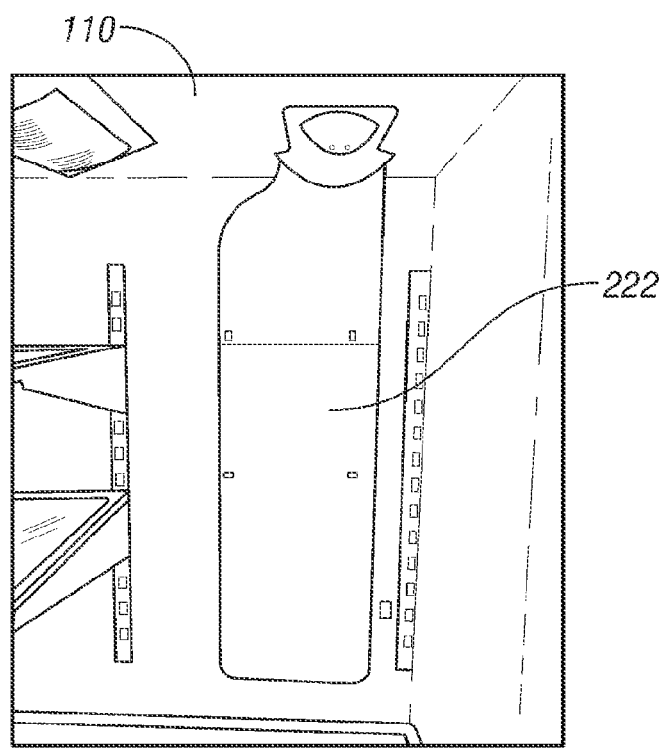
FIG. 27 is a front view of the fresh food compartment showing the cover installed over the water tank cavity.

The ice compartment 22 also includes an ice bin assembly 130. The assembly 130 is removable for assembly, service, and user access to bulk ice storage. The components of the bin assembly 130 are shown in FIGS. 22 and 23. The bin assembly 130 includes a tray or bin 132 for receiving ice from the icemaker 50. An auger 134 is mounted within the tray 132, with the first end 136 of the auger 134 being received in a motor 138 which is mounted in the upstream end 140 of the tray 132. The second end 142 of the auger 134 is mounted in a housing 144 on a front plate 146 of the bin assembly 130. A short piece of auger flighting 143 is provided on the second end 142 of the auger 134, within the housing 144. The housing 144 includes an outlet opening 148, with a flipper door 150 in the housing 144 to control opening and closing of the outlet opening 148. The flipper door 150 is mounted upon a shaft 152 extending through the tray 132. A spring 154 mounted on the shaft 152 engages the flipper door 150 to normally bias the door 150 to a closed position over the outlet opening 148. The shaft 152 can be turned by a solenoid (not shown) so as to move the flipper door 150 to an open position relative to the outlet opening 148, such that ice can be discharged from the tray 132 to the dispenser 20.

Front Cover Seal

A two-piece front cover 162 is provided on the bin assembly 130. A front cover 162 includes an inner panel 164 and an outer panel 166, as best seen in FIG. 23. Insulation is provided between the inner and outer panels 164, 166, such that the front cover 162 is insulated. The inner panel 164 mounts onto the front plate 146 of the bin assembly 130. A seal or compressible gasket 168 (FIG. 24) is provided around the outer perimeter front plate 146 so that when the bin assembly 130 is installed into the ice box 122, an air-tight seal is provided between the bin assembly 130 and the front opening 120 of the ice compartment 22. The seal 168 helps maintain the lower temperature of the icemaking compartment 22, as compared to the higher temperature of the fresh food compartment 12.

The front cover 162 includes a latch mechanism for releasably locking the cover 162 to the ice compartment 22. The latch mechanism includes a lock bar 170 extending through a pair of collars 172 on the front plate 146 of the bin assembly 130 for lateral sliding movement between a locked and unlocked position. The lock bar 170 is normally biased to the locked position by a spring 174. A cam 176 is mounted on a peg 178 on the front plate 146 of the bin assembly 130 and is adapted to engage a flange or finger 180 on the end of the lock bar 170. The cam 176 overcomes the bias of the spring 74 when actuated by a finger button 182 mounted on the outer panel 166, so as to release the front cover 162 for removal of the bin assembly 130. Thus, the bin assembly 130 can be slid into the ice box 122 and retained with an air-tight seal to maintain the temperature of the ice compartment 22. A user can depress the button 182 on the bin assembly 130 to release the lock bar 170 for removal of the bin assembly 130 from the ice box 122.

Air Impingement

Figure 33:
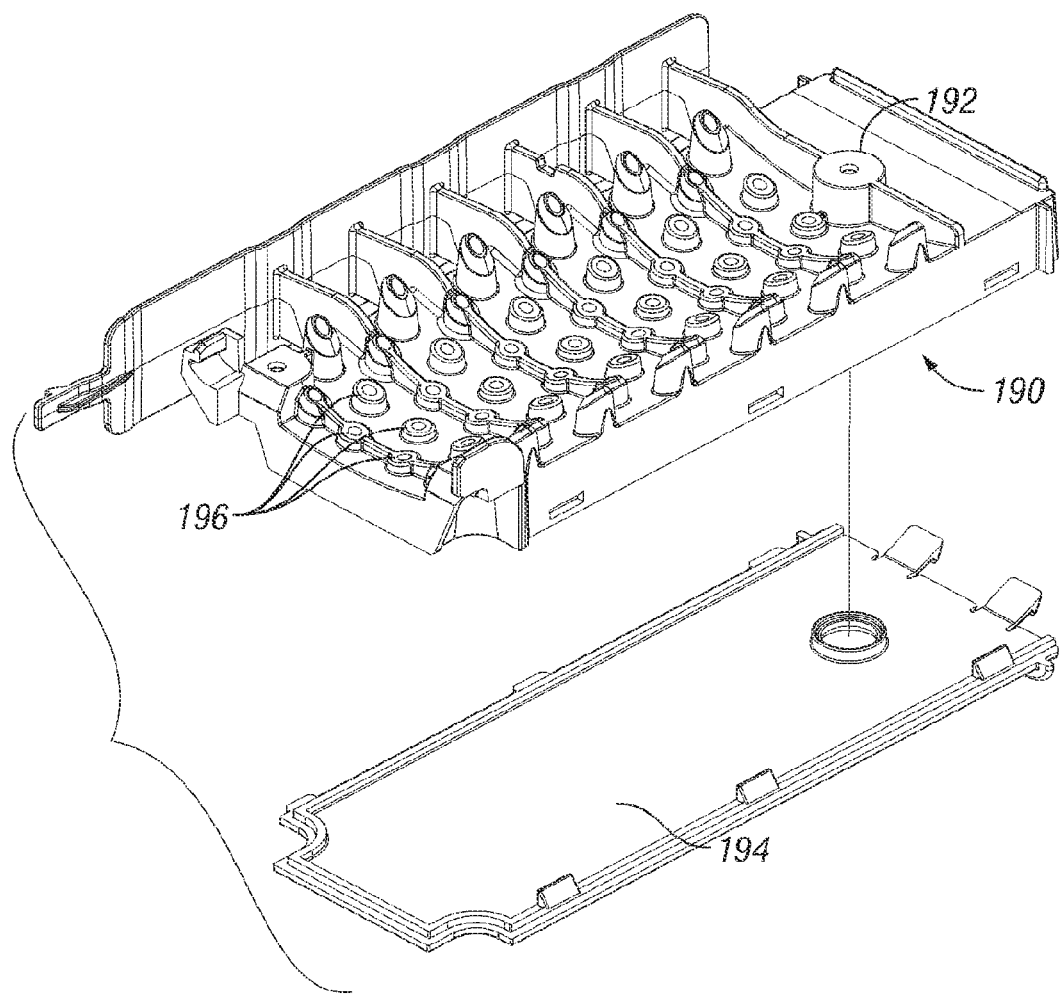
FIG. 33 is an exploded perspective view of the air impingement system of the present invention.
Figure 34:
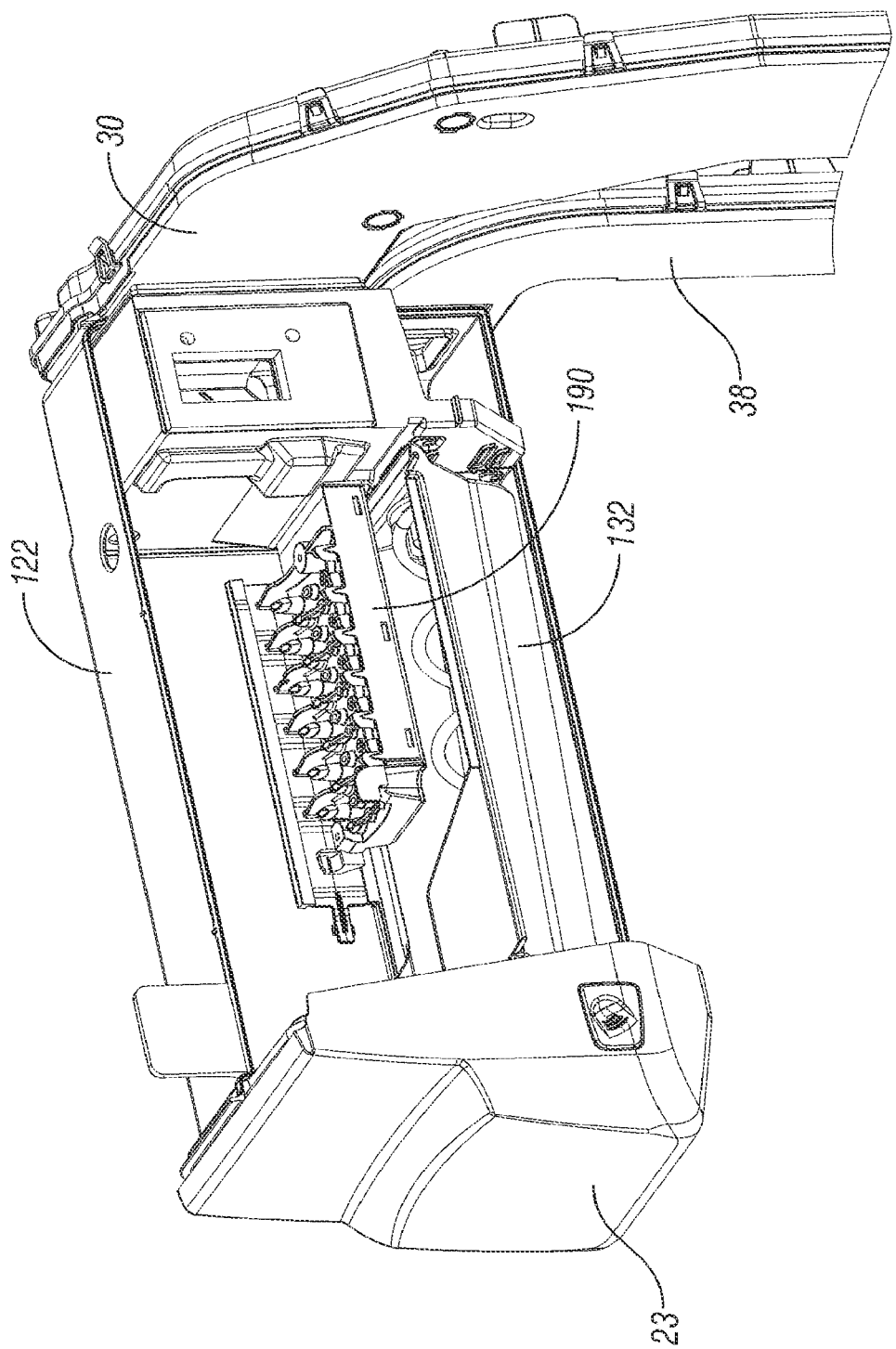
FIG. 34 is an assembled perspective view of the air impingement system in the ice box.
Figure 35:
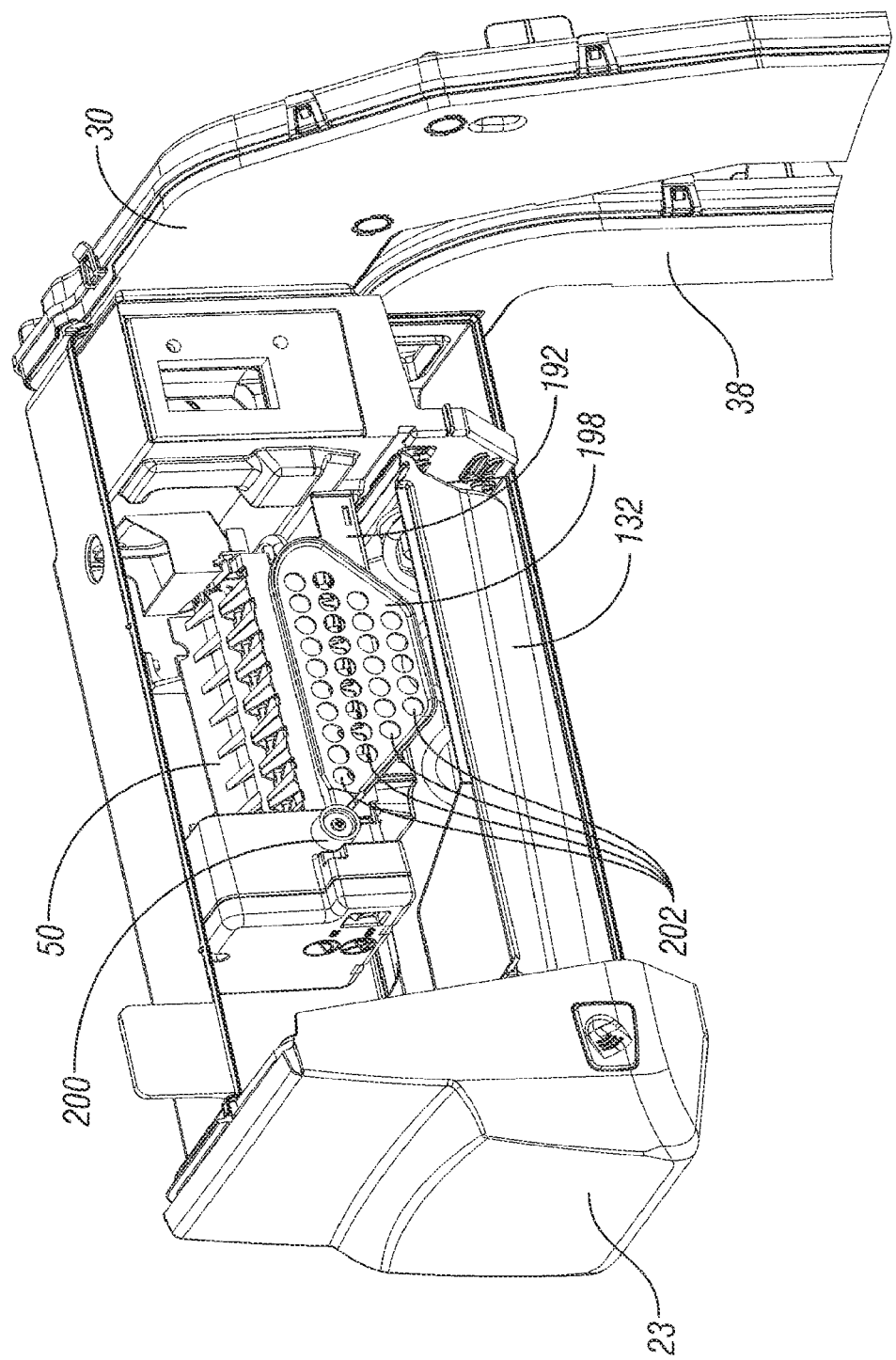
FIG. 35 is an assembled perspective view of the ice maker in the ice box.
Figure 36:
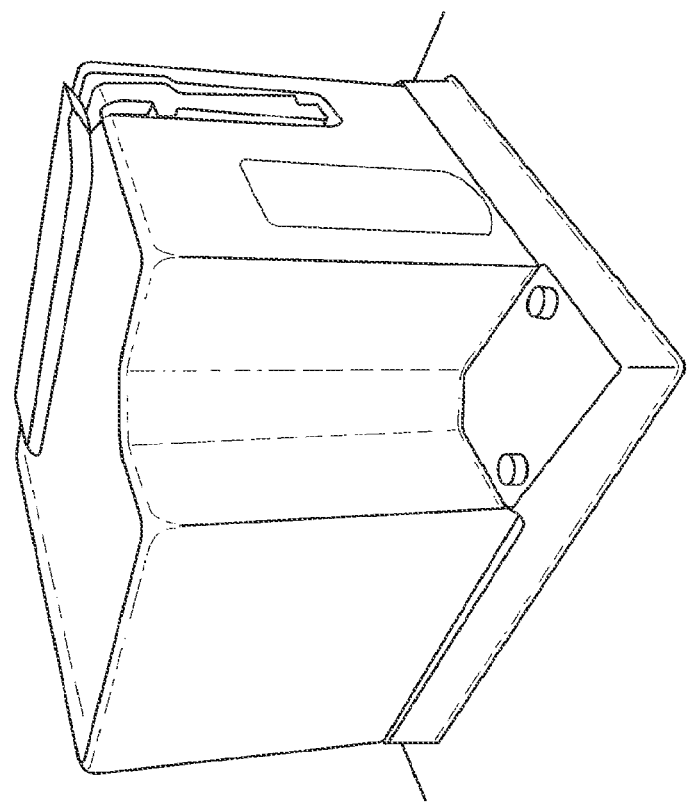
FIG. 36 is a view showing the male mold for forming the liner of the fresh food compartment according to the preferred embodiment of the present invention.

Another component of the icemaker 50 is an air impingement assembly 190, as shown in FIGS. 33-35. The impingement assembly 190 includes a manifold 192 and a bottom plate 194 which define an air plenum therebetween. The manifold 192 includes a plurality of holes or nozzles 196. The manifold 192 is operatively connected to the cold air duct 30 so the cold air from the freezer compartment 14 is directed into the manifold 192 by the fan 36, and through the impingement nozzles 196 onto the bottom of the mold of the icemaker 50, as best seen in FIG. 34.

The nozzles 196 are shown to be round, but may also be slotted, or any other shape. The nozzles 196 are preferably arranged in staggered rows. The diameter of the nozzles 196, the spacing between the nozzles 196, and the distance between the nozzles 196 and the ice mold are optimally designed to obtain the largest heat transfer coefficient for a prescribed air flow rate. For example, in a preferred embodiment, the nozzles 196 are round with a diameter of 0.2-0.25 inches, with a spacing of approximately 1.5 inches between adjacent nozzles, and a distance of 0.5-1.0 inches from the surface of the icemaker 50. The alignment of the nozzles 196 with the ice mold preferably avoids direct air impingement on the first two ice cube slots near the icemaker thermostat so as to avoid hollow ice production.

The air impingement assembly 190 speeds ice production by 2-3 times so as to meet large requirements of ice. The impingement assembly 190 is also compact so as to permit increased ice storage space in a larger sized tray 132.

Bale Plate

The ice maker 50 includes a bale plate 198 which shuts off the ice maker 50 when the level of ice cubes in the tray 132 reaches a pre-determined level. The plate 198 is pivotally connected to the ice maker 50 by a connector 200 at one end of the plate 198, as seen in FIG. 35. The plate 198 pivots in a vertical plane. The plate 198 is stronger than a conventional wire bale arm. The vertical orientation of the plate 198 prevents ice from hanging up on the plate, which happens with a wire bale arm. The plate includes a plurality of holes 202 to reduce weight and to improve air flow.

Water Valve and Tank Assembly

Prior art refrigerators with water and ice dispensers typically locate the water system components, such as tanks, valves, filter and tubing, throughout the refrigerator cabinet and base pan areas. This arrangement is prone to service calls to repair leaks and water restrictions due to the larger number of connections or fittings for the components. The multiple connections and various tubing lengths also add to manufacturing costs.

In the present invention, the water system is pre-assembled in a single module that can be quickly and easily installed. The module has less tubing runs and connections between components as compared to prior art water systems.

Figure 28:
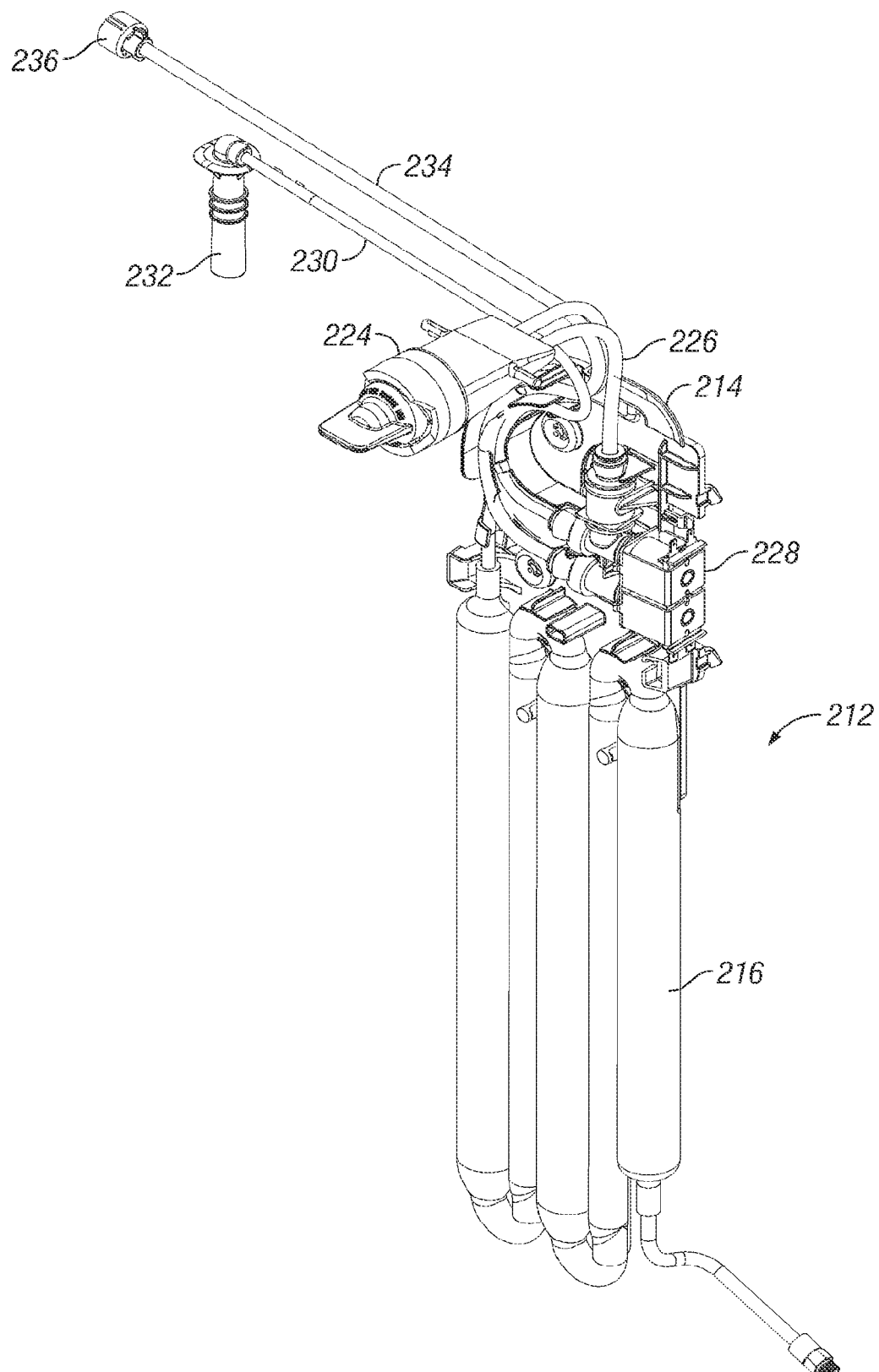
FIG. 28 is a perspective view of the water tank assembly of the present invention.
Figure 29:
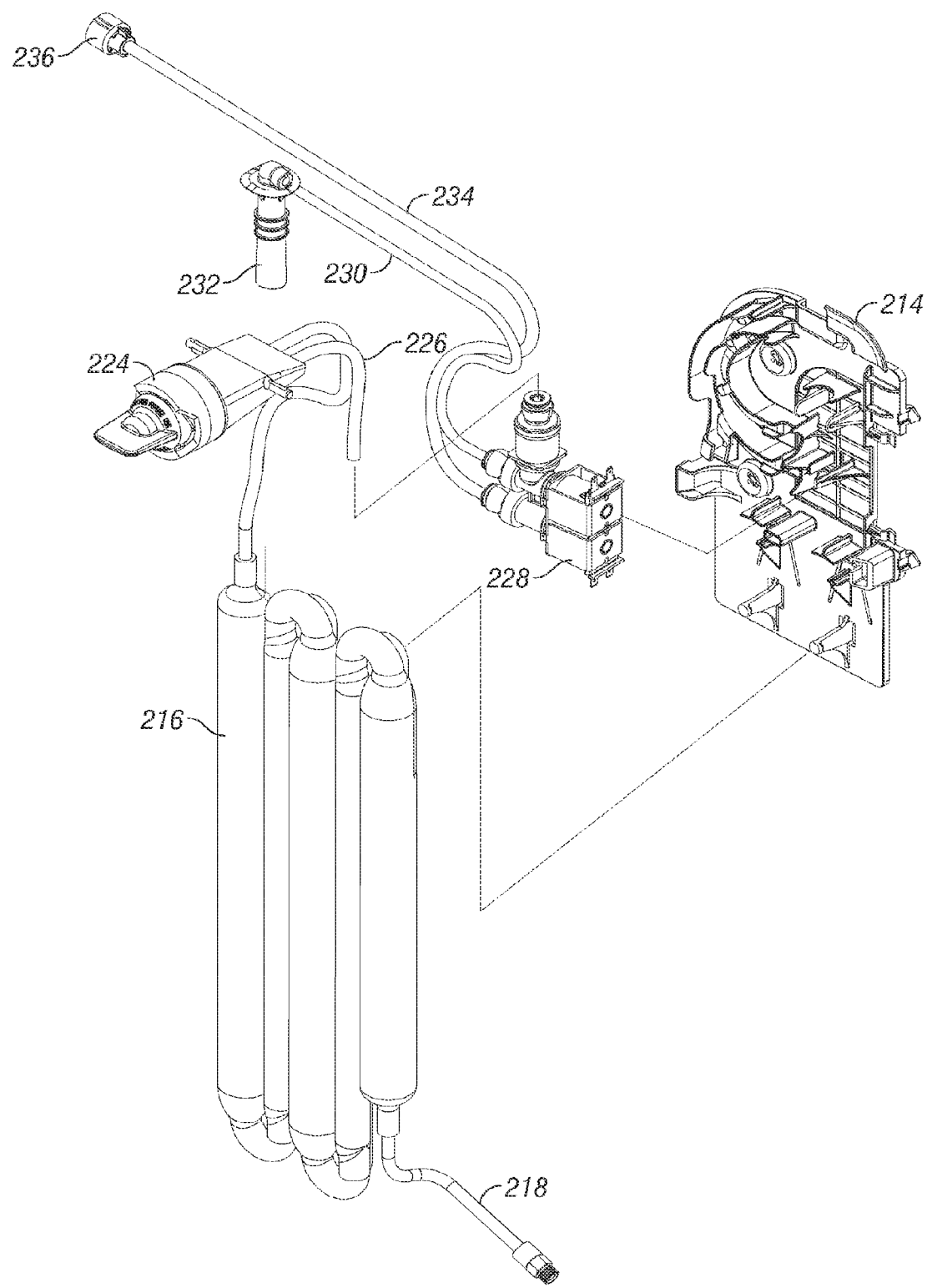
FIG. 29 is an exploded view of the water tank assembly of the present invention.

The fresh food compartment 12 includes a recess or cavity 210 in the rear wall adapted to receive a water valve and tank assembly 212. The water valve and tank assembly 212 is shown in FIGS. 28 and 29. The assembly 212 includes a mounting bracket 214 which is secured in the recess 210 in the back wall of the fresh food compartment 12 in any convenient manner. A water tank 216 is mounted on the bracket 214 and includes a water inlet line 218 and a water outlet line 220. A cover 222 attaches to the rear wall of the fresh food compartment 12 so as to hide the water tank 216 from view when the door 16 of the fresh food compartment 12 is opened.

The water inlet line 218 is connected to a conventional water supply line. The water outlet line 220 is operatively connected to a filter 224. Preferably, the filter 224 is pivotally mounted in the ceiling of the fresh food compartment 12, as disclosed in Applicant's co-pending application Ser. No. 10/195,659, entitled HINGE DOWN REFRIGERATOR WATER FILTER, filed Jul. 15, 2002, which is incorporated herein by reference.

The water filter 224 has an outlet line 226 which is connected to a water solenoid valve 228 mounted on the bracket 214. The valve 228 has a first outlet line 230 leading to the icemaker fill tube 232 and a second outlet line 234 leading to the water dispenser of the refrigerator 10. Line 234 has a fitting 236 which provides a quick connection with a simple ¼ turn, without threads to the water dispenser line in the door 16.

In prior art refrigerators, the water tank is normally located downstream of the water valve and filter, so as to prevent subjecting the water tank to inlet water supply pressures. In this invention, the tank 216 is designed to withstand inlet water supply pressures. The location of the tank 216 in the recess 210 allows greater fresh food storage capacity. Also, the location of the tank 216 upstream from the filter 224 and the valve 228 will reduce the service call rate. The downstream location of the filter 224 also removes plastic tastes associated with the plastic tank 216, and allows chlorinated water to be stored in the tank 216, which prevents microbiological growth on the interior of the water tank 216.

Water Fill Tube

Figure 30:
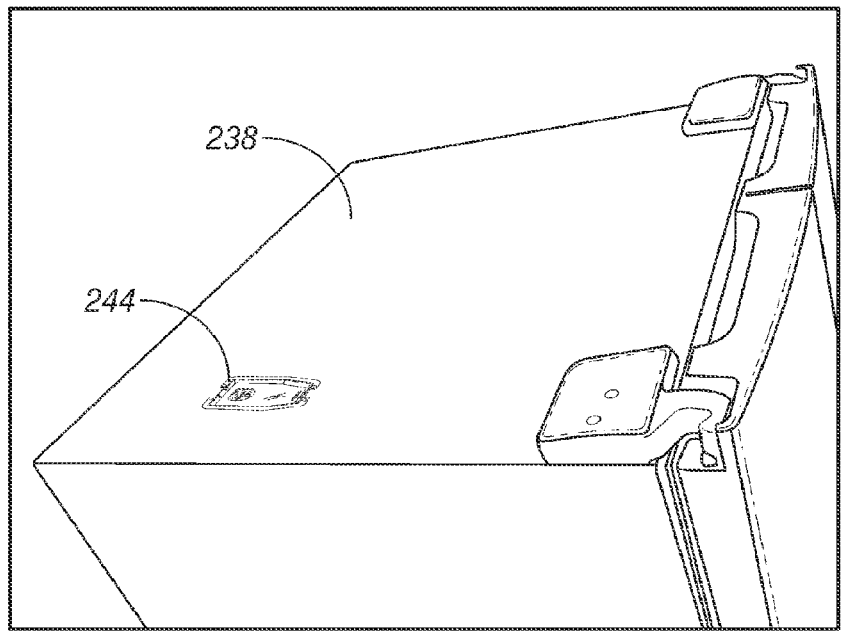
FIG. 30 is a perspective view showing the top of the refrigerator with the water fill tube cup mounted thereon.
Figure 31:
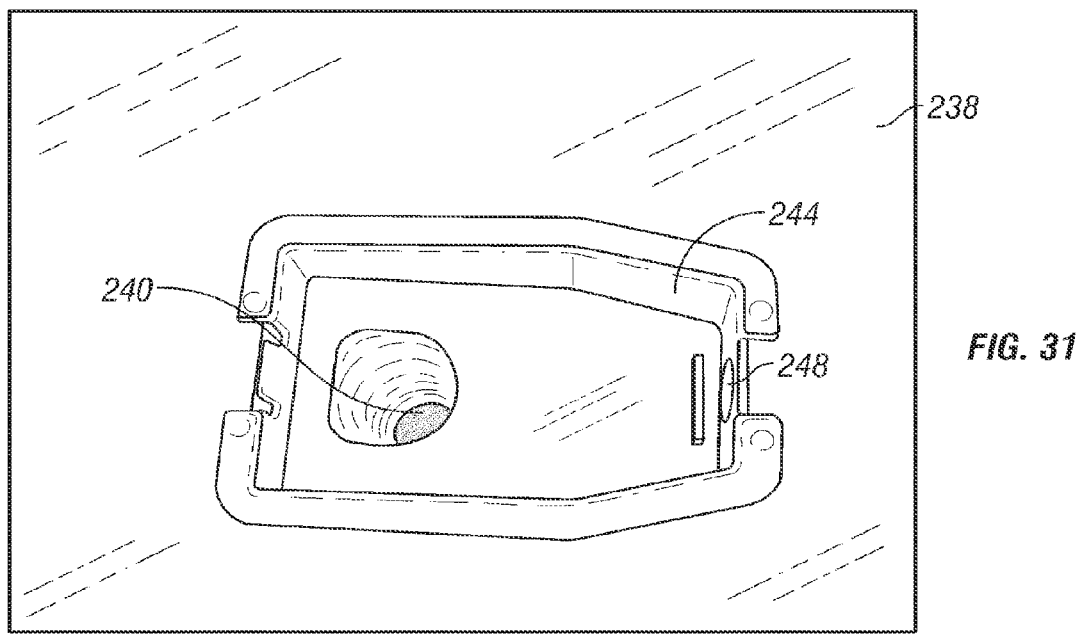
FIG. 31 is an enlarged view of the water tub fill cup showing the vertical hole through which the water fill tube extends.
Figure 32:
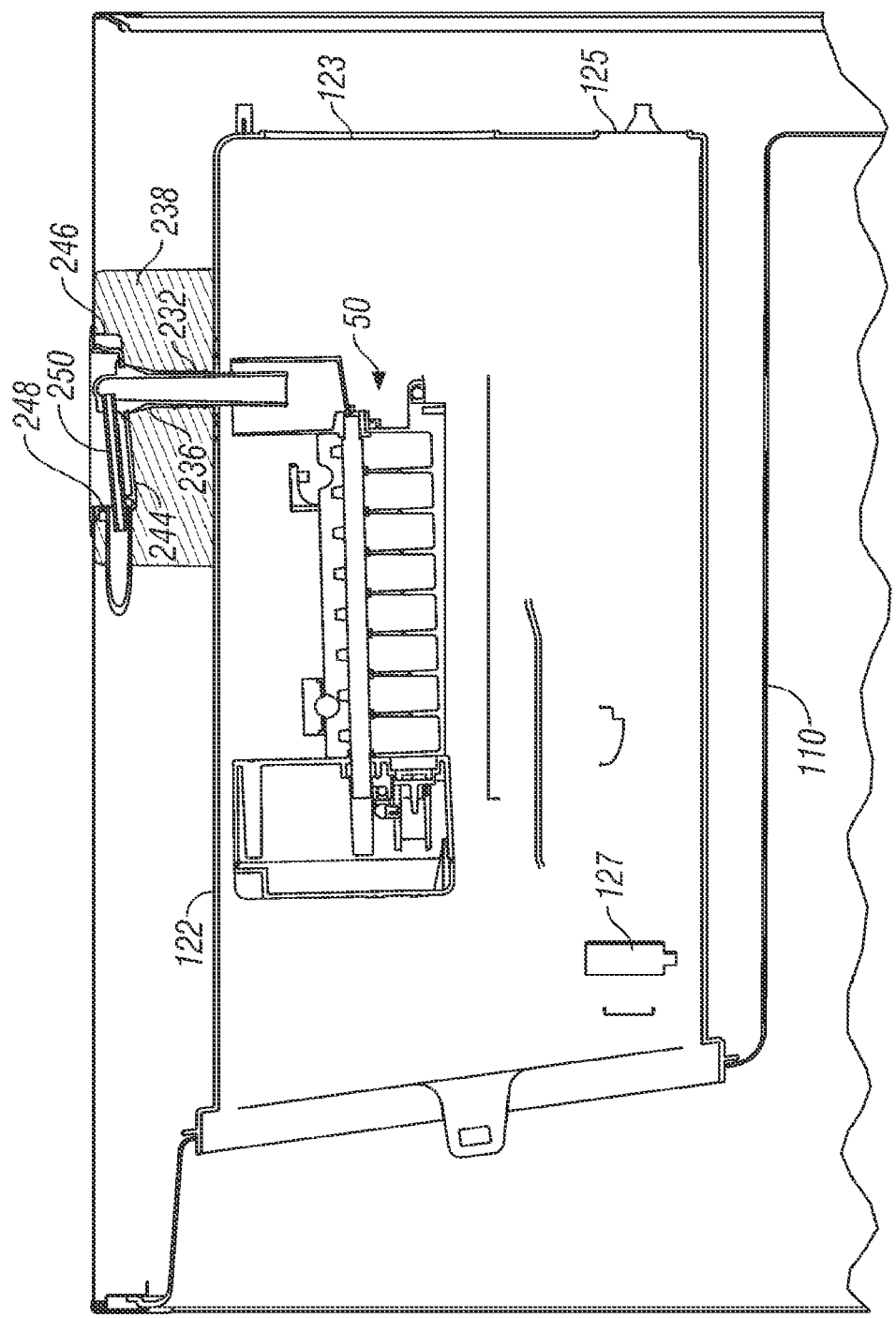
FIG. 32 is a sectional view taking along lines 32-32 of FIG. 31.

Prior art icemaker fill tubes are normally installed in the back of a freezer and run down a sloping tube to the icemaker. As seen in FIGS. 30-32, in the present invention the water fill tube 232 for the icemaker 50 extends downwardly through a vertically disposed hole 236 in the top wall 238 of the refrigerator 10. The fill tube 232 is installed from the top of the refrigerator 10 into a plastic cup 244 positioned within a recess 246 in the top wall 238. The fill tube 232 extends through the insulation in the top wall 238 and into the icemaker 50 in the icemaking compartment 22. The water conduit 230 extends through the foam insulation in the top wall 238 and through an opening 248 in the cup 244 for connection to a nipple 250 on the fill tube 232. The nipple 250 is angled slightly upwardly to prevent dripping. The cup 238 is open at the top so as to expose the fill tube 232 to the ambient air, and thereby prevent freeze-up of the fill tube 232. This vertical orientation allows the fill tube 232 to be positioned closer to the end of the icemaker 50.

Control System Details

Figure 40:
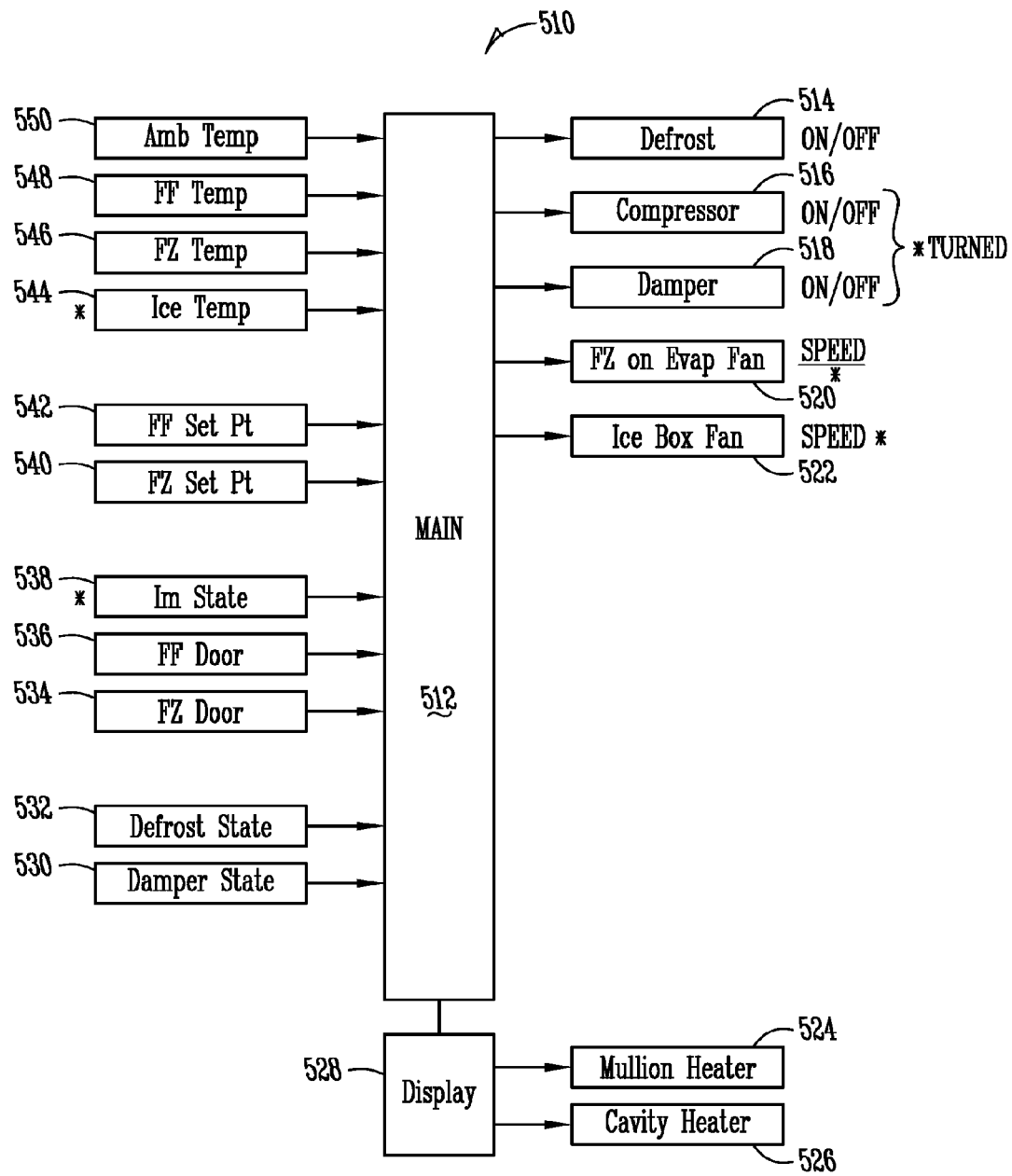
FIG. 40 is a block diagram of one embodiment of a control system according to the present invention.

FIG. 40 illustrates one embodiment of a control system of the present invention suitable for use in a refrigerator having three refrigerated compartments, namely the freezer compartment, the fresh food compartment, and the ice making compartment. The three compartments are preferably able to be set by the user to prescribed set temperatures.

In FIG. 40, a control system 510 includes an intelligent control 512 which functions as a main controller. The present invention contemplates that the control system 510 can include a plurality of networked or otherwise connected microcontrollers. The intelligent control 512 can be a microcontroller, microprocessor, or other type of intelligent control.

Inputs into the intelligent control 512 are generally shown on the left side and outputs from the intelligent control 512 are generally shown on the right side. Circuitry such as relays, transistor switches, and other interface circuitry is not shown, but would be apparent to one skilled in the art based on the requirements of the particular intelligent control used and the particular devices being interfaced with the intelligent control. The intelligent control 512 is electrically connected to a defrost heater 514 and provides for turning the defrost heater on or off. The intelligent control 512 is also electrically connected to a compressor 516 and provides for turning the compressor 516 on or off. The intelligent control 512 is also electrically connected to a damper 518 and provides for opening or closing the damper 518. The intelligent control 512 is also electrically connected to an evaporator fan 520 associated with the freezer compartment and provides for controlling the speed of the evaporator fan 520. Of course, this includes setting the evaporation fan 520 to a speed of zero which is the same as turning the evaporator fan 520 off. The use of a variable speed fan control is advantageous as in the preferred embodiment, the fan is serving an increased number of compartments with more states (freezer, fresh food, ice maker) and the ice compartment is remote from the freezer compartment.

The intelligent control 512 is electrically connected to an ice box fan 522 and provides for controlling the speed of the ice box fan 522. Of course, this includes setting the ice box fan 522 to a speed of zero which is the same as turning the ice box fan 522 off.

The intelligent control 512 also receives state information regarding a plurality of inputs. For example, the intelligent control 512 has a damper state input 530 for monitoring the state of the damper. The intelligent control 512 also has a defrost state input 532 for monitoring the state of the defrost. The intelligent control 512 also has a freezer door input 534 for monitoring whether the freezer door is open or closed. The intelligent control 512 also has a fresh food compartment door input 536 for monitoring whether the fresh food compartment door is open or closed. The intelligent control 512 also has an ice maker state input 538 for monitoring the state of the ice maker. The intelligent control 512 has a freezer set point input 540 for determining the temperature at which the freezer is set by a user. The intelligent control 512 also has a fresh food compartment set point input 542 for determining the temperature at which the fresh food compartment is set by a user. The intelligent control 512 is also electrically connected to four temperature sensors. Thus, the intelligent control 512 has an ice maker temperature input 544, a freezer compartment temperature input 546, a fresh food compartment input 548, and an ambient temperature input 550. The use of four separate temperature inputs is used to assist in providing improved control over refrigerator functions and increased energy efficiency. It is observed that the use of four temperature sensors allows the ice maker temperature, freezer compartment temperature, fresh food compartment temperature, and ambient temperature to all be independently monitored. Thus, for example, temperature of the ice box which is located remotely from the freezer can be independently monitored.

The intelligent control 510 is also electrically connected to a display control 528, such as through a network interface. The display control 528 is also electrically connected to a mullion heater 524 to turn the mullion heater 524 on and off. Usually a refrigerator has a low wattage heater to supply heat to where freezing temperatures are not desired. Typically these heaters are 120 volt AC resistive wires. Due to the fact that these heaters are merely low wattage heaters, conventionally such heaters remain always on. The present invention uses a DC mullion heater and is adapted to control the DC mullion heater to improve overall energy efficiency of the refrigerator and increase safety.

The display control 528 is also electrically connected to a cavity heater 526 for turning the cavity heater 526 on and off. The display control 528 is preferably located within the door and is also associated with water and ice dispensement. Usually a refrigerator with a dispenser with a display on the door will also have an associated heater on the door in order to keep moisture away from the electronics of the dispenser. Conventionally, this heater is continuously on.

It is to be observed that the control system 510 has a number of inputs and outputs that are not of conventional design that are used in the control of the refrigerator. In addition, the control system 510 includes algorithms for monitoring and control of various algorithms. The algorithms used, preferably provide for increased efficiency while still maintaining appropriate temperatures in the ice maker, fresh food compartment, and freezer.

Figure 41:
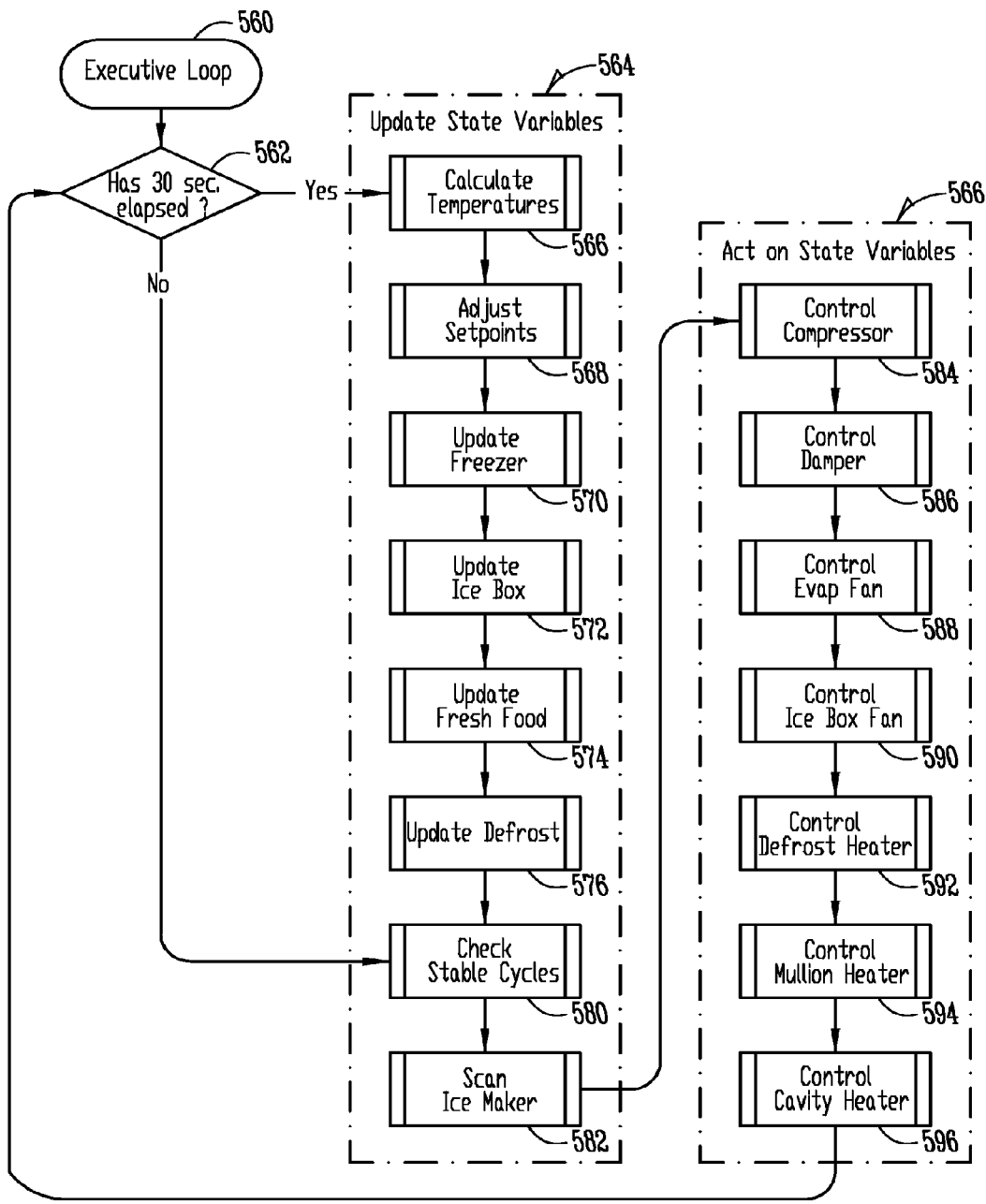
FIG. 41 is a flow diagram of an executive loop according to one embodiment of the present invention.

FIGS. 41-54 provide an exemplary embodiment of the present invention showing how the control system sets the states and controls refrigerator functions based on those states, including states associated with the fresh food compartment, freezer compartment, and ice maker compartment. FIG. 41 is a flow diagram providing an overview of one embodiment of the present invention. In FIG. 41, an executive loop 560 is shown. In step 562 a determination is made as to whether a set time period (such as 30 seconds) has elapsed. If so, then a set of steps 564 are performed to update state variables. These state variables are updated through a calculate temperatures subroutine 566, an adjust setpoints subroutine 568, an update freezer subroutine 570, an update ice box subroutine 572, an update fresh food compartment subroutine 574, an update defrost subroutine 576, a check stable cycles routine 580, and a scan ice maker subroutine 582. Once the state variables are updated, then there are a set of control subroutines 566 which act on the state variables. These control routines include a control compressor subroutine 584, a control damper subroutine 586, a control evaporator fan subroutine 588, a control ice box fan subroutine 590, and a control defrost heater subroutine 592.

As shown in FIG. 41 the status of the state variables are regularly updated in the set of steps 564. After the state variables are updated, appropriate actions are performed to control refrigerator functions.

Figure 42:
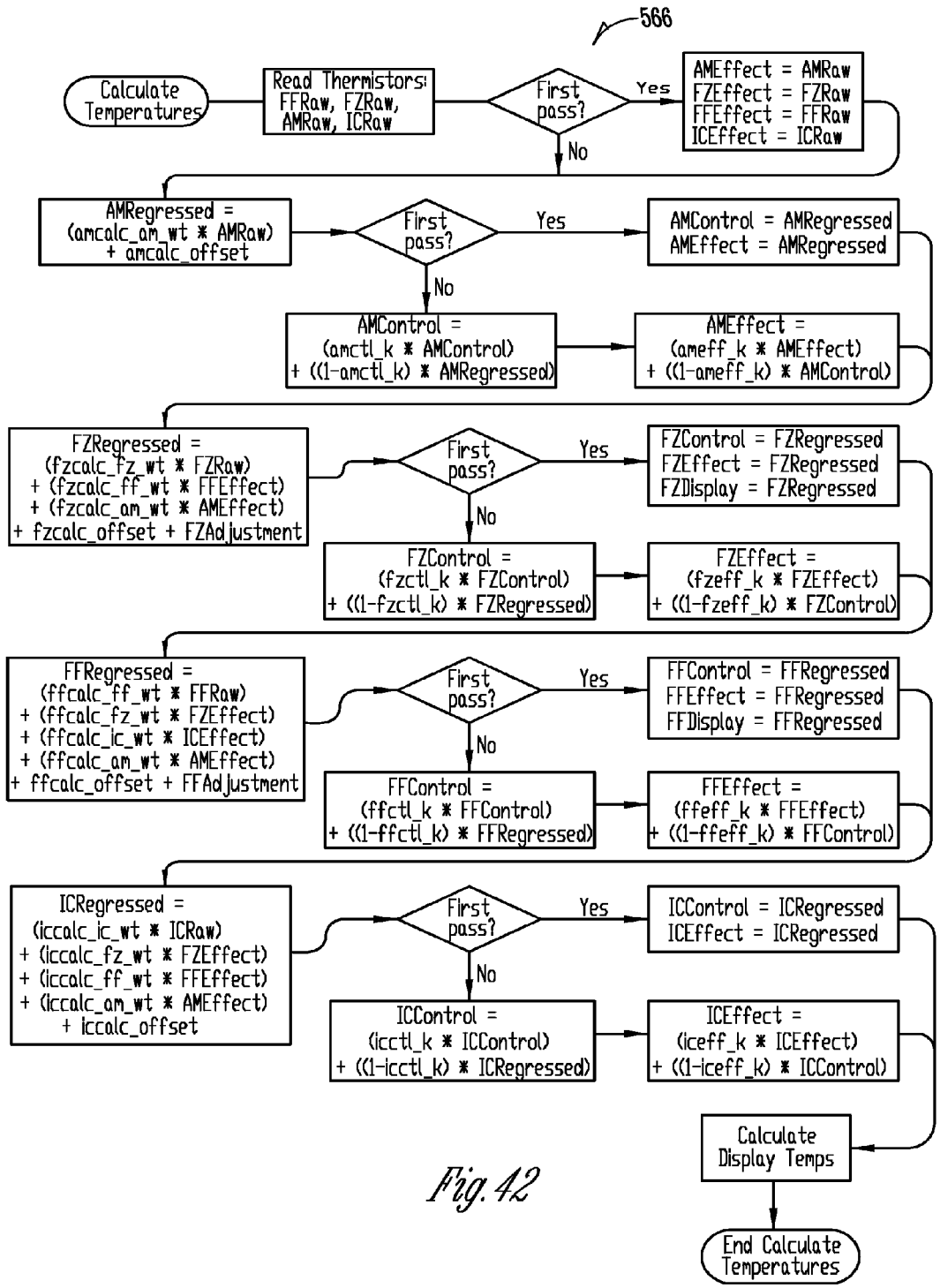
FIG. 42 is a flow diagram of a calculate temperatures subroutine according to one embodiment of the present invention.

The calculate temperatures subroutine 566 is shown in greater detail in FIG. 42. In one embodiment, each compartment's temperature and the ambient temperature are measured with thermistors to provide raw data. Regressed temperatures are calculated based in part on the raw temperatures.

Figure 43:
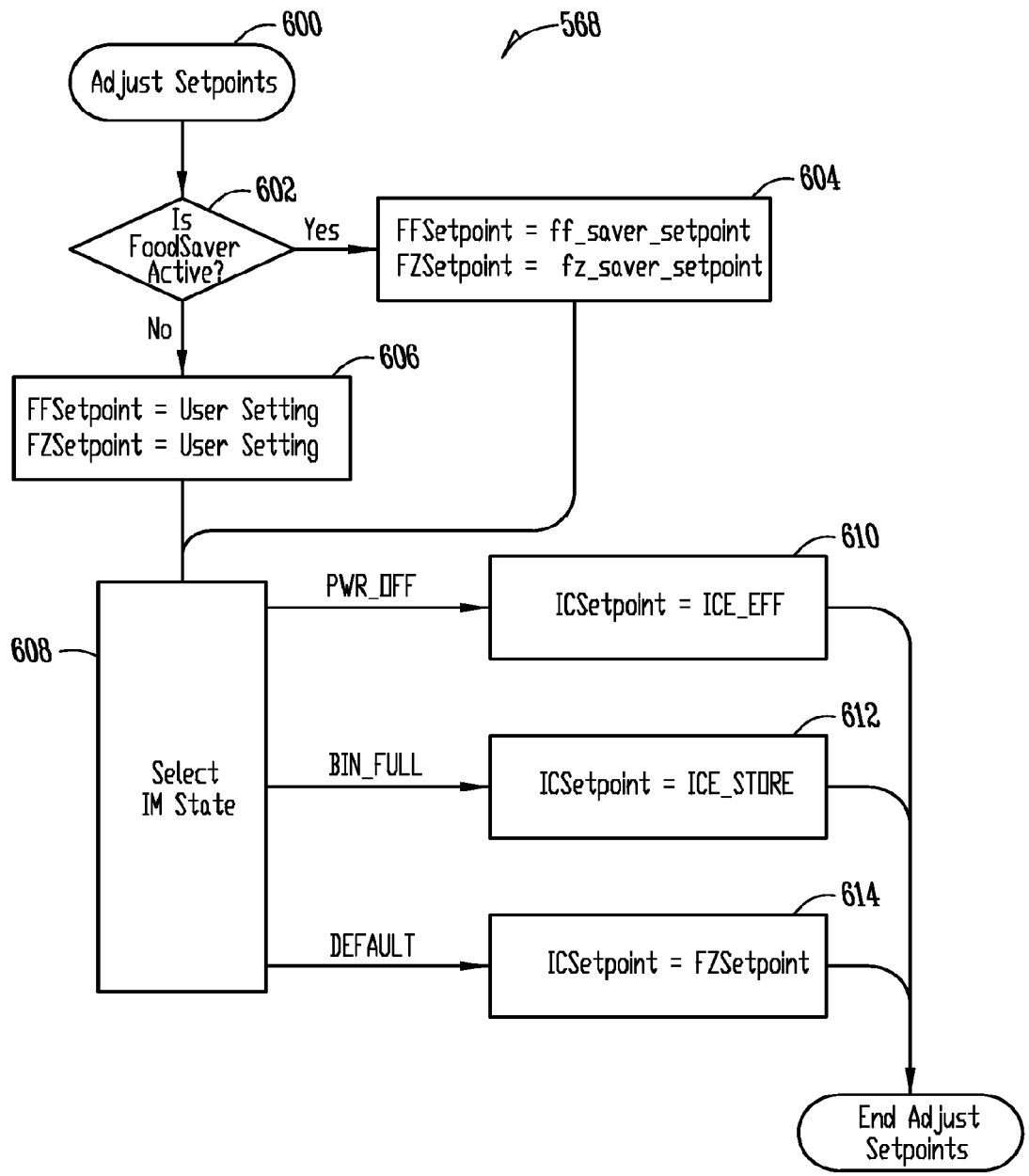
FIG. 43 illustrates one embodiment of a flow diagram for the adjust setpoints subroutine.

FIG. 43 illustrates a flow diagram for the adjust setpoints subroutine 568. The user selects set points for the fresh food compartment (FFSetpoint) and the freezer compartment (FZSetpoint). Based on the user settings, or other settings if a food saver feature is active (ff_saver_setpoint, fz_saver_setpoint), an ice maker set point (ICSetpoint) is set. Under default conditions (DEFAULT) the ice maker set point (ICSetpoint) is the same as the freezer set point (FZSetpoint). If the ice maker's bin is full (BIN_FULL), then the ice maker's set point (ICSetpoint) is set at a lower temperature to maintain the ice and prevent melting. If the ice maker is turned off, then the ice maker's set point is set at a higher temperature (ICE_EFF) thereby providing an efficiency mode to thereby conserve energy. For example, it is generally expected that the ice maker's set point for storage (ICE_STORE) is less than the ice maker's temperature when the power is off such as in an energy efficient mode of operation (ICE_EFF), which is less than the temperature required to melt ice. For example, the ice storage temperature (ICE_STORE) may be around 15 degrees Fahrenheit while the ice maker's efficiency temperature (ICE_EFF) is 25 degrees. Ice might begin to melt at a temperature of 28 degrees Fahrenheit.

Thus, in step 602 a determination is made as to whether the food saver function is active. If it is, then in step 604, the set point for the fresh food compartment (FFSetpoint) is set accordingly to ff_saver_setpoint. Also, the set point for the freezer compartment (FZSetpoint) is set accordingly to fz_saver_setpoint and then the subroutine proceeds to select the ice maker state in step 608. Returning to step 602, if the food saver function is not active, then in step 606, the fresh food set point (FFSetpoint) is set to a user selected temperature setting and the freezer set point (FZSetpoint) is set to a user selected temperature setting.

In step 608, the ice maker state is selected. If the ice maker state is turned off (PWR_OFF) to conserve energy, then the ice maker's set point (ICSetpoint) is set to an energy efficient temperature less than the melting point (ICE_EFF) in step 610. If the ice maker state indicates that the ice bin is full (BIN_FULL) then the ice maker's set point (ICSetpoint) is set to an ice storage temperature (ICE_STORE) in step 612. If the ice maker state is the default state (DEFAULT) then the ice maker's set point (ICSetpoint) is set to the freezer set point (FZSetpoint).

Figure 44A:
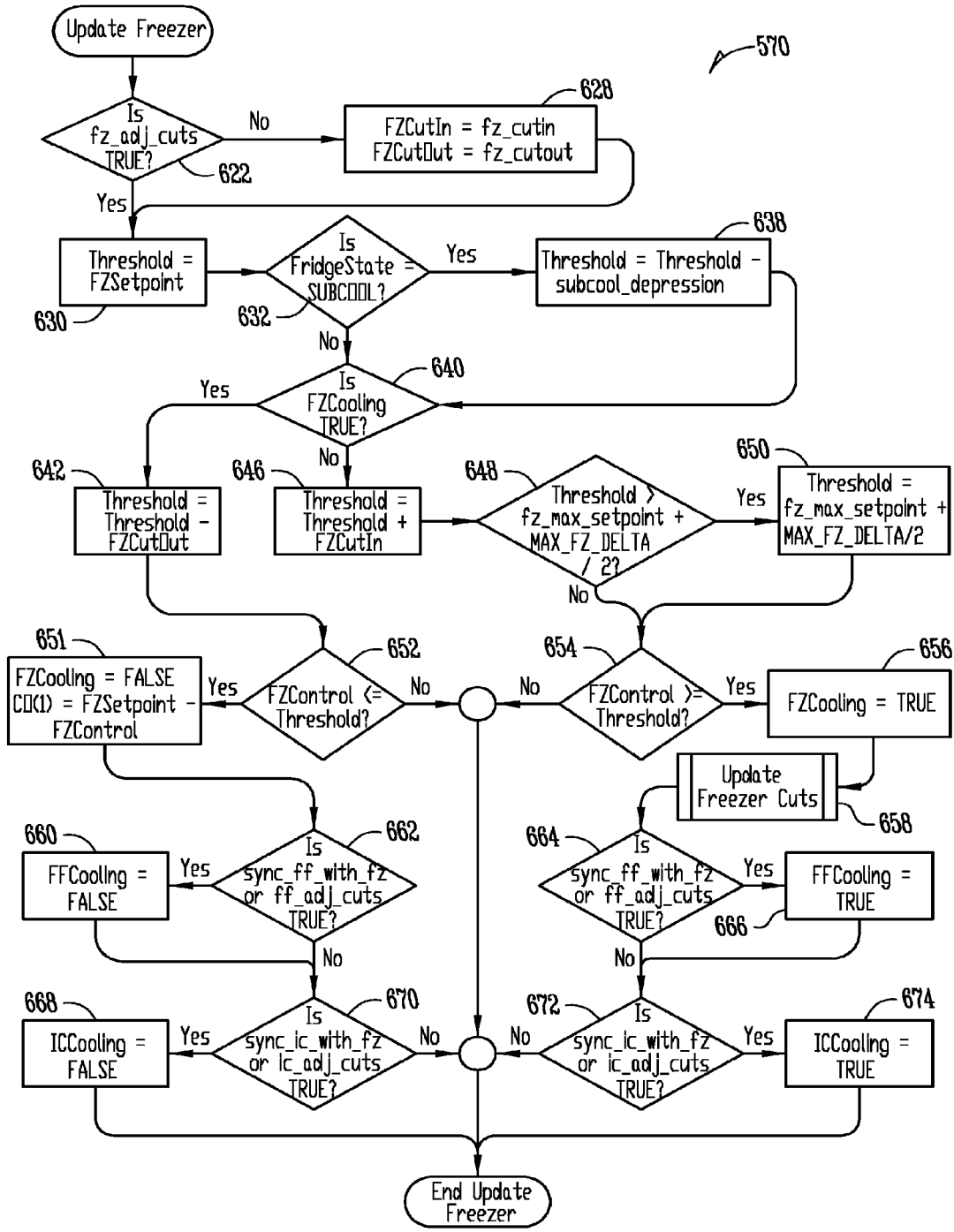
FIG. 44A illustrates one embodiment of a flow diagram for the update freezer subroutine.

FIG. 44A is a flow diagram illustrating one embodiment of the update freezer subroutine 570. The update freezer subroutine assists in increasing the energy efficiency of the appliance because instead of merely turning on the freezer when temperature reaches a particular setpoint, the update freezer subroutine also considers the states of the fresh food compartment and ice maker and how ultimately temperature will be affected over time. The update freezer routing is used to set states associated with the freezer, fresh food compartment and ice maker. In step 622 the fz_adj_cuts state is determined. If true then in step 630, the threshold is set to the freezer set point (FZSetpoint). If in step 622, the fz_adj_cuts state is not true, then in step 628, the freezer cut-in temperature (FZCutIn) is set to fz_cutin and the freezer cut-out temperature is set to fz_cutout. Then in step 630, the threshold is set to the freezer set point (FZSetpoint).

In step 632 a determination is made as to whether the refrigerator state (FridgeState) is set to a sub-cool state (SUBCOOL). If it is, then in step 638, the Threshold is set to the difference of the Threshold and the subcool depression. Then in step 640, a determination is made as to whether the freezer is in the freezer cooling (FZCooling state). If it is, then in step 642, the Threshold is set to be the difference between the Threshold and the freezer cut-out temperature (FZCutOut). Then in step 652, a determination is made whether the freezer control temperature (FZControl) is less than or equal to the threshold temperature (Threshold). If it is, then in step 654, the freezer cooling condition (FZCooling) is set to be FALSE and the first cut-out temperature, CO(1), is set to the difference of the freezer setpoint (FZSetpoint) and the freezer control temperature (FZControl). Next in step 662, a determination is made as to whether the synchronize fresh food compartment with freezer (sync_ff_with_fz) or fresh food adjust cuts (ff_adj_cuts_states are TRUE. If one of these states are true, then in step 660, the fresh food cooling state (FFCooling) is set to be FALSE. If, however, neither of these states are true, in step 670, a determination is made as to whether the synchronize ice maker with freezer (sync_is_with_fz) or ice maker adjust cuts (ic_adj_cuts) states are true. If one of these states is true, then in step 668, the ice maker cooling state (ICCooling) is set to FALSE.

Returning to step 650, if the freezer cooling state (FZCooling) is not set, then in step 646, the threshold (Threshold) is set to be the sum of the threshold (Threshold) and the freezer cut-in temperature (FZCutin). Then in step 648, a determination is made as to whether the threshold (Threshold) is greater than the sum of freezer's maximum set point (fz_max_setpoint) and the maximum freezer change (MAX_FZ_DELTA) divided by two. If it is, then in step 650, the threshold (Threshold) is set to be the sum of the freezer's maximum set point (fz_max_setpoint) and the maximum freezer change (MAX_FZ_DELTA) divided by two. Then in step 654 a determination is made as to whether the freezer control temperature (FZControl) is greater than or equal to the threshold (Threshold). If it is, then in step 656 the freezer cooling state (FZCooling) is set to be TRUE. Then in step 658, the Update Freezer Cuts subroutine is executed. Next in step 664, a determination is made as to whether the synchronize fresh food compartment with the freezer compartment state (sync_ff_with_fz) or the fresh food adjust cuts state (ff_adj_cuts) state is true. If it is, then in step 666 the fresh food cooling state (FFCooling) is set to be true. Then in step 672, a determination is made as to whether the synchronize ice maker with freezer state (sync_ic_with_fz) or the ice maker adjust cuts (ic_adj_cuts) states are true. If they are, then in step 674, the ice maker cooling state (ICCooling) is set to be true.

Figure 44B:
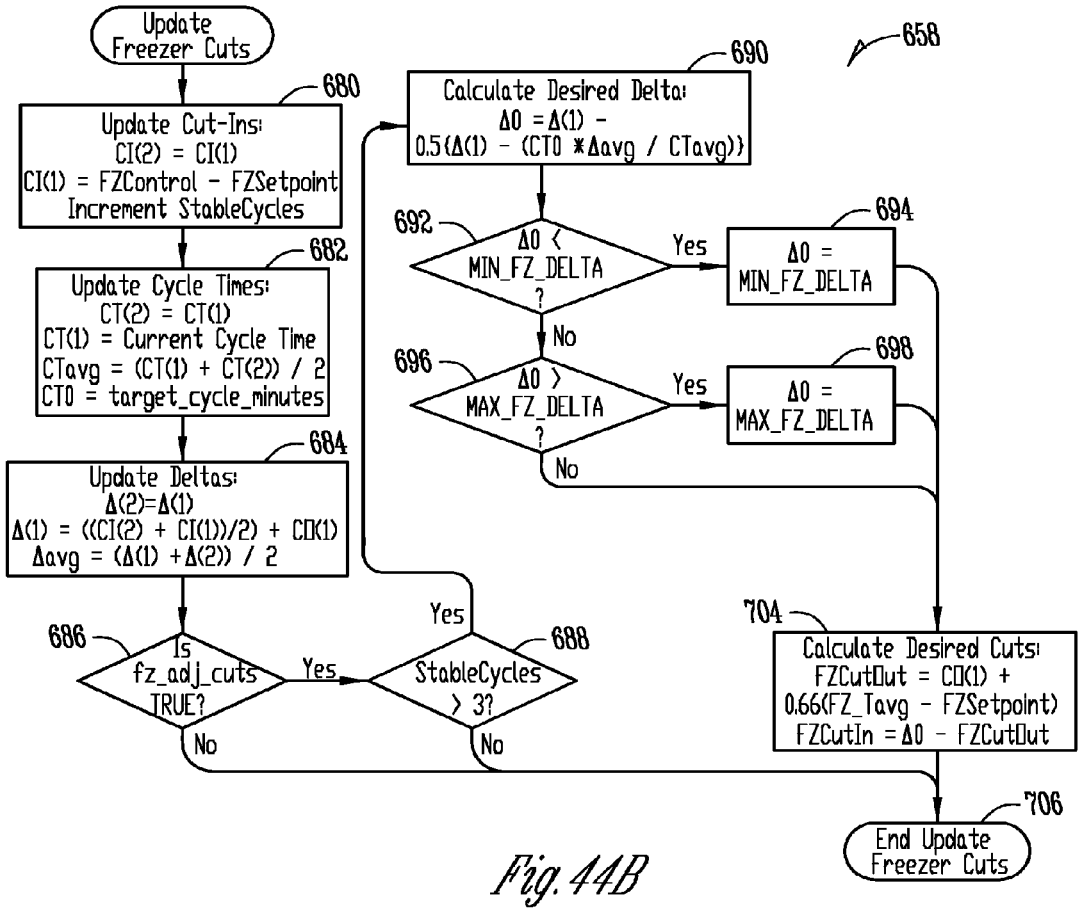
FIG. 44B illustrates one embodiment of a flow diagram for the update freezer cuts subroutine.

FIG. 44B is a flow diagram illustrating one embodiment of the update freezer cuts subroutine 658. In step 680, the cut-in temperatures are updated by setting the second cut-in temperature, CI(2), to be equal to the first cut-in temperature, CI(1). The first cut-in temperature, CI(1), is then set to be equal to the difference of the freezer control temperature (FZControl) and the freezer setpoint (FZSetpoint). Also the stable cycles variable (StableCylces) is incremented. Next in step 682, the cycle times are updated by setting the second cycle time, CT(2), to be equal to the first cycle time, CT(1). The first cycle time, CT(1), is then set to the current cycle time. The average cycle time (CTavg) is then computed as the average of the first cycle time, CT(1), and the second cycle time, CT(2). The CT0 is set to be target cycle minutes (target_cycle_minutes).

Next in step 686, a determination is made as to whether the freezer adjust cuts state (fz_adj_cuts) is true. If it is, then in step 688, a determination is made as to whether there are more than three stable cycles (StableCycles). If there are, then in step 690, the desired delta is calculated from the deltas and the cut-out temperatures as shown. The bounds of the calculated desired delta are then checked in steps 692-698. In step 692, a determination is made as to whether $\Delta(0)$ is less than the minimum freezer delta (MIN_FZ_DELTA). If it is, then in step 694, $\Delta(0)$ is set to be the minimum freezer delta (MIN_FZ_DELTA). If it is not, then in step 696, a determination is made as to whether $\Delta(0)$ is greater than the maximum freezer delta (MAX_FZ_DELTA). If it is, then in step 698, $\Delta(0)$ is set to be the maximum freezer delta (MAX_FZ_DELTA). In step 704, the desired freezer cut-out temperature (FZCutOut) and the desired freezer cut-in temperature (FZCutIn) are set.

Then in step 684, the deltas are updated accordingly. In particular, Δ(2) is set to Δ(1). Also, Δ(1) is set to be the sum of the average of CI(1) and CI(2) and CO(1). Also, Δavg is set to be the average of Δ(1) and Δ(2).

Figure 44C:
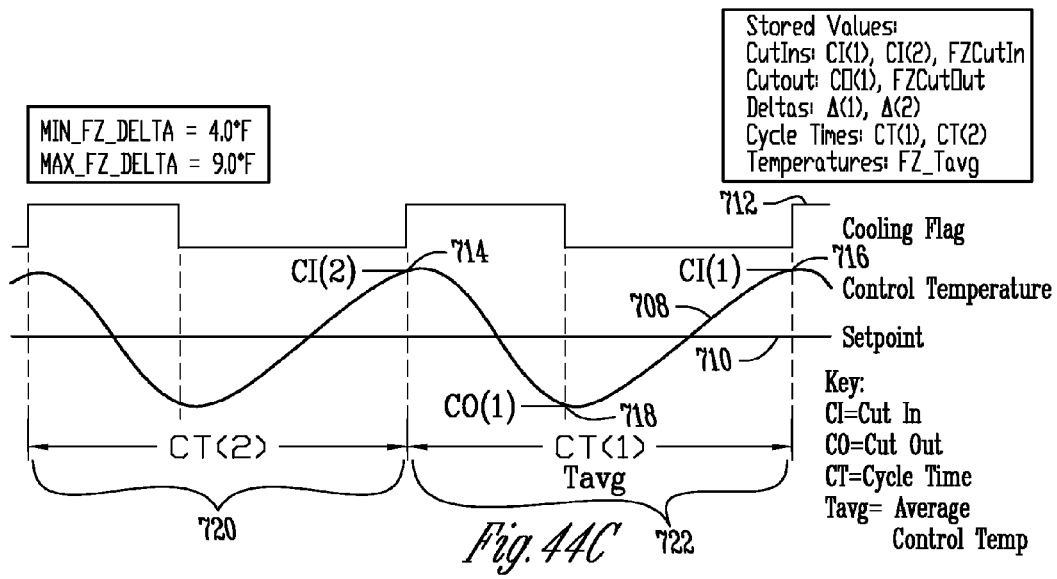
FIG. 44C illustrates relationships between the cooling flag, control, temperature, setpoint, cut-ins, cut-outs, and cycle time for the update freezer cuts subroutine.

FIG. 44C shows the relationship between the cooling state or flag 712, and the control temperature 708 over time. Note that at point 716, CI(1), the cooling state of flag 712 cuts in, at point 714, CI(2), the cooling state or flag also cuts in, at point 718, CO(1), the cooling state or flag cuts out. For cycle CT(1) 722 there is an associated average control temperature (Tavg) and for cycle CT(2) 720 there is an associated average control temperature (Tavg).

Figure 45A:
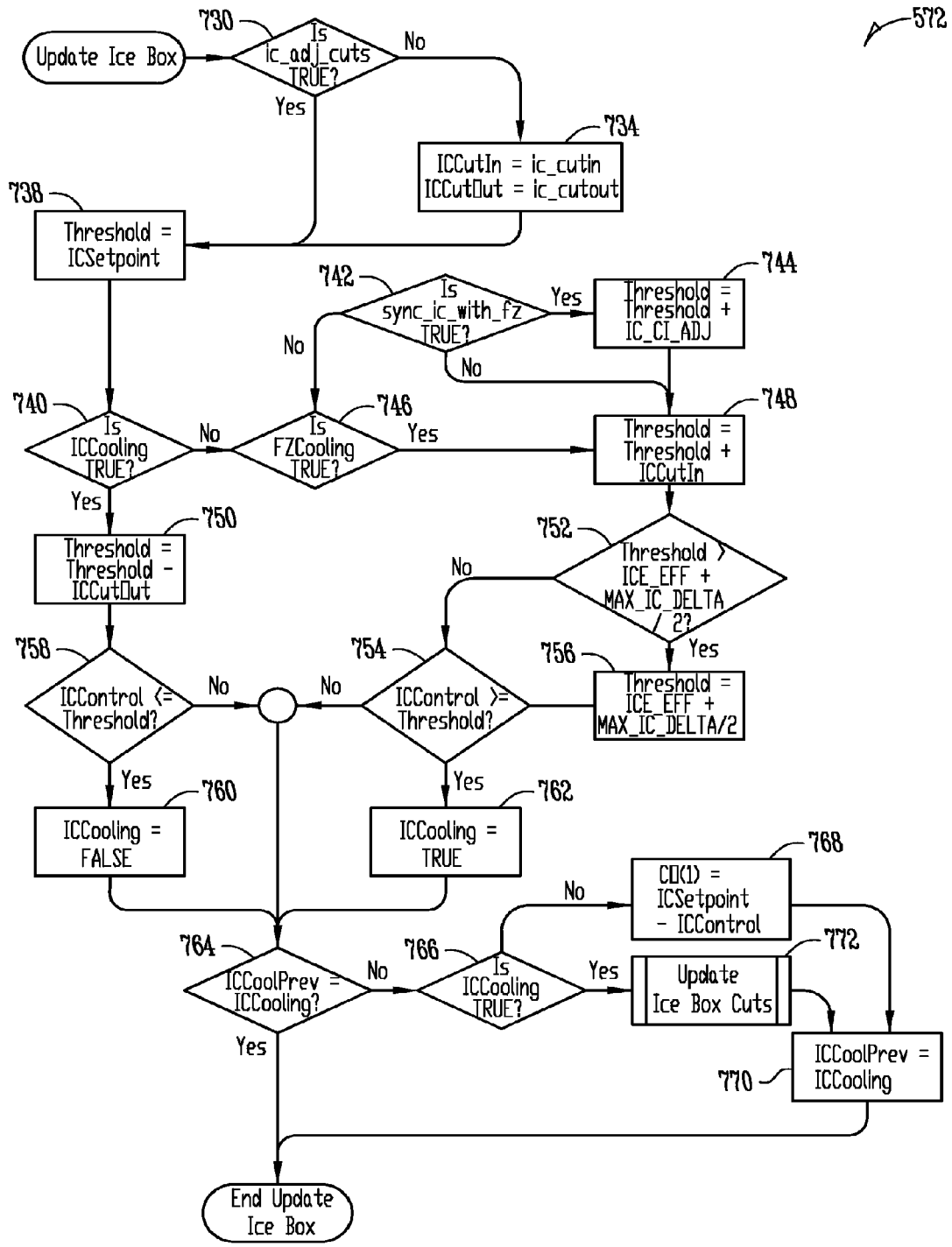
FIG. 45A illustrates one embodiment of a flow diagram for the update ice box subroutine.

FIG. 45A illustrate one embodiment of the update ice box subroutine 572. In FIG. 45A, a determination is made in step 730 as to whether the icemaker adjust cuts state (ic_adj_cuts) is true. If not, then in step 734, the ice maker cut in time (ICCutIn) and the ice maker cut out (ICCutOut) times are set. Then in step 738, the threshold (Threshold) is set to the ice maker set point (ICSetpoint). Next, in step 740, a determination is made as to whether the ice maker cooling state (ICCooling) is set. If not, then in step 746, a determination is made as to whether the freezer cooling state (FZCooling) is set. If not, then in step 743, a determination is made as to whether the synchronize ice maker with freezer state (sync_ic_with_fz) is set. If it is, then in step 744, the threshold (Threshold) is set to the sum of the Threshold and the ice maker cut-in adjustment value (IC_CI_ADJ). In step 748, the threshold (Threshold) is set to be the sum of the threshold (Threshold) and the ice maker cut in (ICCutIn). Next in step 752, the upper bound for the threshold is tested and if the bound is exceeded, in step 756, the threshold is set to be the upper bound. Next in step 754, a determination is made as to whether the ice maker control (ICControl) is greater or equal to the threshold. If it is, then in step 762, the ice maker cooling state is set to true.

Returning to step 740, if the ice maker cooling state is true, then in step 750, the threshold is set to the difference of the threshold and the ice maker cutout. Then in step 758, the ice maker cooling state is set to be false.

In step 764 a determination is made as to whether the ice maker was previously in a cooling state. If not, then in step 766 a determination is made as to whether the ice maker cooling state is true. If not, then the first cut-out time, CO(1) is set to be the difference between the ice maker setpoint (ICSetpoint) and the ice maker control (ICControl). If it is, then in step 772, an update ice box cuts subroutine is executed. In step 770, the previous ice maker cooling stat (ICCoolPrev) is set to cooling (ICCooling).

Figure 45B:
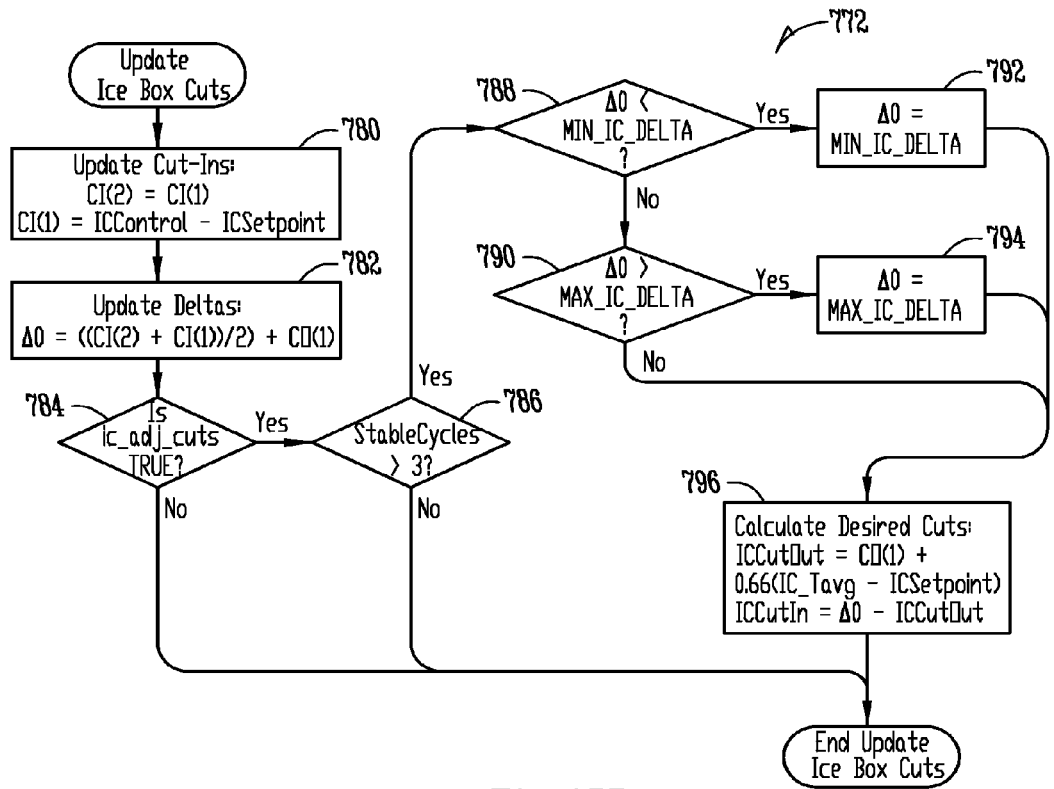
FIG. 45B illustrates one embodiment of a flow diagram for the update ice box cuts subroutine.

FIG. 45B illustrates the ice box cuts subroutine 772. In step 780, the cut-ins are updated. In step 782 the deltas are updated. In step 784, a determination is made as to whether the ice_adj_cuts state is true. If it is, then in step 786 a determination is made as to whether there have been at least three stable cycles. If so, in steps 788, 790, 792, and 794, the boundaries of AO are tested. In step 796 the desired cuts are calculated.

Figure 45C:
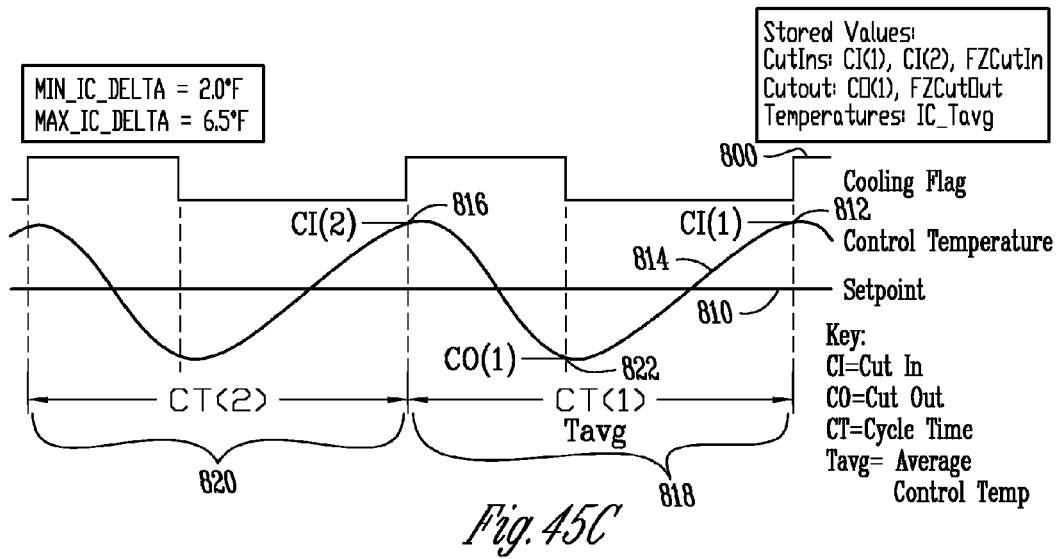
FIG. 45C illustrates relationships between the cooling flag, control, temperature, setpoint, cut-ins, cut-outs, and cycle time for the update ice box cuts subroutine.

FIG. 45C shows the relationship between the cooling state or flag 800, and the control temperature 814 over time. Note that at point 812, CI(1), the cooling state of flag 800 cuts in, at point 816, CI(2), the cooling state or flag also cuts in, at point 822, CO(1), the cooling state or flag cuts out. For cycle CT(1) 818 there is an associated average control temperature (Tavg) and for cycle CT(2) 820 there is an associated average control temperature (Tavg).

Figure 46A:
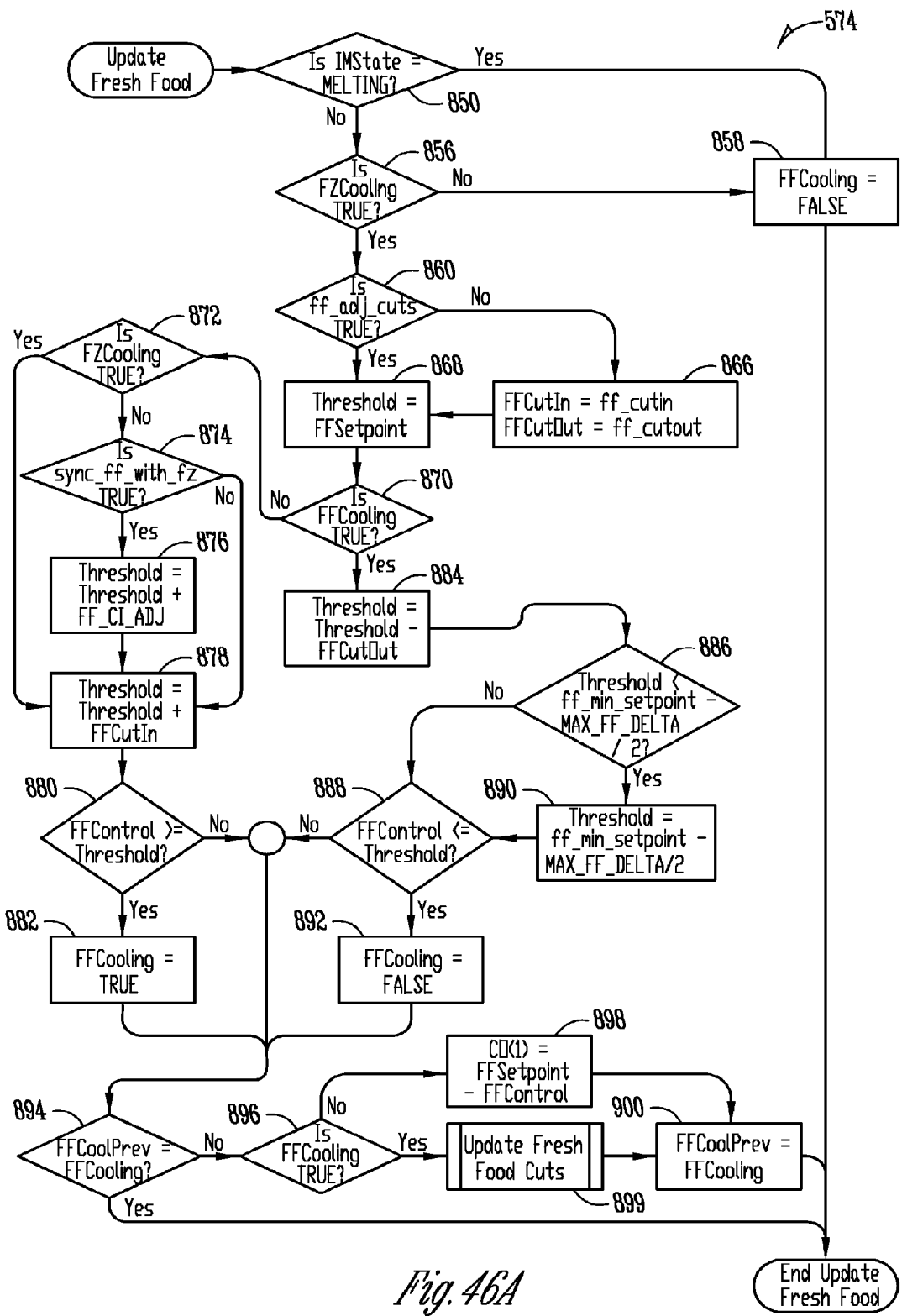
FIG. 46A illustrates one embodiment of a flow diagram for the update fresh food subroutine.

FIG. 46A illustrates one embodiment of a flow diagram for the update fresh food subroutine 574. In FIG. 46A, a determination is made as to whether the ice maker state (IMState) is melting. If it is, then in step 858, the fresh food compartment cooling state is set to false. If it is not, then in step 856 a determination is made as to whether the freezer cooling state (FZCooling) is true. If it is not then in step 858 the fresh food compartment cooling (FFCooling) state is set to false. If the freezer cooling (FZCooling) state is true, then in step 860, a determination is made as to whether the ff_adj_cuts state is true. If it is not, then in step 866 values for the fresh food cut-in and cut-out values are set accordingly. In step 868, the threshold (Threshold) is set to the fresh food compartment setpoint. In step 870, a determination is made as to whether the fresh food cooling (FFCooling) state is true. If not in the fresh food cooling (FFCooling) state, then in step 872, a determination is made as to whether the freezer cooling state is true. If it is then, the threshold is set in step 878. If it is not, then in step 874 a decision is made as to whether the threshold needs to be adjusted to compensate for the synchronization state. If it does not then, in steps 876 and 878 the threshold is adjusted accordingly. Then in step 880 a determination is made as to whether the fresh food compartment temperature is greater than or equal to the threshold. If it is, then in step 882, the fresh food cooling state (FFCooling) is set to be true.

Returning to step 870, if the fresh food compartment cooling (FFCooling) state is true, then the threshold is modified in step 884. In step 886 a determination is made as to whether the threshold is less than the difference of the fresh food compartment's minimum setpoint and half of the maximum fresh food compartment change. If it is, then in step 890, the threshold is set to the difference of the fresh food compartment's minimum setpoint and half of the maximum fresh food compartment change. Then in step 888 a determination is made as to whether the fresh food compartment control temperature is less than or equal to a threshold. If it is then the fresh food cooling state (FFCooling) is set to be false. In step 894, the fresh food cooling's previous state (FFCoolPrev) is compared to the present fresh good cooling (FFCooling). If they are not equal, then in step 896, a determination is made as to whether the fresh food cooling (FFCooling) state is true. If it is then, an Update Fresh Food Cuts subroutine 898 is run to update cut-in and cut-out temperatures. If it is not then the cutout temperature, CO(1), is set to be the difference between the fresh food setpoint (FFSetpoint) and the fresh food control setting (FFControl). Then in step 900 the previous fresh food cooling state (FFCoolPrev) is updated to the current fresh food cooling state.

Figure 46B:
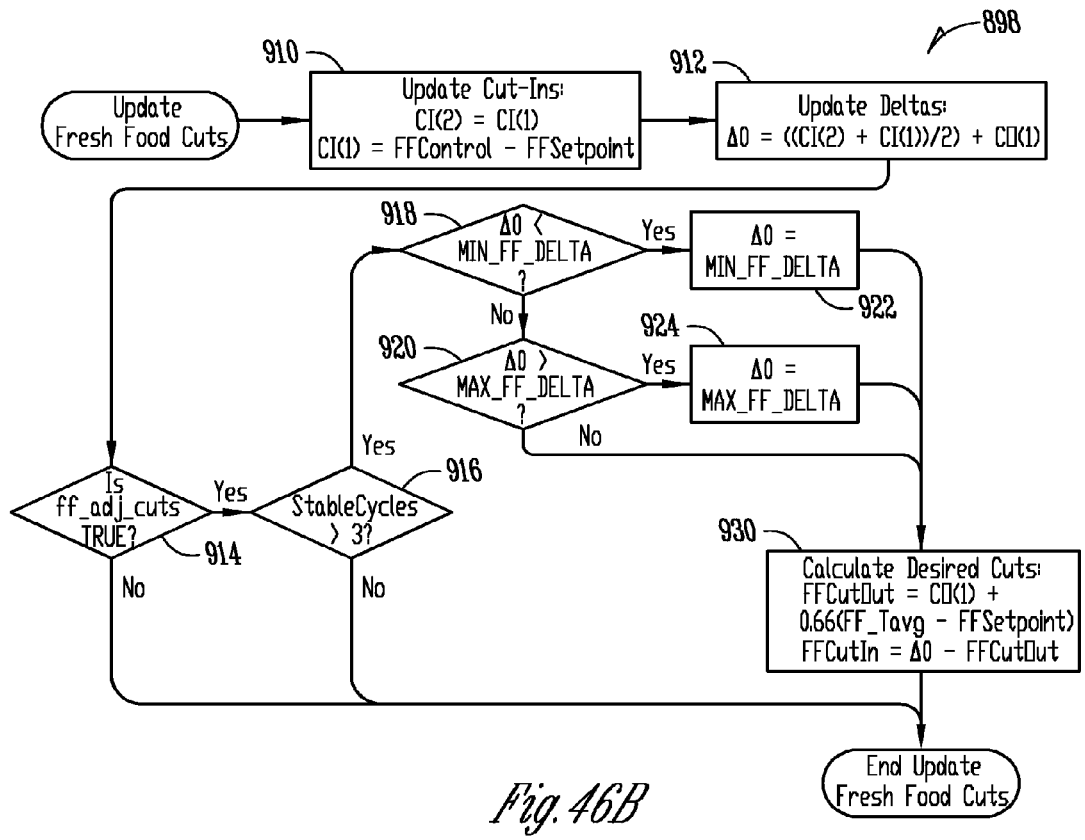
FIG. 46B illustrates one embodiment of a flow diagram for the update fresh food cuts subroutine.

FIG. 46B illustrates one embodiment of a flow diagram for the update fresh food cuts subroutine 898. In step 910 the cut-in temperatures are updated. In step 912, the deltas are updated. In step 914, a determination is made as to whether the fresh food compartment cut-in and cut-out temperatures need adjustment. If they do, in step 916 a determination is made as to whether there has been more than three consecutive stable cycles. If there has, then in steps 918, 920, 922, and 924, the delta is recalculated. In step 930 the cut-in and cut-out temperatures for the fresh food compartment are adjusted accordingly.

Figure 46C:
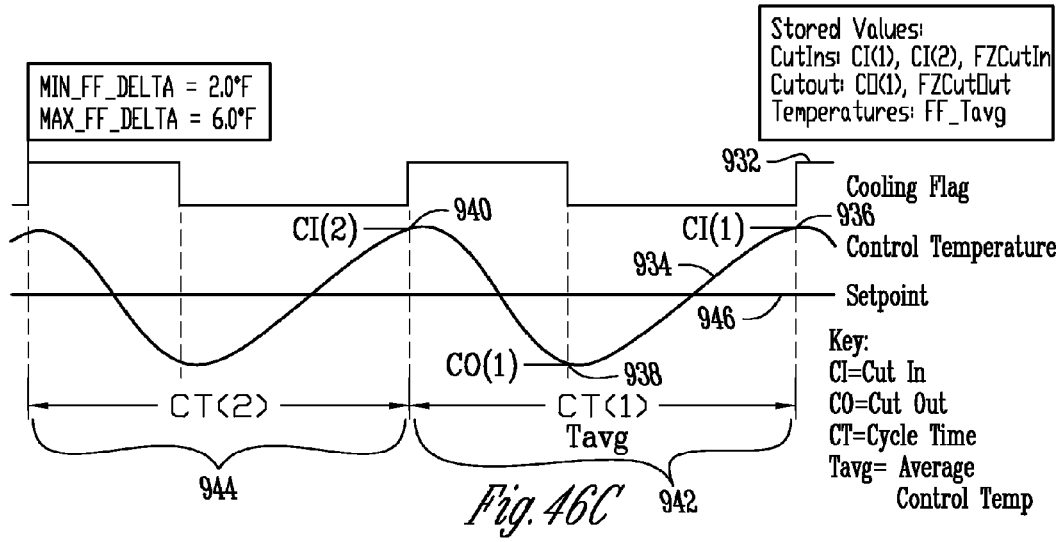
FIG. 46C illustrates relationships between the cooling flag, control, temperature, setpoint, cut-ins, cut-outs, and cycle time for the update fresh food cuts subroutine.

FIG. 46C illustrates relationships between the cooling flag, control, temperature, setpoint, cut-ins, cut-outs, and cycle time for the update fresh food cuts subroutine. FIG. 46C shows the relationship between the cooling state or flag 932, and the control temperature 934 over time. Note that at point 936, CI(1), the cooling state of flag 932 cuts in, at point 940, CI(2), the cooling state or flag also cuts in, at point 938, CO(1), the cooling state or flag cuts out. For cycle CT(1) 942 there is an associated average control temperature (Tavg) and for cycle CT(2) 944 there is an associated average control temperature (Tavg).

Figure 47:
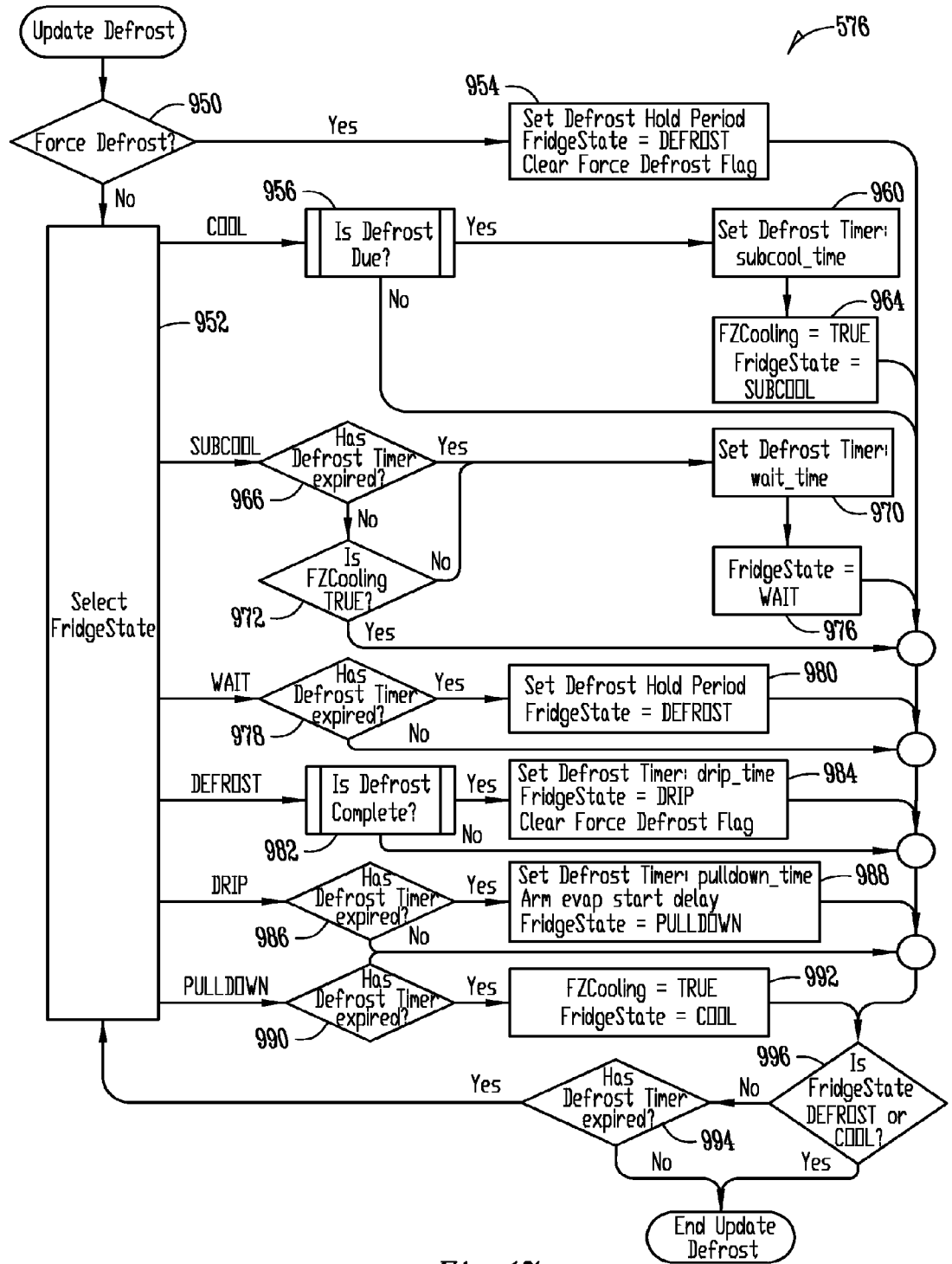
FIG. 47 illustrates one embodiment of a flow diagram for the update defrost subroutine.

FIG. 47 illustrates one embodiment of a flow diagram for the update defrost subroutine 576. In step 950 a determination is made as to whether to force a defrost. If a defrost is not forced, then in step 952 the refrigerator state is selected. If a defrost is forced, then in step 984 the defrost hold period is set, the refrigerator state is set to defrost and a flag for forcing a defrost is cleared.

Returning to step 952, the refrigerator state can be COOL, SUBCOOL, WAIT, DEFROST, DRIP, or PULLDOWN. If the refrigerator state is cool, then in step 956 a determination is made as to whether defrost is due. If it is, then in step 960 the defrost timer is set and in step 965, the freezer cooling (FZCooling) state is set to true and the refrigerator state is set to SUBCOOL.

Returning to step 952, if the refrigerator is in the subcool state, then in step 966 a determination is made as to whether the defrost timer has expired. If it has, then in step 970, the defrost timer is set and in step 976 the refrigerator state (FridgeState) is set to WAIT. If in step 966 the defrost timer has not expired, then in step 972 a determination is made as to whether the freezer is in the cooling state. If it is not, then in step 970 the defrost timer is set and in step 976 the refrigerator state (FridgeState) is set to WAIT.

Returning to step 952, if the refrigerator state (FridgeState) is WAIT, then in step 978 a determination is made as to whether the defrost timer has expired. If it has, then in step 980 the defrost hold period is set and the refrigerator state is set to DEFROST.

Returning to step 952, if the refrigerator state (FridgeState) is DEFROST, then in step 982, a determination is made as to whether the defrost is complete. If it is then in step 984, the defrost timer is set for time associated with dripping (drip_time), the refrigerator state (FridgeState) is set to DRIP and the flag associated with forcing defrost is cleared.

Returning to step 952, if the refrigerator state (FridgeState) is DRIP, then in step 986, a determination is made as to whether the defrost timer has expired. If it has, then in step 988, the defrost timer is set and the refrigerator state is set to PULLDOWN.

Returning to step 980, if the state is PULLDOWN, a determination is made as to whether or not the defrost timer has expired. If it has then in step 992, the freezer cooling state (FZCooling) is set to true and the refrigerator state (FridgeState) is set to COOL.

In step 996, a determination is made as to whether the refrigerator is in a DEFROST or COOL state. If it is, then the subroutine ends. If it is not, then in step 994 a determination is made as to whether the defrost timer has expired. If it has then the process returns to step 952. If the defrost timer has not expired then the subroutine ends.

Figure 48:
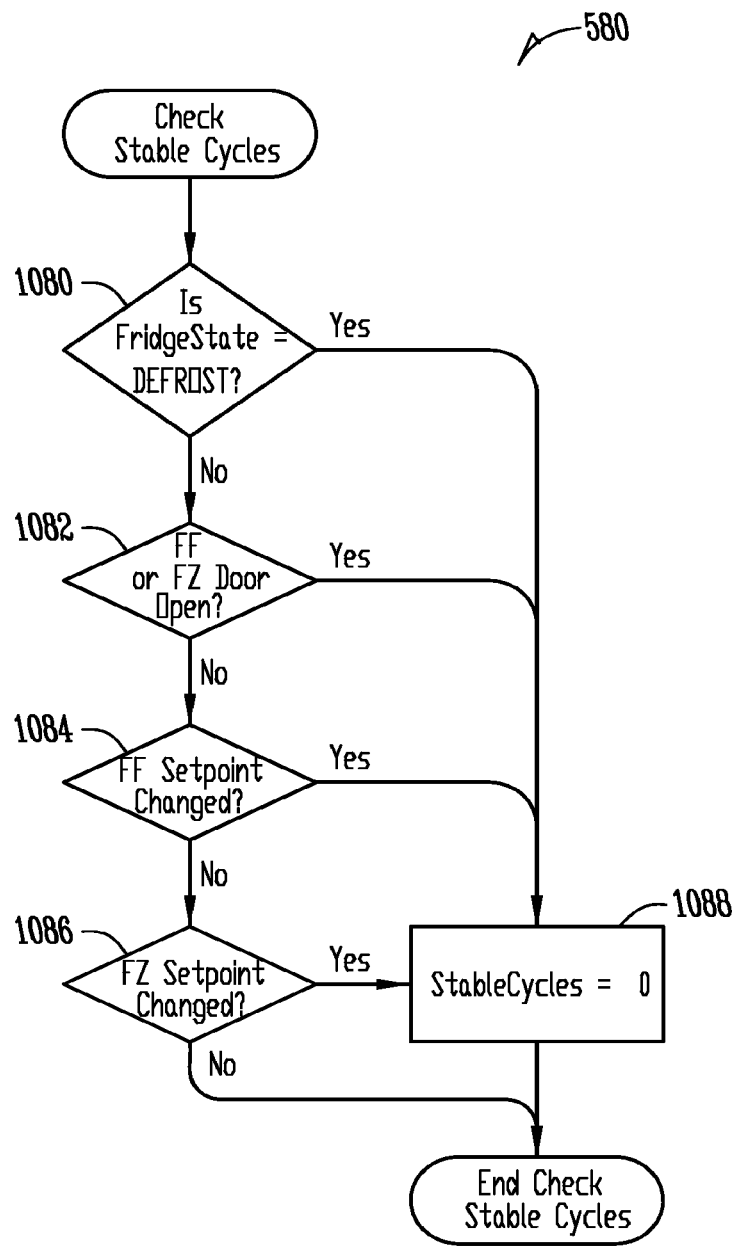
FIG. 48 illustrates one embodiment of a flow diagram for the check stable cycles subroutine.

FIG. 48 illustrates one embodiment of a flow diagram for the check stable cycles subroutine 580. The number of stable cycles is reset in step 1088 if in step 1080 the refrigerator is in the defrost state, in step 1082 the fresh food or freezer doors are open, in step 1084 the fresh food setpoint has changed, or in step 1086 the freezer setpoint has changed.

Figure 49:
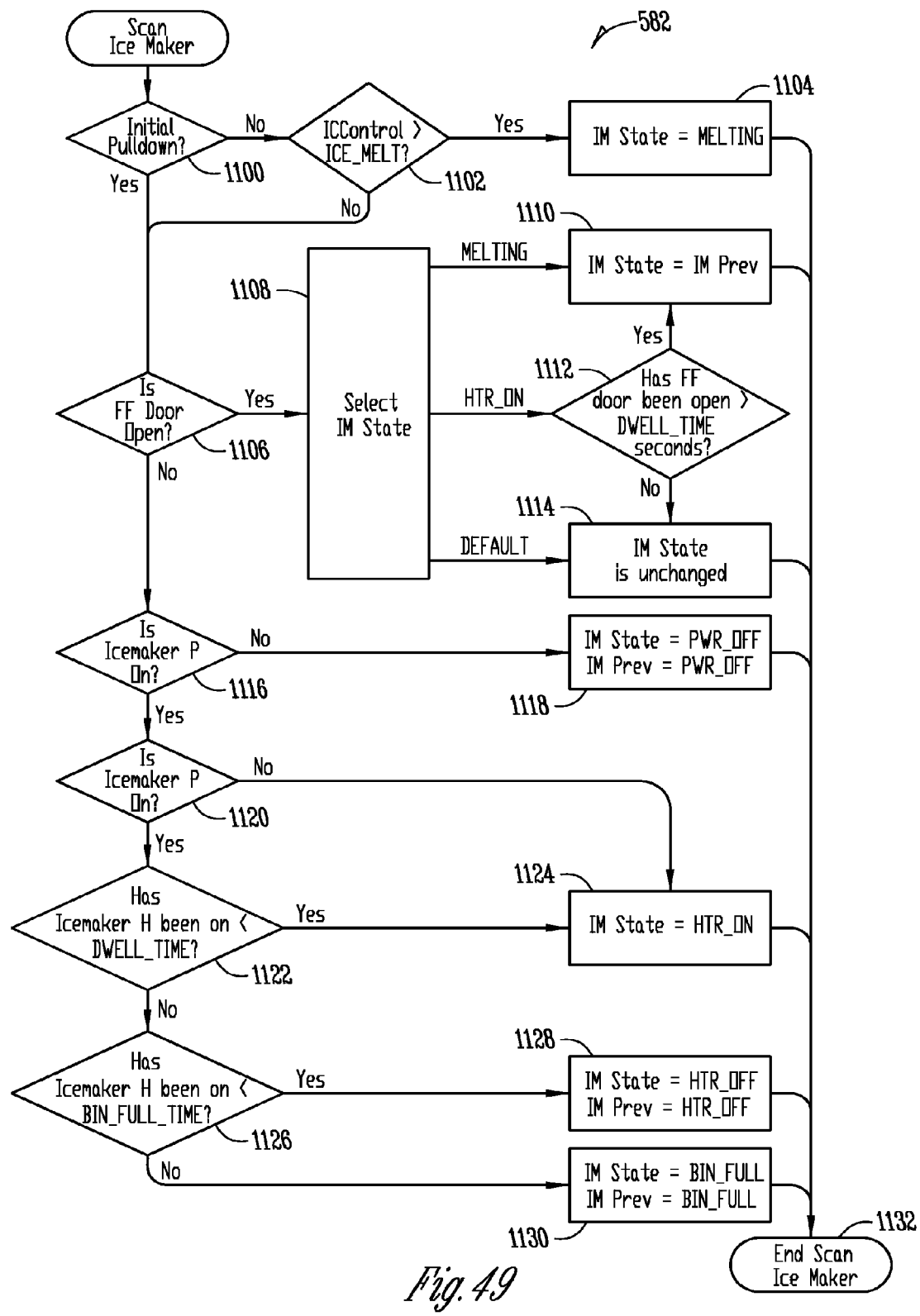
FIG. 49 illustrates one embodiment of a flow diagram for the scan ice maker subroutine.

FIG. 49 illustrates one embodiment of a flow diagram for the scan ice maker subroutine 582. This subroutine scans the ice maker to check for various conditions that may affect control functions and sets states associated with the ice maker appropriately. In step 1100 a determination is made as to whether the ice maker is in initial pulldown. If it is not, then in step 1102 a determination is made as to whether the ice maker control is above the melting temperature of ice. If it is then in state 1104, the ice maker state is set to MELTING. If not, then in step 1106 a determination is made as to whether the fresh food compartment door is open. If it is, then in step 1108 the ice maker state is selected. If the ice maker state is MELTING, then in step 1110 the ice maker state is set to the previous ice maker state. If the ice maker state is set to HTR_ON then in step 1112 a determination is made as to whether the fresh food compartment door has been open for longer than a set dwell time. If it has, then in step 1110 the ice maker state is set to the previous ice maker state. If has not then in step 1114 the ice maker state remains unchanged. Similarly if the ice maker state is DEFAULT in step 1108 then the ice maker state remains unchanged in step 1114.

In step 1116 a determination is made as to whether the ice maker power is on. If not, then in step 1118 the ice maker state and the ice maker's previous state are set accordingly to indicate that the power is off. In step 1120 a determination is made as to whether the ice maker's heater is on. If it is no then in step 1124 the ice maker's state is set to indicate that the heater is on. In step 1122 a determination is made as to whether the icemaker has been on less than a set dwell time. If it has, then in step 1124 the ice maker's state is set to indicate that the heater is on.

In step 1126 a determination is made has to whether the ice maker's heater has been on less than the amount of time associated with a full bin (such as 120 minutes). If it has then in step 1128 the ice maker's current state and previous state are set to indicate that the heater is off. If not, then in step 1130 the ice maker's current state and previous state are set to indicate that the bin is full.

Figure 50:
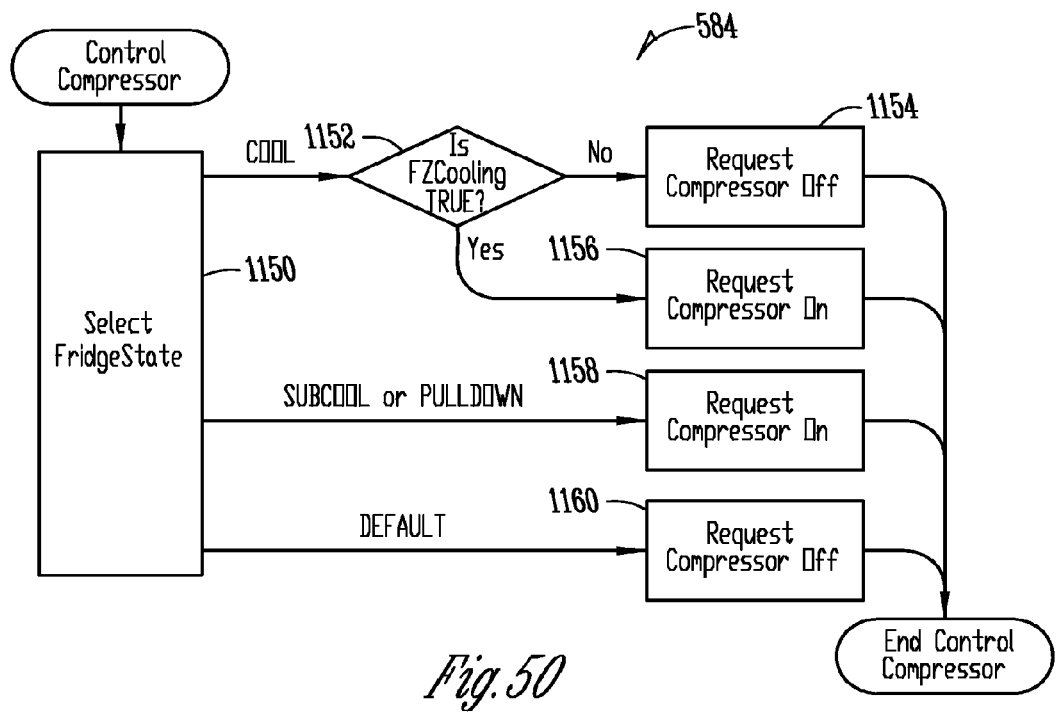
FIG. 50 illustrates one embodiment of a flow diagram for the control compressor subroutine.

FIG. 50 illustrates one embodiment of a flow diagram for the control compressor subroutine 584. In step 1150 the refrigerator's state (FridgeState) is examined. If the refrigerator is in the COOL state, then in step 1152 a determination is made as to whether the freezer cooling state is true. If it is not, then in step 1154 a request is made to turn the compressor off. If it is, then a request is made in step 1156 to request that the compressor be on. If the state is SUBCOOL or PULLDOWN, then in step 1158 a request is made to turn the compressor on. If the state is DEFAULT, then in step 1160 a request is made to turn the compressor off.

Figure 51:
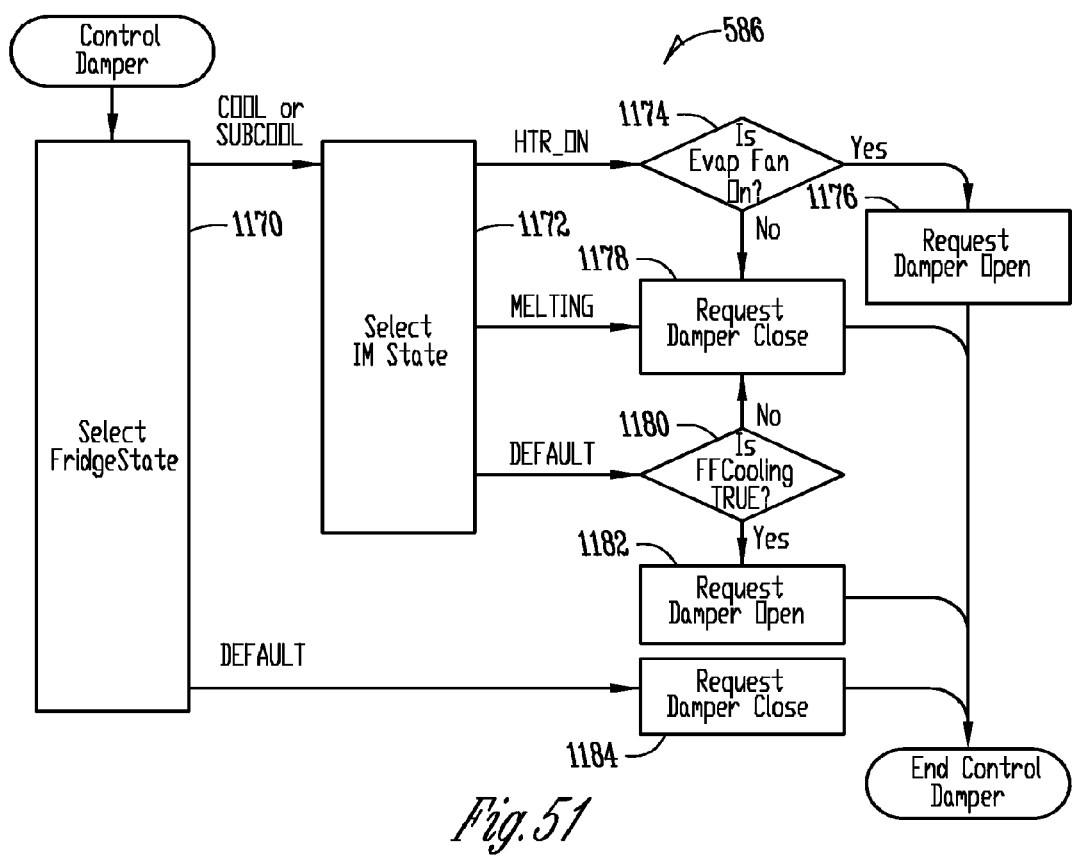
FIG. 51 illustrates one embodiment of a flow diagram for the control damper subroutine.

FIG. 51 illustrates one embodiment of a flow diagram for the control damper subroutine 586. In step 1170 the refrigerator state is selected. If the refrigerator state is COOL or SUBCOOL then in step 1172 the ice maker state is selected. IF the ice maker state is HTR_ON then in step 1174 a determination is made as to whether the evaporator fan is on. If it is then in step 1174 a request is made for the damper to be open. If not, then in step 1178 a request is made for the damper to be closed. If in step 1172 the icemaker state is MELTING<then in step 1178 a request is made for the damper to be closed. If the ice maker is in a different state (DEFAULT) then in step 1180 a determination is made as to whether the fresh food compartment is cooling. If it is not, then in step 1178 a request is made for the damper to be closed. If it is, then in step 1182 a request is made for the damper to be open. Returning to step 1170, if the refrigerator is in a DEFAULT state, then in step 1184 a request is made to close the damper.

Figure 52:
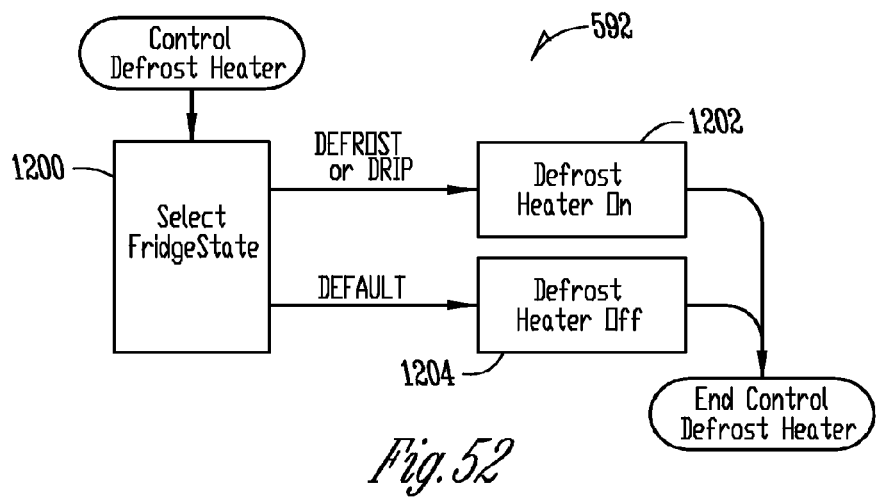
FIG. 52 illustrates one embodiment of a flow diagram for the control defrost heater subroutine.

FIG. 52 illustrates one embodiment of a flow diagram for the control defrost heater subroutine 592. In step 1200 the refrigerator state is selected. If the refrigerator state is DEFROST or DRIP, then in step 1202 the defrost heater is turned on. If the refrigerator state is a different or DEFAULT state then in step 1204 the defrost heater is turned off.

Figure 53:
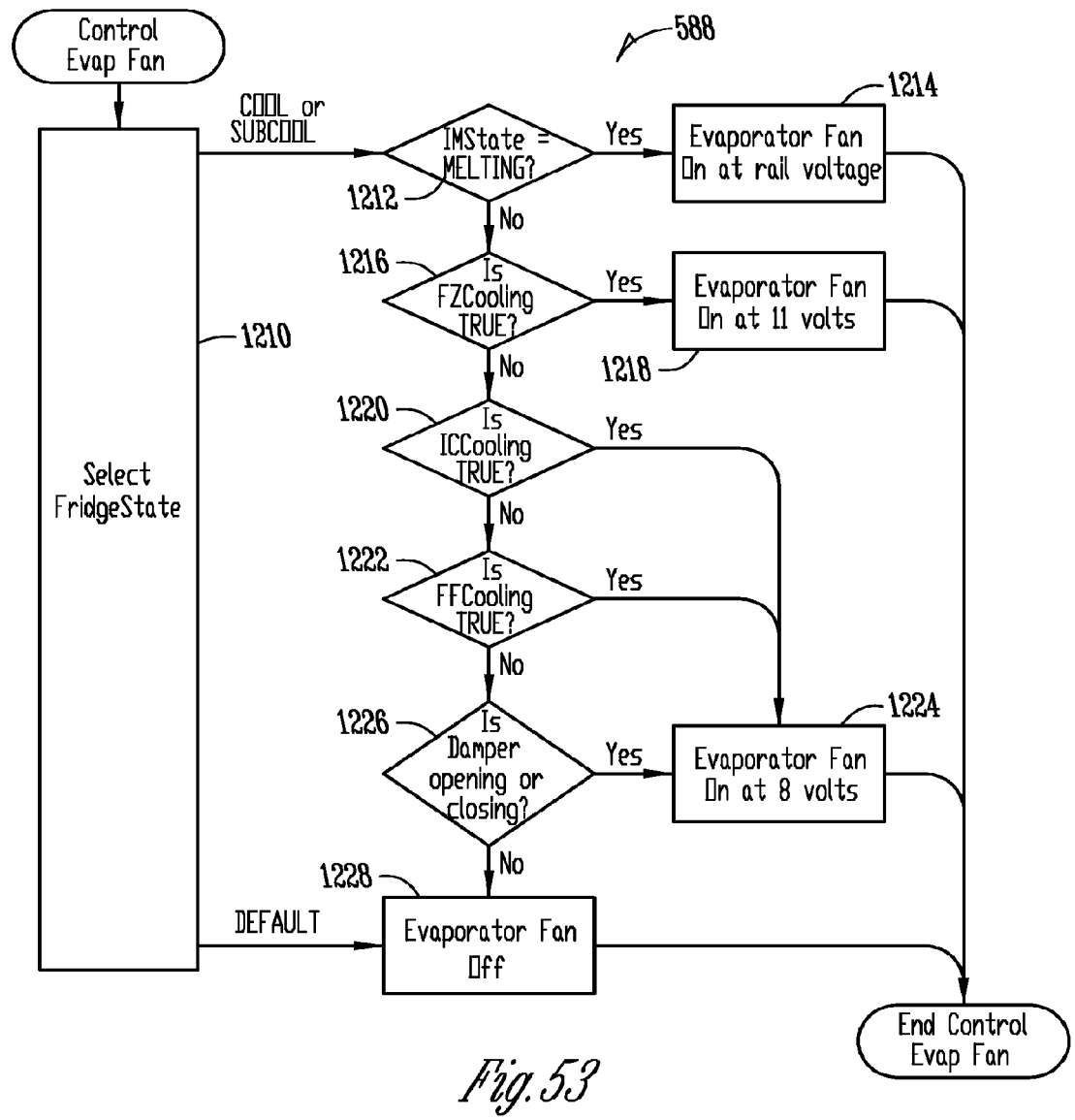
FIG. 53 illustrates one embodiment of a flow diagram for the control evaporator fan subroutine.

FIG. 53 illustrates one embodiment of a flow diagram for the control evaporator fan subroutine 588. In step 1210, the refrigerator state (FridgeState) is selected. If the state is COOL or SUBCOOL then in step 1212 a determination is made as to whether the ice maker is in the melting state (MELTING). If it is, then in step 1214, the evaporator fan is turned full-on at the rail voltage. If not, then in step 1216, a determination is made as to whether the freezer is in a cooling (FZCooling) state. If it is, then in step 1218, the evaporator fan is turned on at less than the rail voltage. If not, then in step 1220, a determination is made as to whether the ice compartment is cooling (ICCooling).

Figure 54:
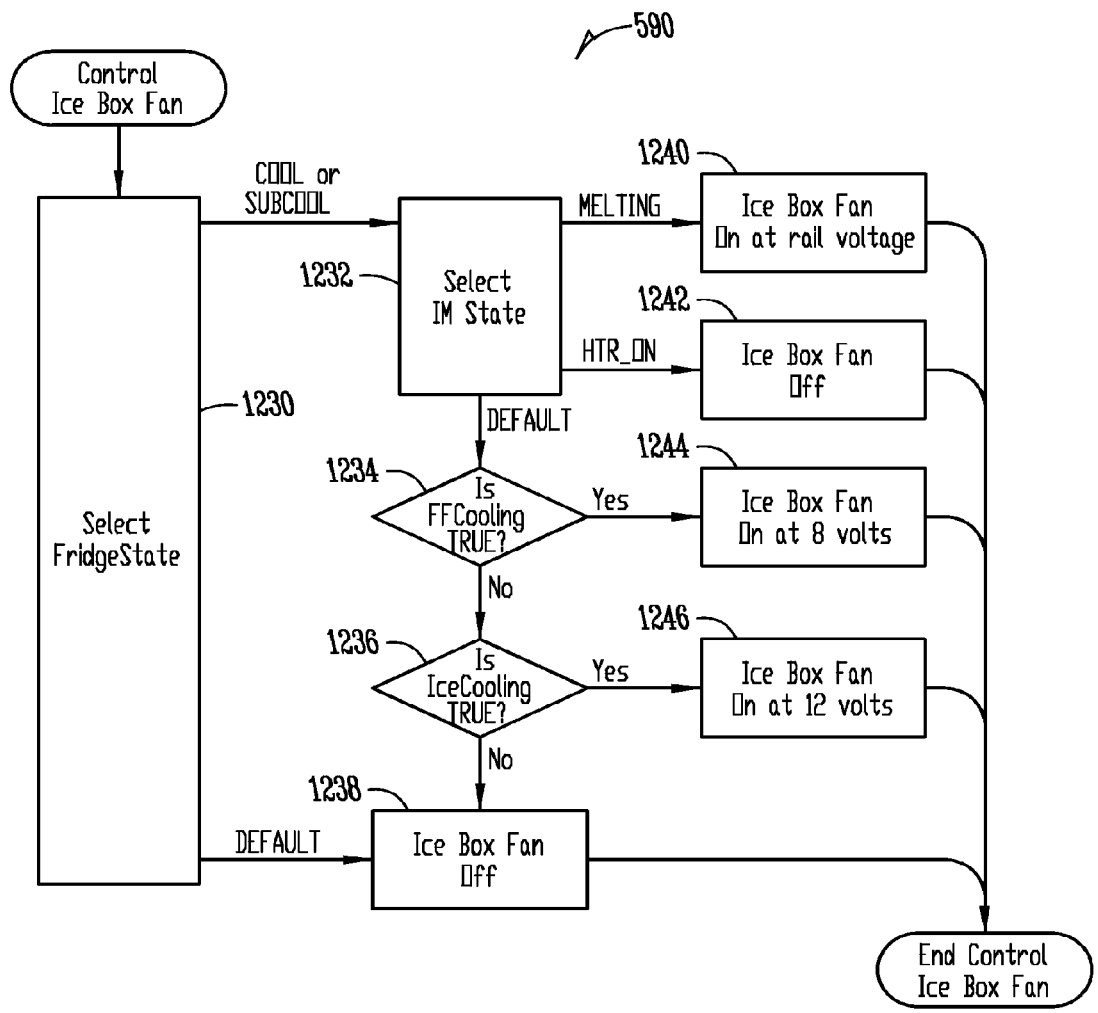
FIG. 54 illustrates one embodiment of a flow diagram for the control ice box fan subroutine.

FIG. 54 illustrates one embodiment of a flow diagram for the control ice box fan subroutine 590. In step 1230, a refrigerator state (FridgeState) is determined. If the refrigerator state is COOL or SUBCOOL, then in step 1232, the ice maker state is selected. If the ice maker state is MELTING, then the ice box fan is turned full-on in step 1240 such as by applying the rail voltages to the ice box fan. If the ice maker state indicates that the heater is on (HTR_ON), then the ice box fan is turned of in step 1242. If the ice maker state is in a different or DEFAULT state, then in step 1234 a determination is made as to whether the fresh food compartment is in a cooling (FFCooling) state. If it is, then in step 1244 the ice box fan is turned at less than full voltage to conserve energy. If not, then in step 1236 a determination is made as to whether the ice compartment is in a cooling (IceCooling) state. If it is in then in step 1246, the icebox fan Is turned on at a higher voltage than in step 1244. In step 1238, if neither the fresh good compartment is cooling or the ice maker compartment is cooling, the ice box fan is turned off. Thus the ice box fan is controlled in an energy efficient manner.

Miscellaneous

Applicant's co-pending provisional application, Ser. No. 60/613,241 filed Sep. 27, 2004, entitled APPARATUS AND METHOD FOR DISPENSING ICE FROM A BOTTOM MOUNT REFRIGERATOR, is hereby incorporated by reference in its entirety. This application and the provisional application both relate to a refrigerator with a bottom mount freezer and an icemaking compartment for making ice at a location remote from the freezer.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A refrigerator comprising:
a fresh food compartment disposed within a cabinet;
a fresh food compartment temperature set point associated with the fresh food compartment;
a freezer compartment disposed within the refrigerator cabinet;
a freezer compartment temperature set point associated with the freezer compartment;
an ice compartment integrally disposed within the refrigerator cabinet;
an ice compartment set point associated with the ice compartment;
an ice maker disposed within the ice compartment;
an ice bin;
a cooling system that provides cooling;
a user interface configured to receive a user selection of the fresh food compartment temperature set point and the freezer compartment temperature set point; and
an intelligent control operatively connected to the cooling system, the ice maker and the user interface, the intelligent control operating the cooling system using the fresh food compartment temperature set point, the freezer compartment temperature set point, and the ice compartment set point; and
wherein the intelligent control further provides for adjusting the ice compartment set point relative to the freezer compartment temperature set point based on an ice maker state and an ice bin state.

2. The refrigerator of claim 1, wherein the ice compartment is positioned within the fresh food compartment.

3. The refrigerator of claim 2, wherein the ice compartment is positioned at a top of the fresh food compartment and at an outer side of the fresh food compartment and wherein the refrigerator further comprises a cooling system that includes an evaporator that provides cooling to at least the freezer compartment and the ice compartment.

4. The refrigerator of claim 1, wherein the ice compartment is integrally formed adjacent the fresh food compartment.

5. The refrigerator of claim 1, wherein the freezer compartment is positioned below the fresh food compartment and wherein the refrigerator further comprises a cold air duct that has a lower air inlet within the freezer compartment and an upper outlet end connected on a back wall of the ice maker and the refrigerator further comprises an ice bin disposed within the ice compartment.

6. The refrigerator of claim 1 further comprising an ambient temperature sensor operatively connected to the intelligent control and a user interface that receives a user selection of the fresh food compartment temperature set point and the freezer compartment set point such that the fresh food compartment temperature set point is a user selected fresh food compartment temperature set point and the freezer compartment temperature set point is a user selected freezer compartment temperatureset point.

7. The refrigerator of claim 6 further comprising an ice compartment temperature sensor operatively connected to the intelligent control.

8. The refrigerator of claim 7 further comprising a freezer compartment temperature sensor operatively connected to the intelligent control and wherein the ice bin is disposed within the ice compartment.

9. The refrigerator of claim 8 further comprising a fresh food compartment temperature sensor operatively connected to the intelligent control.

10. The refrigerator of claim 9, wherein the intelligent control is further configured for operating the cooling system using temperature data from the ambient temperature sensor, the ice compartment temperature sensor, the freezer compartment temperature sensor, and the fresh food compartment temperature sensor.

11. A refrigerator comprising:
a refrigerator cabinet having an interior that includes a fresh food compartment;
a fresh food compartment temperature set point associated with the fresh food compartment;
a freezer compartment disposed within the refrigerator cabinet;
a freezer compartment temperature set point associated with the freezer compartment;
an ice compartment disposed within the refrigerator cabinet at a top corner of the interior of the fresh food compartment;
an ice compartment set point associated with the ice compartment;

an ice maker disposed within the ice compartment;
an ice bin;
a cooling system;
a water system; and
a user interface configured to receive a user selection of the fresh food compartment temperature set point and the freezer compartment temperature set point;
an intelligent control electrically connected to the user interface and wherein the intelligent control is configured to adjust the ice compartment set point based on an ice maker state and an ice bin state; and
wherein the ice compartment set point is greater than the freezer compartment temperature set point when the ice maker state is off and less than the freezer compartment temperature set point when an ice bin state is full.

12. The refrigerator of claim 11, wherein the ice compartment is positioned within the fresh food compartment and wherein the water system is a pre-assembled water system.

13. The refrigerator of claim 12, wherein the ice compartment is positioned at a top of the fresh food compartment and at an outer side of the fresh food compartment and wherein the refrigerator further comprises a cooling system that includes an evaporator that provides cooling to at least the freezer compartment and the ice compartment.

14. The refrigerator of claim 13, wherein the ice bin is disposed within the ice compartment and wherein the pre-assembled water system is a single module.

15. The refrigerator of claim 11 further comprising an ambient temperature sensor operatively connected to the intelligent control.

16. The refrigerator of claim 15 further comprising an ice compartment temperature sensor operatively connected to the intelligent control.

17. The refrigerator of claim 16 further comprising a freezer compartment temperature sensor operatively connected to the intelligent control.

18. The refrigerator of claim 17 further comprising a fresh food compartment temperature sensor operatively connected to the intelligent control.

19. The refrigerator of claim 18, wherein the intelligent control is further configured for operating the cooling system using temperature data from the ambient temperature sensor, the ice compartment temperature sensor, the freezer compartment temperature sensor, and the fresh food compartment temperature sensor.

20. The refrigerator of claim 11, wherein the ice compartment set point is equal to the freezer compartment temperature set point when the ice maker state is on and the ice bin state is not full.

* * * * *